US011085226B2

(12) United States Patent
Honjo et al.

(10) Patent No.: US 11,085,226 B2
(45) Date of Patent: Aug. 10, 2021

(54) OPERATING A DOOR OF A SMART-HOME THROUGH VARIOUS STAGES OF USER DETECTION

(71) Applicant: Google LLC, Mountain View, CA (US)

(72) Inventors: Shigefumi Honjo, Santa Cruz, CA (US); Lawrence Chang, Palo Alto, CA (US); Shayan Sayadi, Mill Valley, CA (US)

(73) Assignee: Google LLC, Mountain View, CA (US)

( * ) Notice: Subject to any disclaimer, the term of this patent is extended or adjusted under 35 U.S.C. 154(b) by 34 days.

(21) Appl. No.: 16/613,351

(22) PCT Filed: Dec. 21, 2018

(86) PCT No.: PCT/US2018/067107
§ 371 (c)(1),
(2) Date: Nov. 13, 2019

(87) PCT Pub. No.: WO2020/131101
PCT Pub. Date: Jun. 25, 2020

(65) Prior Publication Data
US 2021/0010315 A1  Jan. 14, 2021

(51) Int. Cl.
*E05F 15/73* (2015.01)
*E05F 15/77* (2015.01)
*G07C 9/37* (2020.01)

(52) U.S. Cl.
CPC .............. *E05F 15/73* (2015.01); *E05F 15/77* (2015.01); *G07C 9/37* (2020.01); *E05Y 2400/356* (2013.01); *E05Y 2800/426* (2013.01); *E05Y 2900/132* (2013.01)

(58) Field of Classification Search
CPC ...... E05F 15/73; E05F 15/77; G07C 9/00571; G07C 2209/62; G07C 9/00174; G07C 9/37; E05Y 2400/356

USPC ........................................................ 340/5.7
See application file for complete search history.

(56) References Cited

U.S. PATENT DOCUMENTS

| 8,539,717 | B2 * | 9/2013 | Speyer | E05C 19/001 |
| | | | | 49/319 |
| 2009/0077895 | A1 * | 3/2009 | Tshai | E06B 7/215 |
| | | | | 49/316 |
| 2015/0116107 | A1 | 4/2015 | Fadell et al. | |
| 2016/0066254 | A1 | 3/2016 | Colby et al. | |

FOREIGN PATENT DOCUMENTS

EP        2098670 A1     9/2009

OTHER PUBLICATIONS

International Search Report and Written Opinion dated Aug. 21, 2019 in International Patent Application No. PCT/US2018/067107, all pages.

* cited by examiner

*Primary Examiner* — Vernal U Brown
(74) *Attorney, Agent, or Firm* — Kilpatrick Townsend & Stockton LLP

(57) ABSTRACT

This relates to apparatus, systems, methods, and related computer program products for providing home security/smart-home objectives. More particularly, this relates to intelligent, multi-sensing, network-connected devices that communicate with each other and/or with a central server or a cloud-computing system to provide any of a variety of useful home security/smart-home objectives, including managing ingress and egress through any smart door of a smart-home.

19 Claims, 15 Drawing Sheets

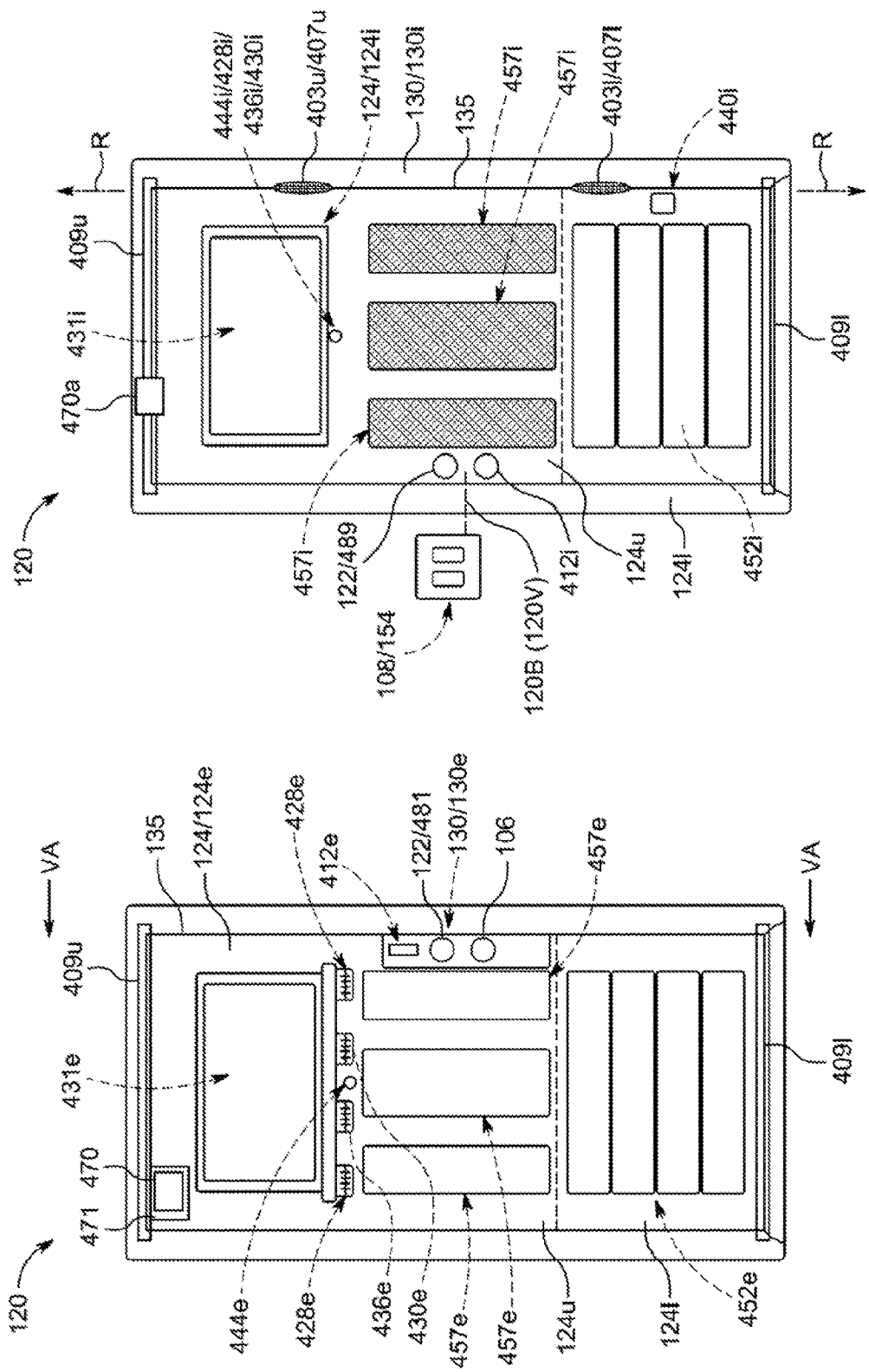

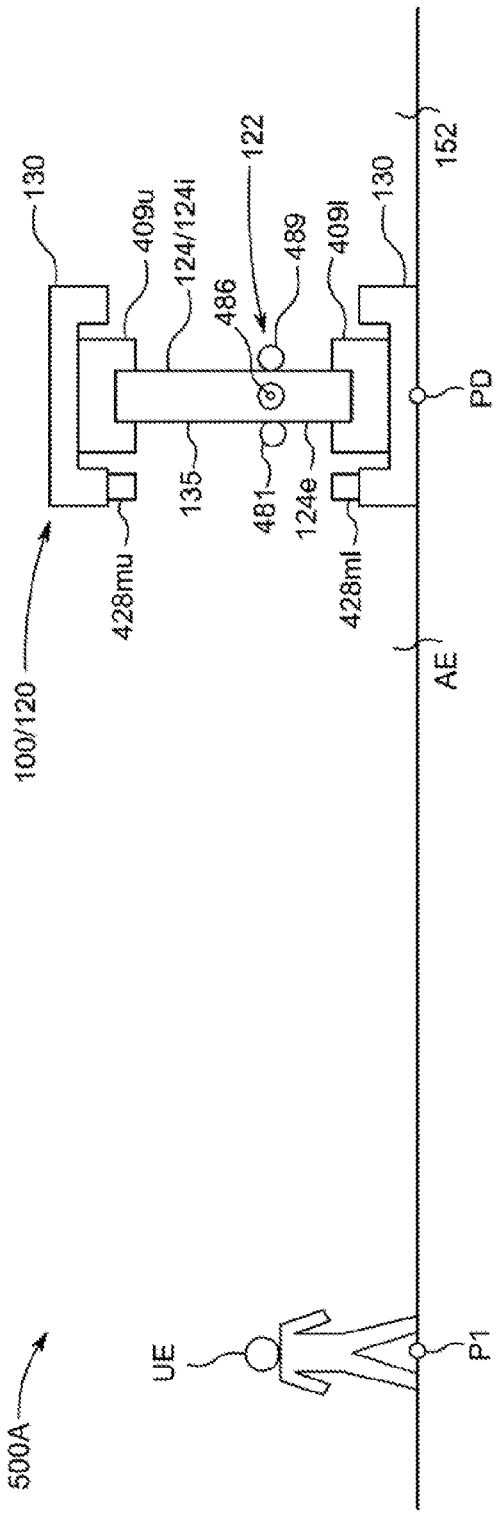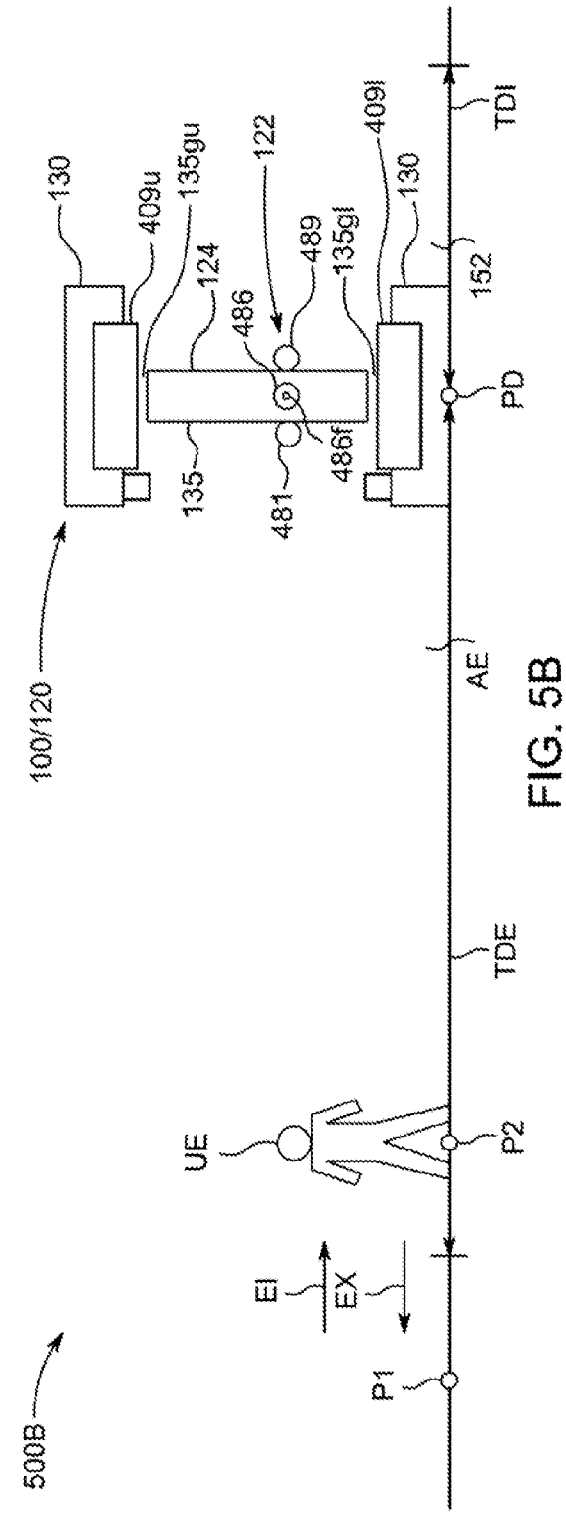
FIG. 5A
FIG. 5B

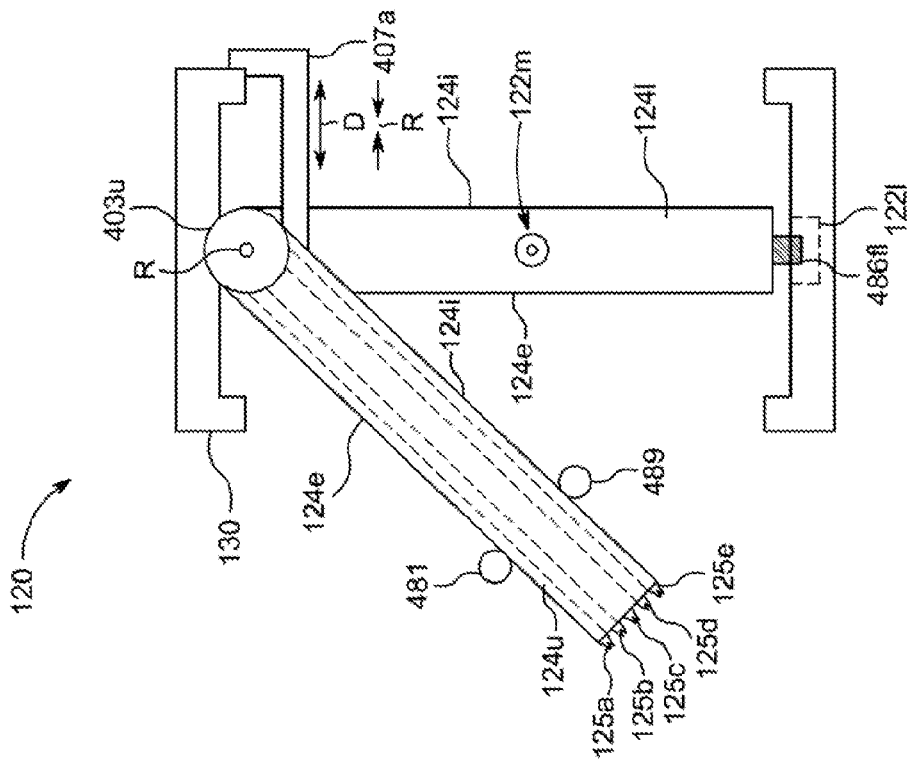
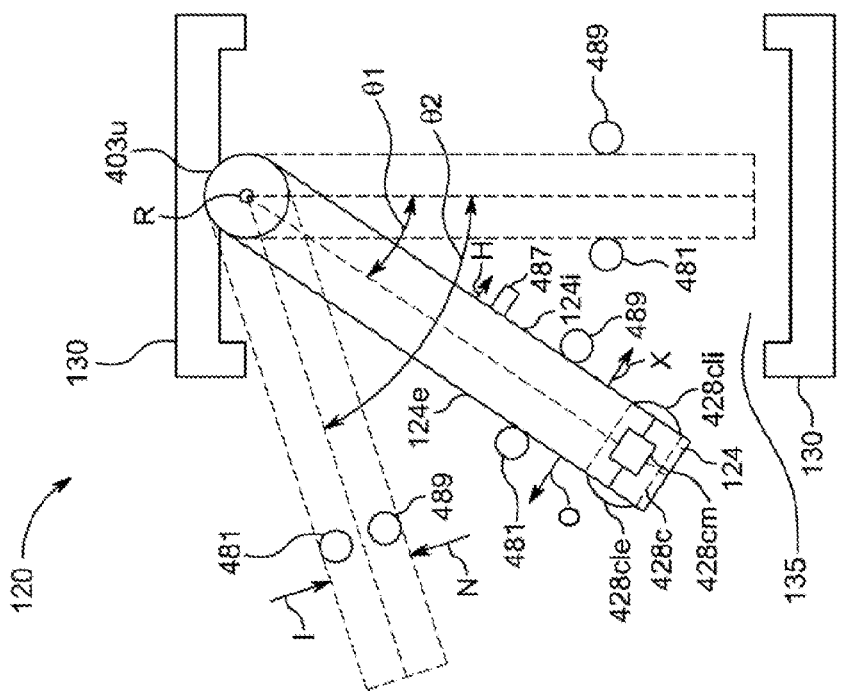
FIG. 6A
FIG. 6B

OPERATING A DOOR OF A SMART-HOME THROUGH VARIOUS STAGES OF USER DETECTION

CROSS-REFERENCE TO RELATED APPLICATIONS

This application is a National Stage Application of International Application No. PCT/US2018/067107 filed Dec. 21, 2018, which is hereby incorporated by reference for all purposes.

FIELD

This patent specification relates to apparatus, systems, methods, services, and related computer program products for operating a door of a smart-home. More particularly, this patent specification relates to apparatus, systems, methods, services, and related computer program products for operating a door of a smart-home through various stages of user detection and/or to provide any of a variety of useful home security/smart-home objectives.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Some homes today are equipped with smart-home networks to provide automated control of devices, appliances, and systems, such as heating, ventilation, and air conditioning ("HVAC") systems, lighting systems, home theater and entertainment systems, as well as security systems. Smart-home networks may include control panels that a person may use to input settings, preferences, and scheduling information that the smart-home network uses to provide automated control of various devices, appliances, and systems in the home. However, doors to such homes are manually operated by its end users for gaining access to and/or leaving certain environments. Accordingly, apparatus, systems, methods, services, and related computer program products for operating a door of a smart-home are needed.

BRIEF SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Apparatus, systems, methods, services, and related computer program products for operating a door of a smart-home are provided herein.

For example, a method for adjusting a door assembly of a computing system may be provided, wherein the door assembly may include a door frame that defines a door frame passageway between two spaces of an environment and a door body that is movable with respect to the door frame between a closed door state and a plurality of open door states, wherein the method may include detecting, with the computing system, a first stage of interaction by a user with the environment while the door assembly is in a first door state, in response to the detecting the first stage of interaction, transitioning, with the computing system, the door assembly from the first door state to a second door state, after the transitioning the door assembly from the first door state to the second door state, detecting, with the computing system, a second stage of interaction by the user with the environment while the door assembly is in the second door state, and, in response to the detecting the second stage of interaction, transitioning, with the computing system, the door assembly from the second door state to a third door state.

As another example, a system may be provided that may include a door assembly that may include a door frame that defines a door frame passageway, a door body, a holding mechanism that is operative to be selectively engaged for holding the door body in a closed position with respect to the door frame, and a sealing mechanism that is operative to be selectively engaged for sealing a body-frame gap of the door frame passageway between the door body and the door frame when the door body is in the closed position, at least one sensor operative to detect potential triggering event data, and at least one controller operative to receive first potential triggering event data detected by the at least one sensor, determine that the received first potential triggering event data satisfies an unsealing requirement of an unsealing triggering event but not a releasing requirement of a releasing triggering event, and, based on the determination that the received first potential triggering event data satisfies the unsealing requirement of the unsealing triggering event but not the releasing requirement of the releasing triggering event, disengage the sealing mechanism for unsealing the body-frame gap of the door frame passageway between the door body and the door frame when the door body is held in the closed position by the holding mechanism.

As yet another example, a non-transitory computer readable storage medium may be provided storing one or more programs, the one or more programs including instructions, which, when executed by a computing system including one or more processors and one or more sensors and a sealing mechanism and a locking mechanism and a door body and a door frame defining a door frame passageway, may cause the computing system to detect, using the one or more sensors of the computing system, potential triggering event data, determine, using the one or more processors of the computing system, that each requirement of a triggering event is satisfied by at least the detected potential triggering event data, and, in response to the determination that each requirement of the triggering event is satisfied, maintain engagement of the locking mechanism for holding the door body in a closed position with respect to the door frame but disengage the sealing mechanism for terminating a seal of a body-frame gap of the door frame passageway between the door body and the door frame while the door body is held in the closed position with respect to the door frame.

Various refinements of the features noted above may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination. Unless otherwise stated, features described in the context of one example may be combined or used with features described in the context of one or more other examples. The summary presented above is intended only to familiarize the reader with certain aspects and contexts of embodiments of the present disclosure without limitation to the claimed subject matter.

A further understanding of the nature and advantages of the embodiments discussed herein may be realized by reference to the remaining portions of the specification and the drawings.

BRIEF DESCRIPTION OF THE DRAWINGS

The discussion below makes reference to the following drawings, in which like reference characters may refer to like parts throughout, and in which:

FIGS. 4B and 4C illustrate example modular head units for the smart door of FIG. 4A, according to at least one embodiment;

FIGS. 5A-5E are schematic diagrams illustrating a sequence of states for controlling a smart door viewed from lines VA-VA of FIG. 4B, according to at least one embodiment;

FIGS. 6A and 6B are illustrative embodiments of various door states of a smart door viewed from lines VIA-VIA of FIG. 5D;

DETAILED DESCRIPTION

Figure 1:
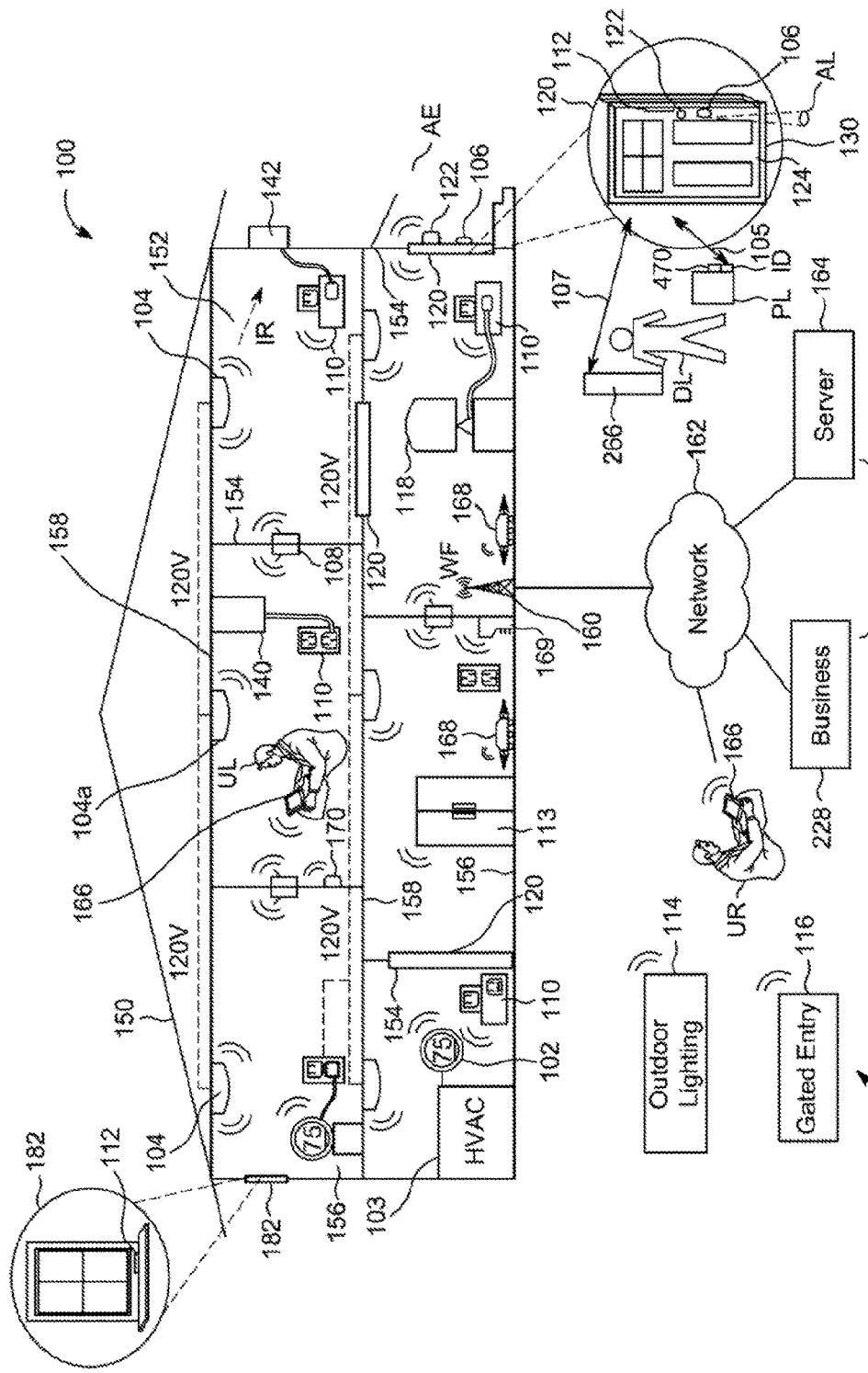
FIG. 1 illustrates an example of a smart-home environment within which one or more of the apparatus, methods, systems, services, and/or computer program products described further herein may be applicable, according to at least one embodiment.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more doors of an enclosure of a smart environment may be described further herein in the context of being used in a residential smart-home environment, such as a single-family residential home, the scope of the present teachings is not so limited. More generally, doors of an enclosure of a smart environment may be applicable to a wide variety of enclosures and environments, such as, for example, duplexes, townhomes, multi-unit apartment buildings, hotels, retail stores, factories, office buildings, industrial buildings, vessels (e.g., automobiles, aircraft, etc.), and/or any other suitable physical area that may be occupied or accessed by a user or with which a user may physically or logically interact. It is to be understood that the term enclosure may also be a non-contained environment that may be provided with one or more doors of this disclosure, such as, for example, an outdoor shopping mall or outdoor patio or outdoor yard (e.g., a fenced in yard), any space that may be either partially or completely indoors or outdoors. Further, it is understood that while the terms user, customer, person, visitor, deliverer, neighbor, installer, homeowner, occupant, guest, tenant, landlord, repair person, manager, pet, robot, and the like may be used to refer to the user entity or user entities who may be interacting with the door(s) in the context of one or more scenarios described herein, these references are by no means to be considered as limiting the scope of the present teachings with respect to the user entity or user entities who may be performing such actions. It is also to be understood that the term door may be any structure of any suitable size and shape that may be provided to control the ingress into and/or egress from any suitable enclosure or space of an environment by any suitable user entity and/or any other suitable element (e.g., water, particulate, air, light, sound, fire, etc.), such as a gate, shutter, doorway, barrier, hatch, portal, window, or the like. For example, a smart environment may include at least one intelligent, multi sensing, and/or network connected entryway passage device or smart door, where such a smart door may include a door body that may be coupled to or otherwise positioned with respect to a door frame defining a door frame passageway that may be at least partially blocked by the door body at some moment in time for selectively preventing at least one type of entity or element from passing through the door frame passageway of the door frame.

Embodiments of the present disclosure generally relate to operating a door of a smart-home, such as during various stages of user detection. A computing system may include a smart-home with many devices, including intelligent, multi-sensing, network-connected devices, that may communicate with each other and/or with a central server or a cloud-computing system to provide any of a variety of home security/smart-home objectives. One such device may be a smart door that may be automatically transitioned between different door states in response to detection of certain stages of interaction by a user with the smart-home, where such door states may include a locked state, an unlocked state, a latched state, an unlatched state, a sealed state, an unsealed state, an open state, and/or a closed state. This may enable the computing system to more securely and/or more effectively and/or more efficiently control if, when, and how various types of elements (e.g., air, pets, human users, etc.) may pass through the smart door.

Turning to the figures, FIG. 1 illustrates an example of a smart-home environment 100 within which one or more of the devices, methods, systems, services, and/or computer program products described further herein can be applicable. The depicted smart-home environment 100 includes a structure 150, which can include, for example, a house, office building, garage, or mobile home. It should be appreciated that the smart-home environment 100 includes areas outside the home, such as curtilage, the yard, and other nearby land. It will be appreciated that devices can also be integrated into a smart-home environment 100 that does not include an entire structure 150, such as an apartment, condominium, or office space. It will also be appreciated that devices can also be integrated into a smart environment 100 with a structure that is not fixed, but rather mobile, such as a vehicle. Further, the smart-home environment can control and/or be coupled to devices outside of the actual structure 150. Indeed, several devices in the smart-home environment need not physically be within the structure 150. For example, a device controlling an outdoor lighting system 114 or gated entry system 116 can be located outside of the structure 150.

The depicted structure 150 includes a plurality of rooms 152, separated at least partly from each other via walls 154. The walls 154 can include interior walls at least partially separating different rooms 152 or exterior walls at least partially separating a room 152 from an ambient environment AE external to structure 150. Each room 152 can further include a floor 156 and a ceiling 158. Devices can be mounted on, integrated with, and/or supported by a wall 154, floor 156, or ceiling 158.

Smart-home environment 100 of FIG. 1 may include a plurality of electronic devices, including intelligent, multi-sensing, network-connected electronic devices, that can integrate seamlessly with each other and/or with a central server or a cloud-computing system of a platform 200 (e.g., server system 164 of platform 200) to provide a smart-home computing system 199 that may be operative to provide any of a variety of useful home security and/or smart-home objectives. Smart-home environment 100 may include one or more intelligent, multi-sensing, and/or network-connected entryway passage electronic devices or assemblies 120 (hereinafter referred to as "smart doors 120"). One, some, or each smart door 120 may include a door body 124 that may be coupled to or otherwise positioned with respect to a door frame 130 defining a door frame passageway 135 that may be at least partially blocked by door body 124 at some moment in time for selectively preventing at least one type of element from passing through door frame passageway 135 of door frame 130. One, some, or each smart door 120 may be configured to control how and when and what type(s) of elements (e.g., user entities, water, air, etc.) may be enabled to pass through and/or around door body 124 and, thus, through its associated door frame passageway 135, between any two suitable spaces that may be on opposite sides of door frame passageway 135 of door 120 (e.g., between two rooms 152 via a door 120 with a door frame passageway 135 provided through an interior wall 154 separating the two rooms, between two rooms 152 via a door 120 with a door frame passageway 135 provided through a floor 156 and/or ceiling 158 separating the two rooms, between a room 152 and an ambient environment AE via a door 120 with a door frame passageway 135 provided through an exterior wall 154 separating the room and the ambient environment, between any two spaces of environment 100 (e.g., where neither space is inside structure 150 (e.g., via a door 120 with a door frame passageway 135 provided through a door frame 130 of a fence or other suitable divider separating the spaces)), between a space of environment 100 and a space ambient to environment 100 (e.g., via a door 120 with a door frame passageway 135 provided through a door frame 130 of a fence or other suitable divider along a boarder of environment 100 that provides initial access to environment 100 via), etc.).

Moreover, smart-home environment 100 may include one or more intelligent, multi-sensing, network-connected thermostat electronic devices or assemblies 102 (hereinafter referred to as "smart thermostats 102"), one or more intelligent, network-connected, multi-sensing hazard detection unit electronic devices or assemblies 104 (hereinafter referred to as "smart hazard detectors 104"), and/or one or more intelligent, multi-sensing, network-connected entryway interface electronic devices or assemblies 106 (hereinafter referred to as "smart doorbells 106"). Any smart thermostat 102, any smart hazard detector 104, and/or any smart doorbell 106 may be provided independently of a smart door 120 or may be integrated into and provided as a portion of a smart door 120. According to embodiments, one, some, or each smart thermostat 102 may be configured to detect ambient climate characteristics (e.g., temperature and/or humidity) and control an HVAC system 103 accordingly. One, some, or each smart hazard detector 104 may be configured to detect the presence of a hazardous substance or a substance indicative of a hazardous substance (e.g., smoke, fire, or carbon monoxide). One, some, or each smart doorbell 106 may control doorbell functionality, detect a user's approach to or departure from a location (e.g., an outer door), announce a person's approach or departure via aural or visual methods, and/or control settings on a security system (e.g., to activate or deactivate a security system when occupants go and come).

Smart-home environment 100 of FIG. 1 may further include one or more intelligent, multi-sensing, network-connected wall switch electronic devices or assemblies 108 (hereinafter referred to as "smart wall switches 108") and/or one or more intelligent, multi-sensing, network-connected wall plug interface electronic devices or assemblies 110 (hereinafter referred to as "smart wall plugs 110"). Any smart wall switch 108 and/or any smart wall plug 110 may be provided independently of a smart door 120 (e.g., at any suitable wall or floor or ceiling) or may be integrated into and provided as a portion of a smart door 120. One, some, or each smart wall switch 108 may detect ambient lighting conditions, detect room-occupancy states, and/or control a power and/or dim state of one or more lights. One, some, or each smart wall switch 108 may also control a power state or speed of a fan, such as a ceiling fan. One, some, or each smart wall plug 110 may detect occupancy of a room or enclosure and control supply of power to one or more wall plugs (e.g., such that power is not supplied to the plug if nobody is at home). In the illustrated example, one of smart wall plugs 110 may control supply of power to a lamp 118, while another smart wall plug 110 may control supply of power to a through-wall air conditioning unit 142 or any other suitable component of environment 100.

Smart-home environment 100 of FIG. 1 may include one or more intelligent, multi-sensing, network-connected entry detector electronic devices or assemblies 112 (hereinafter referred to as "smart entry detectors 112"). The illustrated smart entry detectors 112 are located at windows 182, doors 120, and other entry points of smart-home environment 100 for detecting when a window, door, or other entry point is open, broken, or otherwise breached. According to embodiments, each smart entry detector 112 may include first and second parts. The first part may be attached to a fixed part of the house or other dividing structure, such as the windowsill, door sill, outer frame (e.g., door frame 130), side jamb, head jamb, and/or the like, while the second part may be attached to any suitable part of the window or door that may move when opening and closing, such as the upper or lower sash, top or bottom rail, side stile, latch, handle, and/or the like. The first and second parts of the smart entry detectors 112 may be in close proximity when the window or door is closed, and the first and second parts may move apart from one another when the window or door opens. Each smart entry detector 112 may generate a corresponding signal when a window or door is open or closed. It should be appreciated that, according to some embodiments, any smart entry detector 112 can be any type of window, door, or entryway alarm sensor for detecting when a window, door, or other entry point is open, broken, or otherwise breached, and that the alarm sensors may become smart when connected to a central server or cloud-computing system associated with environment 100 (e.g., system 164). According to embodiments, an alarm system of the home may not arm unless all smart entry detectors 112 of the home indicate that all doors, windows, and other entryways are closed and/or that all smart entry detectors 112 are "armed".

Smart-home environment 100 of FIG. 1 may include one or more intelligent, multi-sensing, network-connected appliance electronic devices or assemblies 113 (hereinafter referred to as "smart appliances 113"), such as refrigerators, stoves and/or ovens, televisions, washers, dryers, indoor or outdoor lighting, stereos, intercom systems, gated entries, garage-door openers, floor fans, ceiling fans, wall air conditioners, pool heaters, irrigation systems, security systems, safes, and so forth. According to embodiments, one or some or each network-connected appliance 113 may be made compatible with the smart-home environment by cooperating with the respective manufacturers of the appliances. For example, the appliances can be space heaters, window air conditioning units, motorized duct vents, and/or the like. When plugged in, an appliance can announce itself to the smart-home network, such as by indicating what type of appliance it is, and it can automatically integrate with the controls of the smart-home. Such communication by the appliance to the smart-home can be facilitated by any wired or wireless communication protocols now known or hereinafter developed. The smart-home also can include one or more of a variety of non-communicating legacy appliances 140, such as old conventional washer/dryers, refrigerators, and the like, which can be controlled, albeit coarsely (ON/OFF), by virtue of one or more smart wall plugs 110. Smart-home environment 100 can further include one or more of a variety of at least partially communicating legacy appliances 142, such as infrared ("IR") controlled wall air conditioners or other IR-controlled devices, which can be controlled by IR signals provided by one or more smart hazard detectors 104 or one or more smart wall switches 108.

Smart-home environment 100 of FIG. 1 may further include one or more intelligent, multi-sensing, network-connected doorknob electronic devices or assemblies 122 (hereinafter referred to as "smart doorknobs 122"). As shown in FIG. 1, for example, an illustrated smart doorknob 122 may be provided at or by an exterior surface of an external door 120 of smart-home environment 100. However, it should be appreciated that smart doorknobs 122 can be provided on either or both sides of one, some, or all doors of smart-home environment 100. Smart-home environment 100 of FIG. 1 may further include one or more intelligent, multi-sensing, network-connected light electronic devices or assemblies 170 (hereinafter referred to as "smart lights 170") that may house a light source having variable intensity. Further, according to embodiments, the color of the light emitted from light 170 may be changeable. In addition to housing a light source, the smart light 170 may house an occupancy sensor, such as an ultrasonic or passive IR sensor, and an ambient light sensor, such as a photoresistor or a single-pixel sensor that measures light in the room. Smart light 170 may be configured to activate the light source when its ambient light sensor detects that the room is dark and/or when its occupancy sensor detects a person's presence or movement. Smart light 170 may be configured to adjust the color and intensity of the light source (e.g., smart light 170 may be configured to adjust the intensity of the light source in a manner where intensity is inversely proportional to the amount of natural light detected in the environment). Smart light 170 may include a low-power wireless communication chip (e.g., ZigBee chip) that regularly sends out messages regarding the occupancy of the room and the amount of light in the room, including instantaneous messages coincident with the occupancy sensor detecting the presence of a person in the room.

Further included and illustrated in the example smart-home environment 100 of FIG. 1 are service robots 168, each of which may be configured to carry out, in an autonomous manner, any of a variety of household tasks. For some embodiments, service robots 168 can be respectively configured to perform floor sweeping, floor washing, and/or the like. Tasks such as floor sweeping and floor washing can be considered as "away" or "while-away" tasks for purposes of the instant description, as it is generally more desirable for these tasks to be performed when the occupants are not present. For other embodiments, one or more of service robots 168 are configured to perform tasks such as playing music for an occupant, serving as a localized thermostat for an occupant, serving as a localized air monitor/purifier for an occupant, serving as a localized baby monitor, serving as a localized hazard detector for an occupant, and so forth, it being generally more desirable for such tasks to be carried out in the immediate presence of the human occupant. For purposes of the instant description, such tasks can be considered as "human-facing" or "human-centric" tasks.

Smart thermostats 102, smart hazard detectors 104, smart doorbells 106, smart wall switches 108, smart wall plugs 110, smart entry detectors 112, smart appliances 113, smart doors 120, smart doorknobs 122, keypads, and other devices (collectively referred herein to as "the network-connected smart devices") of smart-home environment 100 may be communicatively coupled to each other and to central server or cloud-computing system 164 to accomplish home security and/or smart-home objectives for the smart-home environment. In addition to containing processing and sensing capabilities, each of the network-connected smart devices may be capable of data communications and information sharing with any other of the network-connected smart devices, as well as to any central server or cloud-computing system 164 or any other device that is network-connected anywhere in the world to accomplish home security and/or smart-home objectives. The required data communications can be carried out using any of a variety of custom or standard wireless protocols (Wi-Fi, ZigBee, 6LoWPAN, 3G/4G/5G, etc.) and/or any of a variety of custom or standard wired protocols (CAT6 Ethernet, HomePlug, etc.). In some cases, backup mechanisms of wireless communication (e.g., 3G/4G/5G) may be provided in the event the primary mechanisms of communication (e.g., Wi-Fi) becomes disabled, such as due to power outage.

All or some of the network-connected smart devices can serve as wireless or wired repeaters. For example, a first one of the network-connected smart devices can communicate with a second one of the network-connected smart devices via a wireless router 160. The network-connected smart devices can further communicate with each other via a connection to a network, such as the Internet 162. Through the Internet 162, the network-connected smart devices can communicate with a central server or cloud-computing system 164. Central server or cloud-computing system 164 can be associated with a manufacturer, support entity, or service provider, such as a home-security provider, associated with the network-connected smart devices. For one embodiment, a user may be able to contact local law enforcement and other emergency or security personnel as well as contact customer support using one of the network-connected smart devices itself rather than needing to use other communication mechanisms, such as a telephone or Internet-connected computer. Further, software updates and security alerts can be automatically sent from the central server or cloud-computing system 164 to the network-connected smart devices (e.g., when available, when purchased, at routine intervals, when emergency news needs to be broadcasted throughout the home, when the security system needs to be armed, and when the smart-home environment needs to be put on lock down). In some embodiments, certain functionalities and capabilities of environment 100 may be enabled without active access to the Internet or remote servers or data sources. Instead, in some embodiments, the various smart devices of environment 100 (e.g., devices 102, 104, 106, 108, 110, 112, 113, 114, 116, 120, 122, 166, 168, 170, and/or the like) may be enabled to communicate with one another without active communication with Internet 162 and system 164, and data of those devices may be analyzed, for example, in combination with rules-based inference engines and/or artificial intelligence and/or any suitable smart environment data and/or any suitable rules or settings or inferences or modes that may be associated with environment 100, locally at environment 100 by any suitable computing system (e.g., at a dedicated central processing unit device or computing system of environment 100 or at one or more processors of the various smart devices of environment 100) to dictate the functionality of environment 100.

According to embodiments, the network-connected smart devices may combine to create a mesh network of spokesman and low-power nodes in the smart-home environment 100, where some of the network-connected smart devices may be "spokesman" nodes and others may be "low-powered" nodes. Spokesman nodes are sometimes referred to herein as "smart" nodes. It should be appreciated that non-smart devices may perform as lower-powered nodes. The spokesman and low-powered nodes may be communicatively interconnected and may operate to accomplish a common objective or to achieve a common goal in the smart-home environment. In some embodiments, some or all of the spokesman and low-powered nodes may perform one or more functions in a coordinated manner to accomplish the common objective. Example functions and objectives may include, but are not limited to, triggering an alarm for the objective of securing the home, adjusting a thermostat setting for the objective of making the home comfortable, at least partially opening and/or closing an entryway passageway using a smart door for the objective of making the home comfortable and/or for securing the home, and turning on and off lights for the objective of securing the home or for use by occupants. Other example objectives and functions are provided throughout this document. Some of the network-connected smart devices in the smart-home environment 100 may be battery powered, while others may have a regular and reliable power source, such as by connecting to wiring (e.g., to 120 V line voltage wires) behind walls 154 of smart-home environment 100. The network-connected smart devices that have a regular and reliable power source may be referred to as "spokesman" nodes. These nodes may be equipped with the capability of using any wireless protocol or manner to facilitate bidirectional communication with any of a variety of the other devices in the smart-home environment 100 as well as with the central server or cloud-computing system 164. On the other hand, the network-connected smart devices that are battery powered may be referred to as "low-power" nodes. These nodes may tend to be smaller than spokesman nodes and may communicate using wireless protocol that may require very little power, such as Zigbee, 6LoWPAN, and/or the like. Further, some, but not all, low-power nodes may be incapable of bidirectional communication. These low-power nodes may send messages, but they may be unable to "listen". Thus, other network-connected smart devices in the smart-home environment 100, such as the spokesman nodes, may not send information to these low-power nodes.

As described, the network-connected smart devices may serve as low-power and spokesman nodes to create a mesh network in the smart-home environment 100. Individual low-power nodes in the smart-home environment may regularly send out messages regarding what they are sensing, and the other low-powered nodes in the smart-home environment—in addition to sending out their own messages—may repeat the messages, which may cause the messages to travel from node to node (e.g., network-connected smart device to network-connected smart device) throughout the smart-home environment 100. The spokesman nodes in the smart-home environment 100 may be able to "drop down" to low-powered communication protocols to receive these messages, translate the messages to other communication protocols, and/or send the translated messages to other spokesman nodes and/or the central server or cloud-computing system 164. Thus, the low-powered nodes using low-power communication protocols may be able to send messages across the entire smart-home environment 100 as well as over the Internet 162 to the central server or cloud-computing system 164. The mesh network may enable the central server or cloud-computing system 164 to regularly receive data from all of the network-connected smart devices in the smart-home environment, make inferences based on the data, and/or send commands back to individual one(s) of the network-connected smart devices to accomplish some of the home-security objectives described herein. For example, in the event the home-security system is armed and one of the nodes, either low- or high-power, detects movement, then the node can send a corresponding message through the mesh network to the central server or cloud-computing system 164, which may process the message and determine the appropriate response, such as contacting authorities and/or the home owner as well as instructing the network-connected smart devices to enter an alarm mode, which may involve activating lights, sounding audible alarms, etc.

As described, the spokesman nodes and some of the low-powered nodes may be capable of "listening". Accordingly, users, other devices, and the central server or cloud-computing system 164 can communicate controls to the low-powered nodes. For example, a user can use a portable electronic device (e.g., a smartphone) 166 to send commands over the Internet to the central server or cloud-computing system 164, which then may relay the commands to the spokesman nodes in the smart-home environment 100. The spokesman nodes may drop down to a low-power protocol to communicate the commands to the low-power nodes throughout the smart-home environment, as well as to other spokesman nodes that did not receive the commands directly from the central server or cloud-computing system 164. In some embodiments, the low-powered nodes and the spokesman nodes may be the same type of device (e.g., hazard detector, thermostat, wall plug, etc.). In some embodiments, the low-powered and spokesman nodes may be identical. For example, in some embodiments, all of the low-powered and spokesman nodes may have the same stock-keeping unit (SKU) and/or are capable of performing any role, such as performing the role of low-powered and/or spokesman node.

Examples of spokesman nodes may include smart doorbells 106, smart thermostats 102, smart wall switches 108, smart wall plugs 110, keypads, doors 120, doorknobs 122, and/or the like. These devices 102, 106, 108, 110, 120, and 122 may be often located near and connected to a reliable power source, and therefore can include more power-consuming components, such as one or more communication chips capable of bidirectional communication in any variety of protocols.

An example of a low-power node may be a smart light 170. According to embodiments, the light 170 may house a light source having variable intensity. Further, according to embodiments, the color of the light emitted from light 170 may be changeable. In addition to housing a light source, smart light 170 may house an occupancy sensor, such as an ultrasonic or passive IR sensor, and an ambient light sensor, such as a photoresistor or a single-pixel sensor that measures light in the room. In some embodiments, smart light 170 may be configured to activate the light source when its ambient light sensor detects that the room is dark and/or when its occupancy sensor detects a person's presence or movement. Smart light 170 may be configured to adjust the color and intensity of the light source. Smart light 170 may include a low-power wireless communication chip (e.g., ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., network-connected smart device to network-connected smart device) within the smart-home environment 100 as well as over the Internet 162 to the central server or cloud-computing system 164.

Yet another example of a low-powered node is a battery-operated version of the smart hazard detector 104. These smart hazard detectors 104 may be often located in an area without access to constant and reliable power and may include any number and type of sensors, such as smoke/fire/heat sensors, carbon monoxide/dioxide sensors, occupancy/motion sensors, ambient light sensors, temperature sensors, humidity sensors, and the like. Furthermore, smart hazard detectors 104 may include a low-power wireless communication chip (e.g., ZigBee chip) that regularly sends messages that correspond to each of the respective sensors to the other network-connected smart devices and the central server or cloud-computing system 164, such as by using the mesh network as described above.

According to embodiments, the network-connected devices (a.k.a. the low- and high-power nodes) of the smart-home environment 100 may be capable of enhancing home security. For example, all or some of the network-connected smart devices may be equipped with motion sensing, heat sensing, pressure sensing, noise sensing, or other types of sensing capabilities that combine with rules-based inference engines and/or artificial intelligence of the central server or cloud-computing system 164 to detect the presence, movement, and/or identity of people, animals, and objects and trigger various alarms in the event a person, animal, or object is in the wrong place at the wrong time anywhere inside or in the curtilage of the smart-home environment 100.

By virtue of network connectivity, a user can remotely interact with one or more of the network-connected smart devices. For example, a user can communicate with one or more of the network-connected smart devices using a computer (e.g., a desktop computer, laptop computer, or tablet) or other portable or any other suitable type of user electronic device (e.g., a smartphone) 166. A webpage or app can be configured to receive communications from the user and control the one or more of the network-connected smart devices based on the communications and/or to present information about the device's operation to the user. For example, the user can view, arm, or disarm the security system of the home. The user can be in the structure during this remote communication or outside the structure.

Users can control one or more of the network-connected smart devices in the smart-home environment 100 using a network-connected computer or portable electronic device 166. In some examples, some or all of the occupants (e.g., individuals who live in the home) can register their device 166 with the smart-home environment 100. Such registration can be made at a central server to authenticate the occupant and/or the device 166 as being associated with the smart-home environment 100, and to give permission to the occupant to use the device 166 to control the network-connected smart devices and the security system of the smart-home environment 100. An occupant can use their registered device 166 to remotely control the network-connected smart devices and security system of the smart-home environment 100, such as when the occupant is at work or on vacation. The occupant may also use their registered device 166 to control the network-connected smart devices when the occupant is actually located inside the smart-home environment 100, such as when the occupant is sitting on a couch inside the home or in a bedroom preparing for sleep.

It should be appreciated that instead of or in addition to registering devices 166, the smart-home environment 100 may be configured to make inferences about which individuals live in the home and are therefore occupants and which devices 166 may be associated with those individuals. As such, the smart-home environment may "learn" who is an occupant and may permit the devices 166 associated with those individuals to control the network-connected smart devices of the smart-home environment 100. Various types of notices and other information may be provided to occupants via messages sent to the occupants' devices 166 and other electronic devices. It should be appreciated that these messages can be sent via email, short message service (SMS), multimedia messaging service (MMS), unstructured supplementary service data (USSD), as well as any other type of messaging services and/or communication protocols now known or hereinafter developed, including any type of push notification service.

In some instances, guests may desire to control the smart devices. For example, the smart-home environment may receive communication from an unregistered device of an individual inside of the home, where the individual is not recognized as an occupant of the home. Further, for example, smart-home environment may receive communication from a mobile device of an individual who is determined to be or who is registered as a guest.

According to embodiments, a guest-layer of controls can be provided to guests of the smart-home environment 100. The guest-layer of controls may give guests access to basic controls (e.g., a judicially selected subset of features of the smart devices), such as temperature adjustments or ingress/egress through smart doors, but it may lock out other functionalities. The guest layer of controls can be thought of as a "safe sandbox" in which guests have limited controls, but they do not have access to more advanced controls that could fundamentally alter, undermine, damage, or otherwise impair the occupant-desired operation of the smart devices. For example, the guest layer of controls won't permit the guest to adjust a heat-pump lockout temperature.

A use case example of this is when a guest in a smart-home, the guest could walk up to the thermostat and turn the dial manually, but the guest may not want to walk the house "hunting" for the thermostat, especially at night while the home is dark and others are sleeping. Further, the guest may not want to go through the hassle of downloading a necessary application to their device for remotely controlling the thermostat. In fact, the guest may not have access to the home owner's login credentials, etc., and therefore may not be enabled to remotely control the thermostat via such an application. Accordingly, the guest can open a mobile browser on their mobile device, type a keyword, such as "NEST" into the URL field and tap "Go" or "Search", and/or the like. In response the device presents with guest with a user interface, such as Thermozilla UI, which may allow the guest to move the target temperature between a limited range, such as 65 and 80 degrees Fahrenheit. The user interface provides a guest layer of controls that are limited to basic functions. The guest cannot change the target humidity, modes, or view energy history.

According to embodiments, to enable guests to access the user interface that may provide the guest layer of controls, a local webserver is provided that is accessible in the local area network (LAN). It may not require a password, because physical presence inside the home may be established reliably enough by the guest's presence on the LAN. In some embodiments, during installation of the smart device, such as the smart thermostat, the home owner may be asked if they want to enable a Local Web App (LWA) on the smart device. Business owners will likely say no; home owners will likely say yes. When the LWA option is selected, the smart device may broadcast to the LAN that the above referenced keyword, such as "NEST", is now a host alias for its local web server. Thus, no matter whose home a guest goes to, that same keyword (e.g., "NEST" may always be the URL you use to access the LWA, provided the smart device is purchased from the same manufacturer. Further, according to embodiments, if there is more than one smart device on the LAN, the second and subsequent smart devices may not offer to set up another LWA. Instead, they may register themselves as served and/or selected candidates with the master LWA. And in this case, the LWA user may be asked which smart device they want to change the temperature on before getting the simplified user interface, such as Thermozilla UI, for the particular smart device they choose.

According to embodiments, a guest layer of controls may also be provided to users by mechanism(s) other than a device 166. For example, the smart device, such as a smart door, may be equipped with walkup-identification technology (e.g., face recognition, RFID, ultrasonic sensors) that "fingerprints" or creates a "signature" for the occupants of the home. In operation, when a person who does not live in the home or is otherwise not registered with or whose fingerprint or signature is not recognized by the smart-home "walks up" to a smart device, the smart device may provide the guest with the guest layer of controls, rather than full controls.

The smart thermostat and smart door and other smart devices may "learn" by observing occupant behavior. For example, the smart thermostat may learn occupants preferred temperature set-points for mornings and evenings, and it may learn when the occupants are asleep or awake, as well as when the occupants are typically away or at home, for example. In some embodiments, when a guest controls the smart devices, such as the smart thermostat, the smart devices may not "learn" from the guest. This may prevent the guest's adjustments and controls from affecting the learned preferences of the occupants.

A smart television remote control may be provided. The smart remote control may recognize occupants by thumbprint, visual identification, RFID, etc., and it recognizes users as guests or as someone belonging to a particular class having limited control and access (e.g., a child). Upon recognizing the user as a guest or someone belonging to a limited class, the smart remote control may only permit that user to view a subset of channels and to make limited adjustments to the settings of the television and other devices. For example, a guest cannot adjust the digital video recorder (DVR) settings, and a child may be limited to viewing child-appropriate programming. According to some embodiments, similar controls may be provided for other instruments, utilities, and devices in the house. For example, sinks, bathtubs, and showers can be controlled by smart spigots that recognize users as guests or as children and therefore may prevent water from exceeding a designated temperature that is considered safe.

According to embodiments, the network-connected smart devices of the smart-home environment 100 may be modular and can be incorporated into older and new houses. For example, the devices may be designed around a modular platform including two basic components: a head unit and a backplate, which may be also referred to as a docking station. Multiple configurations of the docking station may be provided so as to be compatible with any home, such as older and newer homes. However, all of the docking stations may include a standard head-connection arrangement, such that any head unit can be removably attached to any docking station. Thus, in some embodiments, the docking stations may be interfaces that serve as physical connections to the structure and the voltage wiring of the homes (e.g., door hinges or other interfaces between a door body 124 and a door frame 130), and the interchangeable head units (e.g., door body 124) may contain all of the sensors, processors, user interfaces, the batteries, and other functional components of the devices.

Many different commercial and functional possibilities for provisioning, maintenance, and upgrade are possible. For example, after years of using any particular head unit, a user may be able to buy a new version of the head unit and simply plug it into the old docking station. There may be also many different versions for the head units, such as low-cost versions with few features, and then a progression of increasingly-capable versions, up to and including extremely fancy head units with a large number of features. Thus, it should be appreciated that the various versions of the head units can all be interchangeable, with any of them working when placed into any docking station. This can advantageously encourage sharing and re-deployment of old head units—for example, when an important high-capability head unit, such as a hazard detector, is replaced by a new version of the head unit, then the old head unit can be re-deployed to a backroom or basement, or the like. According to embodiments, when first plugged into a docking station, the head unit can ask the user (by 2D LCD display, 2D/3D holographic projection, voice interaction, etc.) a few simple questions such as, "Where am I" and the user can indicate "living room", "kitchen" and so forth.

Some of these modular smart devices may have security-enhancing features that may trigger a notification or an alarm in the event the head is removed from the docking station. For example, as discussed, some smart devices may be capable of detecting motion and function as "tripwires" in the security system. Others may provide live video feeds and function as security cameras. In the event an intruder attempts to disable a network-connected smart device and therefore avert detection by removing the smart device's head unit from its docking station, an alarm or alert notification may be is triggered. For example, the smart device may send a message indicating head unit removal to the central server or cloud-computing system 164. Responsive to receiving a message indicating head unit removal, the central server or cloud-computing system 164, according to embodiments, may send a message to the home owner's or other occupants' device(s) 166, indicating the removal and asking whether the removal is authorized. If no response after a timeout period or if the response indicates that removal was not authorized, then the central server or cloud-computing system 164 may trigger the alarm. In other embodiments, such as when the alarm is armed (i.e., in security mode), the alarm may be triggered immediately upon removal of the head unit. The alarm may be local on the head unit itself and therefore an alert sound is broadcasted from the head unit, or may be centralized and controlled by the central server or cloud-computing system 164 and the other network-connected smart devices are instructed to broadcast an alert sound. In still other embodiments, upon removal, the head unit may ask the person to verbally identify themselves and, if the voice is not recognized, then the alarm may be triggered.

The smart-home environment 100 may also include communication with devices outside of the smart-home environment 100 but within a proximate geographical range of the home, such as within the home's curtilage. For example, the smart-home environment 100 may include an outdoor lighting system 114 that communicates information through the mesh network or directly to the central server or cloud-computing system 164 regarding detected movement and/or presence of people, animals, and any other objects and receives back commands for controlling the lighting accordingly. The central server or cloud-computing system 164 can control the outdoor lighting system 114 based on information received from the other network-connected smart devices in the smart-home environment. For example, in the event any of the network-connected smart devices, such as smart wall plugs 110 located outdoors, detect movement at night time, the central server or cloud-computing system 164 can "turn on" the outdoor lighting system 114 as well as other lights in the smart-home environment 100. This may be advantageous because the motion-detection capability may not be limited to just the motion sensor attached to the light itself, but extends across all the network-connected smart devices in the smart-home environment 100.

The smart-home environment 100 may include a gated entry 116 as a type of smart door that may communicate information through the mesh network or directly to the central server or cloud-computing system 164 regarding detected movement and/or presence of people, animals, and any other objects and receives back instructions for controlling the gated entry, such as opening, closing, locking, and/or unlocking the gate. According to embodiments, an algorithm may be provided for considering the geographic location of the smart-home environment 100, such as based on the zone improvement plan ("ZIP") code or geographic coordinates of the home. The geographic information may be then used to obtain data helpful for determining optimal times for turning on/off or otherwise adjusting lighting as well as opening, closing, locking, unlocking gates or other types of smart doors or otherwise securing the smart-home environment 100.

In some embodiments, low-powered and spokesman nodes (e.g., devices 102, 104, 106, 108, 110, 112, 113, 120, and 170) can function as "tripwires" for an alarm system in the smart-home environment. For example, in the event a perpetrator circumvents detection by alarm sensors located at windows, doors, and other entry points of the smart-home environment 100, the alarm could be triggered upon receiving an occupancy, motion, heat, sound, or the like message from one or more of the low-powered and spokesman nodes in the mesh network. For example, upon receiving a message from a smart light 170 indicating the presence of a person, the central server or cloud-computing system 164 or some other device could trigger an alarm, provided the alarm is armed at the time of detection. Thus, the alarm system could be enhanced by various low-powered and spokesman nodes located throughout the smart-home environment 100. In this example, a user could enhance the security of the smart-home environment 100 by buying and installing extra smart lights 170.

In some embodiments, the mesh network can be used to automatically turn on and off lights as a person transitions from room to room. For example, the low-powered and spokesman nodes (e.g., devices 102, 104, 106, 108, 110, 112, 113, 120, and 170) detect the person's movement through the smart-home environment and communicate corresponding messages through the mesh network. Using the messages that indicate which rooms are occupied, the central server or cloud-computing system 164 or some other device may activate and deactivate the smart wall switches 108 to automatically provide light as the person moves from room to room in the smart-home environment 100. Further, users may provide pre-configuration information that indicates which smart wall plugs 110 provide power to lamps and other light sources, such as the smart nightlight 170. Alternatively, this mapping of light sources to wall plugs 110 can be done automatically (e.g., the smart wall plugs 110 detect when a light source is plugged into it, and it sends a corresponding message to the central server or cloud-computing system 164). Using this mapping information in combination with messages that indicate which rooms are occupied, the central server or cloud-computing system 164 or some other device may activate and deactivate the smart wall plugs 110 that provide power to lamps and other light sources so as to keep a record of the person's movement and provide light as the person moves from room to room.

Additionally or alternatively, such record keeping may be operative to inform a smart door of a user's approach to a door in order to operate the door in one or more ways (e.g., unsealing the door in anticipation of potential use by the user for passing through the door frame passageway).

In some embodiments, the mesh network of low-powered and spokesman nodes can be used to provide exit lighting in the event of an emergency, such as an earthquake, a fire, a detected home invasion, dangerous CO levels, and/or the like. In some instances, to facilitate this, users may provide pre-configuration information that indicates exit routes in the smart-home environment 100. For example, for each room in the house, the user may provide a map of an effective and/or efficient exit route. It should be appreciated that instead of a user providing this information, the central server or cloud-computing system 164 or some other device could automatically determine the routes using uploaded maps, diagrams, architectural drawings of the smart-home environment, as well as using a map generated based on positional information obtained from the nodes of the mesh network (e.g., positional information from the devices is used to construct a map of the house). In operation, when an alarm is activated (e.g., when one or more of the smart hazard detector 104 detects smoke and activates an alarm), the central server or cloud-computing system 164 or some other device uses occupancy information obtained from the low-powered and spokesman nodes to determine which rooms are occupied and then turns on lights (e.g., nightlights 170, wall switches 108, wall plugs 110 that power lamps, etc.) along the exit routes from the occupied rooms so as to provide emergency exit lighting. It should also be appreciated that all or some of the network-connected smart devices, including the smart hazard detector 104 and the smart thermostat 102, include a light that is activated to help occupants evacuate the home. Additionally, in the event of an emergency, such as earthquake or fire, an audible alarm can be sounded in the home giving information about the event. Also, a message, such as an SMS or MMS message, may be sent to the mobile device of the occupants. Also, a smart door may be configured to prepare for providing appropriate passage to a user or appropriate elements (e.g., smoke, etc.) based on the occupancy information and/or alarm type (e.g., in order to operate the door in one or more ways (e.g., unsealing the door in anticipation of potential use by the user for passing through the door frame passageway during the emergency or for passing smoke out through any suitable ventilation features of the door)).

Technologies by which a localized-thermostat service robot 168 (and/or the larger smart-home system of FIG. 1) can identify and locate the occupant whose personal-area space is to be kept at a comfortable temperature can include, but are not limited to, RFID sensing (e.g., person having an RFID bracelet, RFID necklace, or RFID key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., person wearing an infrared or NFC-capable smartphone), along with rules-based inference engines or artificial intelligence techniques that draw useful conclusions from the sensed information (e.g., if there is only a single occupant present in the home, then that is the person whose immediate space should be kept at a comfortable temperature, and the selection of the desired comfortable temperature should correspond to that occupant's particular stored profile). Robot 168 or device 166 or otherwise may communicate with smart door 120 or HVAC 103 or the like to adjust an amount of air or otherwise to pass into a space of the occupant or out away from the space of the occupant.

Figure 2:
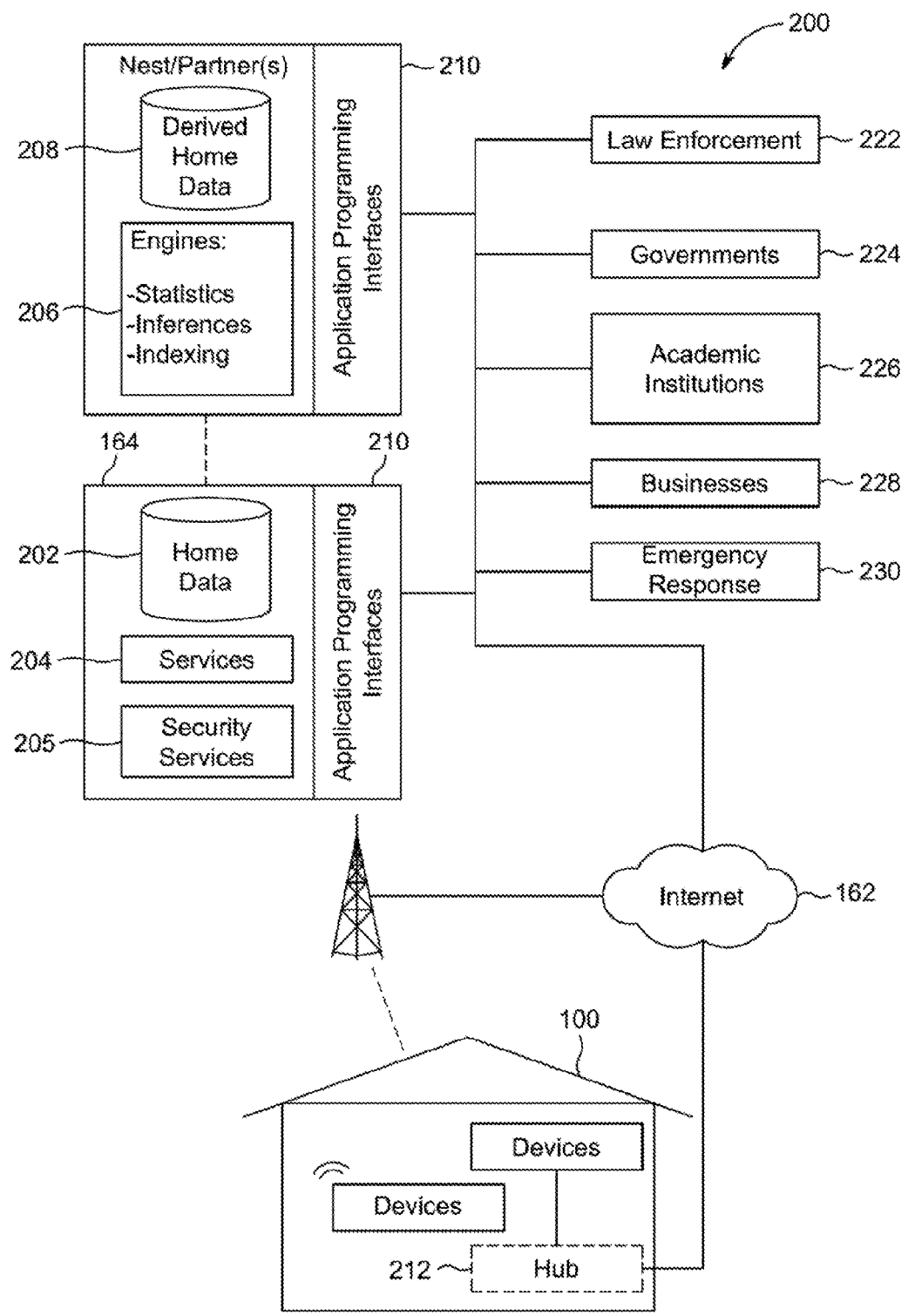
FIG. 2 illustrates a network-level view of an extensible devices and services platform with which the smart-home environment of FIG. 1 can be integrated, according to at least one embodiment.

FIG. 2 illustrates a network-level view of an extensible devices and services platform 200 with which a plurality of smart-home environments, such as the smart-home environment 100 of FIG. 1, can be integrated. The extensible devices and services platform 200 may include remote servers or cloud computing architectures 164. One, some, or each of the network-connected smart devices from FIG. 1 can communicate with the remote servers or cloud computing architectures 164. For example, a connection to the Internet 162 can be established either directly (e.g., using 3G/4G/5G connectivity to a wireless carrier), through a hubbed network 212 (e.g., using a scheme ranging from a simple wireless router, for example, up to and including an intelligent, dedicated whole-home control node), or through any combination thereof.

Although in some examples provided herein, devices and services platform 200 may communicate with and collect data from the network-connected smart devices of smart-home environment 100 of FIG. 1, it should be appreciated that devices and services platform 200 may communicate with and collect data from a plurality of smart-home environments across the world. For example, central server or cloud-computing system 164 can collect home data 202 from the network-connected devices of one or more smart-home environments, where the network-connected devices can routinely transmit home data or can transmit home data in specific instances (e.g., when a device queries the home data 202). Thus, devices and services platform 200 may routinely collect data from homes across the world. As described, collected home data 202 may include, for example, security data, such as a map of the home and the respective network-connected smart devices and their capabilities in each room, alarm settings information, contact information for the registered occupants of the home, and/or the like. The collected home data 202 may also include, for example, power consumption data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, and/or the like.

Central server or cloud-computing architecture 164 can further provide one or more services 204, such as security related services described herein. Services 204 can include software updates, customer support, remote access, remote or distributed control, use suggestions (e.g., based on collected home data 202 to improve performance, reduce utility cost, etc.), and/or sensor data collection/logging, where sensor data and other data from network-connected smart devices of smart-home environments 100 may be collected and logged. For example, the data collected and logged may include maps of homes, maps of users' in-home movements from room to room as determined by network-connected smart devices equipped with motion and/or identification technology, time spent in each room, intra-home occupancy maps that indicate which rooms are occupied and by whom at different times (e.g., including in real time), fire-detection incidents, false alarms, CO data, temperature data, humidity data, and/or the like. According to embodiments, in the event the data collected from the network-connected smart devices of a smart-home environment 100 indicates that an alarm threshold for a particular home is being approached, services 204 may increase the frequency at which it collects and logs data from network-connected devices in that home. For example, in the event the data collected from network-connected devices indicates activity in a kitchen of a smart-home environment 100 while the occupants are asleep, then, instead of collecting data from the network-connected smart devices of the home in thirty-second intervals, the services 204 may collect data in ten-second intervals. According to embodiments, the data collected and logged may be provided to investigators after the occurrence of a crime, fire, and/or the like, so that the data may be used to solve the crime, determine the cause of the fire, and/or the like.

Services 204 can further include, for example, remote access, remote or distributed control, security improvement suggestions (e.g., provide suggestions for enhancing security of a home based on collected home data 202, etc.), software updates, customer support, etc. Data associated with services 204 can be stored and/or logged at the central server or cloud-computing system 164 and central server or cloud-computing system 164 can retrieve and transmit the data at an appropriate time (e.g., at regular intervals, upon receiving request from a user, and/or the like).

As illustrated in FIG. 2, an embodiment of extensible devices and services platform 200 may include a processing engine 206, which can be concentrated at a single server or distributed among several different computing entities without limitation. Processing engine 206 can include engines that may be configured to receive data from network-connected smart devices of smart-home environments (e.g., via the Internet or a hubbed network), to index the data, to analyze the data and/or to generate statistics based on the analysis or as part of the analysis. The analyzed data can be stored as derived home data 208.

Results of the analysis or statistics can thereafter be transmitted back to the network-connected smart device(s) that provided home data used to derive the results, to other network-connected smart devices, to a user device 166, to a server providing a webpage to the user's device 166, or to other non-device entities. For example, patterns and statistics summarizing data received from network-connected smart devices can be generated by processing engine 206 and transmitted. The results or statistics can be provided via the Internet 162. In this manner, processing engine 206 can be configured and programmed to derive a variety of useful information from home data 202. A single server can include one or more engines.

The derived data can be highly beneficial at a variety of different granularities for a variety of useful purposes, ranging from explicit programmed control of network-connected smart devices on a per-home, per-neighborhood, or per-region basis (e.g., demand-response programs for electrical utilities, security related statistics unique to particular neighborhoods can be used to control particular network-connected smart devices, and/or the like), to the generation of inferential abstractions that can assist on a per-home basis (e.g., an inference can be drawn that the homeowner has left for vacation and so security detection equipment can be put on heightened sensitivity), to the generation of statistics and associated inferential abstractions that can be used for government or charitable purposes. For example, processing engine 206 can generate statistics about network-connected smart device usage across a population of devices and send the statistics to device users, service providers or other entities (e.g., that have requested or may have provided monetary compensation for the statistics).

To encourage security-related innovation and research and to increase security-related and other products and services available to users, devices and services platform 200 may expose a range of application programming interfaces (APIs) 210 to third parties, such as law enforcement agencies 222 (e.g., police or public and/or private security entities), governmental entities 224 (e.g., Health and Safety Agencies, such as the Food and Drug Administration (FDA), the Environmental Protection Agency (EPA), and/or the like), academic institutions 226 (e.g., university researchers), businesses 228 (e.g., private security businesses or charities or utility companies or companies that may provide device warranties or service to related equipment, serving and/or selecting advertisers based on home data, and/or the like), emergency response providers 230, such as fire and ambulance, and other third parties. APIs 210 may be coupled to and permit third-party systems to communicate with central server or the cloud-computing system 164, including services 204, processing engine 206, home data 202, and derived home data 208. For example, APIs 210 may allow applications executed by the third parties to initiate specific data processing tasks that are executed by central server or cloud-computing system 164, as well as to receive dynamic updates to home data 202 and derived home data 208.

For example, third parties can develop programs and/or applications, such as web or mobile apps, that integrate with the central server or the cloud-computing system 164 to provide services and information to users. Such programs and applications may be, for example, designed to help users reduce energy consumption, to preemptively service faulty equipment, to prepare for high service demands, to keep a record of past service performance, and/or the like, or to secure their homes by performing any of a variety of beneficial functions or tasks now known or hereinafter developed. Examples include providing users with local crime news, information and statistics, safety tips and check lists, such as tips for installing security lights, door and window locks, and/or the like.

Third-party applications may make inferences from home data 202 and/or derived home data 208, where such inferences may include when are occupants home, when are they sleeping, when are they in the den watching television, when they shower, and/or the like. The answers to these questions may help third-parties benefit consumers by providing them with interesting security-related information, products and services, as well as with providing them with served and/or selected advertisements. In one example, a private security company may create an application that makes inferences regarding when people are away from home. The application may use the inferences to schedule private security officers to stop or drive by the home when people will most likely be away from home, the application may also put the user's network-connected smart devices in alarm mode, notify trusted neighbors that the user is away, and/or the like.

In one example, a business 228 may be a shipping company that may create an application that makes inferences regarding when people are at home. The application may use the inferences to schedule deliveries for times when people will most likely be at home. The application can also build delivery routes around these scheduled times. This may reduce the number of instances where the shipping company has to make multiple attempts to deliver packages, and it may reduce the number of times consumers have to pick up their packages from the shipping company.

Devices and services platform 200 may expose APIs 210 to third parties, such as businesses 228 in exchange for revenue, such as for a monthly fee, similar to a subscription service. In one example, business 228 may be a retail store that sells consumer products and building and construction supplies and materials, including the network-connected smart devices described above with reference to FIG. 1. In one example, the retail store 228 may agree to sell network-connected smart devices at discount in exchange for free or discounted access to APIs 210. The retail store 228 can use the information from APIs 210 to better serve and/or select their customers and increase sales, while the provider of devices and services platform 200 may benefit from a proliferation of discounted network-connected smart devices.

Figure 3:
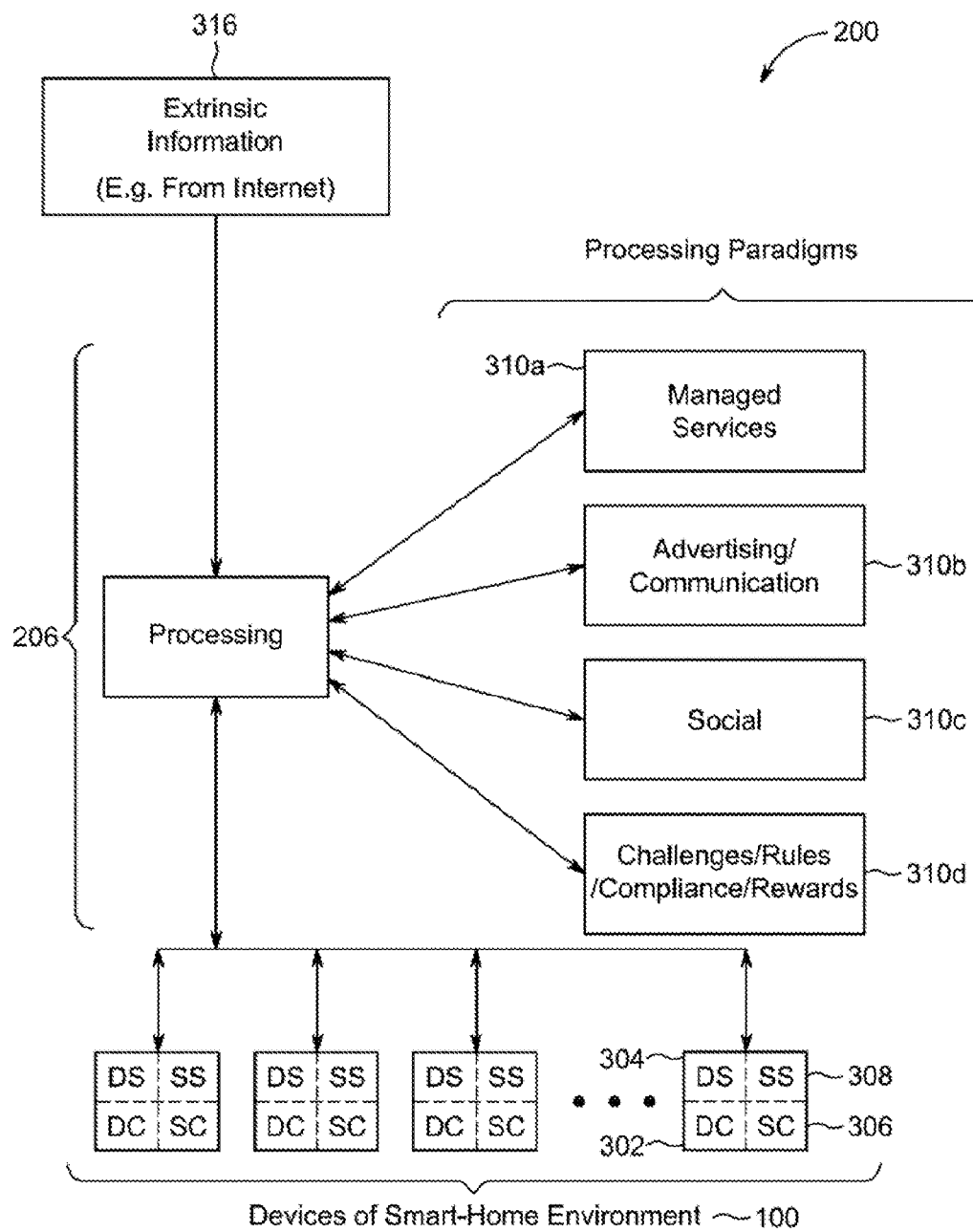
FIG. 3 illustrates an abstracted functional view of the extensible devices and services platform of FIG. 2, with reference to a processing engine as well as devices of the smart-home environment of FIG. 1, according to at least one embodiment.

FIG. 3 illustrates an abstracted functional view of extensible devices and services platform 200 of FIG. 2, with particular reference to processing engine 206 as well as devices, such as the network-connected smart devices of smart-home environment 100 of FIG. 1. Even though network-connected smart devices situated in smart-home environments may have an endless variety of different individual capabilities and limitations, they can all be thought of as sharing common characteristics in that each of them may be a data consumer 302 (DC), a data source 304 (DS), a services consumer 306 (SC), and a services source 308 (SS). Advantageously, in addition to providing essential control information needed for the devices to achieve their local and immediate objectives, extensible devices and services platform 200 can also be configured to harness the large amount of data that may be flowing out of these devices. In addition to enhancing or improving or optimizing the actual operation of the devices themselves with respect to their immediate functions, extensible devices and services platform 200 can be directed to "repurposing" that data in a variety of automated, extensible, flexible, and/or scalable ways to achieve a variety of useful home security/smart-home objectives. These objectives may be predefined or adaptively recognized based on any suitable characteristics (e.g., usage patterns, device efficiency, and/or user input (e.g., requesting specific functionality, manually inputting specific data, etc.)).

For example, FIG. 3 shows processing engine 206 as including a number of paradigms 310. Processing engine 206 can include a managed services paradigm 310a that may keep a record of and manage primary or secondary device functions. The device functions can include ensuring proper operation of a network-connected smart device given user inputs, detecting (e.g., and responding to) an intruder that has entered or is attempted to enter a dwelling (e.g., security), implementing or otherwise responding to energy demand response events, detecting a failure of equipment coupled to a network-connected smart device (e.g., a light bulb having burned out, passive IR sensor having gone bad, and/or the like), or alerting a user of a current event or predicted future events.

Processing engine 206 can further include an advertising/communication paradigm 310b that may estimate characteristics (e.g., demographic information, time spent doing particular activities like cooking or watching television, and/or the like), desires and/or products of interest of a user based on device usage and/or data received from network-connected smart devices. Services, promotions, products or upgrades can then be offered or automatically provided to the user. Processing engine 206 can further include a social paradigm 310c that may use information from a social network, provides information to a social network (e.g., based on device usage), and/or processes data associated with user and/or device interactions with the social network platform. For example, a user's status as reported to their trusted contacts on the social network could be updated to indicate when they are home or away based on light detection, security system inactivation or device usage detectors. As another example, a user may be able to share device-usage statistics with other users. As yet another example, a user may share HVAC settings that result in low power bills and other users may download the HVAC settings to their smart thermostat 102 to reduce their power bills.

Processing engine 206 can include a challenges/rules/compliance/rewards paradigm 310d that may inform a user of challenges, competitions, rules, compliance regulations and/or rewards and/or that uses operation data to determine whether a challenge has been met, a rule or regulation has been complied with and/or a reward has been earned. The challenges, rules or regulations can relate to efforts to conserve energy, improve security in the home (e.g., regularly lock door, install adequate number of motion detectors or outdoor lights, and/or the like), to live safely (e.g., reducing exposure to toxins or carcinogens), to conserve money and/or equipment life, to improve health, and/or the like. For example, one challenge may involve participants turning down their thermostat by one degree for one week, or achieving a certain "security score" by properly equipping their home with security devices and services and properly using and maintaining those devices. Those that successfully complete the challenge may be rewarded, such as by coupons, virtual currency, status, and/or the like. Regarding compliance, an example may involve a parent making a safety and security rule that children are not permitted to leave the home alone after a specified curfew, such as 9:00 PM. The network-connected smart devices in the home could keep a record of the movement of the various occupants and send alerts to the parent when a child leaves the home alone after the curfew or when the child is away from home after the curfew. Regarding compliance, another example may involve a rental-property owner making a rule that no renters are permitted to access certain owner's rooms. The devices in the room having occupancy sensors or the like (e.g., each smart door 120 to the room) could send updates to the owner when the room is accessed.

Processing engine 206 can integrate or otherwise utilize extrinsic information 316 from extrinsic sources (e.g., via the Internet, such as weather forecasts, prices of certain goods/services, neighborhood/home information, and/or the like) to improve the functioning of one or more processing paradigms. Extrinsic information 316 can be used to interpret data received from a network-connected smart device, to determine a characteristic of the environment near the device (e.g., outside a structure in which the device is enclosed), to determine services or products available to the user, to identify a social network or social-network information, to determine contact information of entities (e.g., public-service entities such as an emergency-response team, the police or a hospital) near the device, and/or the like, to identify statistical or environmental conditions, trends or other information associated with a home or neighborhood, and so forth.

An extraordinary range and variety of benefits can be brought about by, and fit within the scope of, extensible devices and services platform 200, ranging from the ordinary to the profound. Thus, in one "ordinary" example, each bedroom of smart-home environment 100 can be provided with a smart wall switch 108, a smart wall plug 110, one or more doors 120, and/or smart hazard detectors 104, all or some of which include an occupancy sensor, wherein the occupancy sensor is also capable of inferring (e.g., by virtue of motion detection, facial recognition, audible sound patterns (e.g., voice detection), etc.) whether the occupant is asleep or awake. If a home intruder is detected, the remote security service or police department may be advised of how many occupants there are in each bedroom, and whether those occupants are still asleep (or immobile), and the real time location of the intruder in the home. Further, video from the home can be broadcasted to video-capable devices of the nearest security personnel and police so that the police can keep a record of and/or measure and/or analyze the activity in the home while in route to the home. By way of another example, the same data that may be used for home security can also be "repurposed" by the processing engine 206 in the context of a social paradigm of neighborhood security. Thus, for example, the same data discussed in the example above can be collected and made available for processing (e.g., when properly sanitized for privacy purposes) in which the crime patterns and home safety in a particular ZIP code can be recorded and/or measured and/or analyzed. If a serious fire event is sensed, the remote security service or fire department may be advised of how many occupants there are in each bedroom, and whether those occupants are still asleep (or immobile) or whether they have properly evacuated the bedroom and those devices may automatically function in a particular way to help address the emergency and/or allow the remote security department to manually adjust such functionality (e.g., adjust a venting functionality of one or more smart doors). While this is, of course, a very advantageous capability accommodated by the described extensible devices and services platform, there can be substantially more "profound" examples that can truly illustrate the potential of a larger "intelligence" that can be made available. By way of perhaps a more "profound" example, the same bedroom occupancy data that may be used for fire safety can also be "repurposed" by processing engine 206 in the context of a social paradigm of neighborhood child development and education. Thus, for example, the same bedroom occupancy and motion data discussed in the "ordinary" example can be collected and made available for processing (e.g., as properly sanitized for privacy purposes) in which the sleep patterns of certain types of persons in a particular ZIP code can be determined and recorded. Localized variations in the sleeping patterns of the certain types of persons may be determined and correlated, for example, to different nutrition programs in local schools.

Devices and services platform 200 may provide a home security services 205 into which users can enroll their smart-home environments 100. Security services 205 can be offered on a non-commitment month-to-month basis. It should also be appreciated that security services 205 can be offered year-to-year or for lifetime. For example, security services 205 can provide multi-tiered offerings, including offer basic, plus, and premium services. Basic services, for example, may include basic intrusion detection and emergency personnel notification. For example, basic security services 205 may keep a record of and/or measure and/or analyze incoming data from the network-connected smart devices of the home to determine when a possible intrusion is occurring, as indicated by motion detection outside the home, information from the smart entry detectors indicating that any one of doors 120 or windows 182 of the home have been opened, and/or the like. Upon detection, basic security services 205 may contact the occupants of the home and/or local law enforcement. Plus security services 205, for example, may keep a record of and/or measure and/or analyze dangerous conditions in the home including smoke, CO, in addition to home invasion. Premium services 205 may include, for example, availing the home to the many benefits of "neighbor security networks", detecting when individuals in the home are in distress, mimicking user patterns of turning on lights and appliances when the user is on vacation, providing users with security scores and corresponding tips for improving the security of their home, providing live video stream of activity in the home to the user when the user is away and to local law enforcement, and/or the like.

In some embodiments, pricing for the security services or any suitable type of home insurance may vary depending on the security score of the home. A security score may be based on information such as having adequate numbers and placement of network-connected smart devices (e.g., hazard detectors, entry detectors, and/or the like), percentage of smart devices that have WiFi (e.g., rather than low-power communication protocols), percentage of smart devices that are wired (e.g., rather than battery powered), number of strangers that visit the home, and/or the like. The higher the security score of the home, the more secure the home and the cheaper the security services and/or insurance may be. Devices and services platform 200, according to embodiments, may provide suggestions regarding how to improve security scores and, to incent users to improve their home's score, platform 200 may also indicate what discounts the user may receive if the user's home achieves a particular score.

Upon receiving an enrollment request from a user, devices and services platform 200 may determine the capabilities of the network-connected smart devices in the user's home, and may determine whether the requested services are appropriate for the user. For example, if the user requests a premium service, such as the capability to broadcast live video stream to law enforcement, but the user only has but a couple of video enabled smart devices and/or a limited WiFi network, then devices and services platform 200 may recommend that the user upgrade the smart devices in the home or select more basic services.

In one security-related example, some or all of the network-connected smart devices may function as "tripwires" in the security system. In this example, in the event one of the network-connected smart devices detects motion, heat, sound, and/or the like, it sends a corresponding message through the mesh network (e.g., from network-connected smart device to network-connected smart-device) and, in some cases, over the Internet to central server or cloud-computing system 164, which may trigger an alarm if the security system is armed (e.g., the occupants are away or asleep). In this example, a user could enhance the security of the smart-home environment 100 by buying and installing extra network-connected smart devices, such as smart doors 120.

In another security-related example, some or all of the network-connected smart devices may be equipped with identification technology (e.g., face recognition, RFID, ultrasonic sensors) that may "fingerprint" or create a "signature" for the people, animals, and objects. Based on information received from the network-connected smart devices, central server or cloud-computing system 164 may store a list of registered occupants and/or guests of the home. When a person whose fingerprint or signature is not recognized by the central server or cloud-computing system 164 as a registered occupant or guest comes "within range" of, or otherwise interacts with, one of the network-connected smart devices of the home, such as a smart door 120, central server or cloud-computing system 164 may log that person's presence and, if the security system is armed, activates an alarm indicating the presence of an intruder. Further, central server or cloud-computing system 164 may reference maps of the smart-home environment and schedules to whether the detected person, animal, or object is permitted to be in a particular area (e.g., room of the house) at a particular time and trigger an alarm accordingly.

In yet another security-related example, occupant-location data (e.g., GPS data, IPS data, etc.) may be used to achieve home-security objectives. According to embodiments, the occupants of a home (e.g., the individuals who live in or frequently visit the home) may register their respective devices 166 as being associated with the home, and the central server or cloud-computing system 164 may keep a record of the occupants' movement inside and outside of the home based on occupant-location data received from devices 166. Central server or cloud-computing system 164 may use this record keeping information to make inferences regarding the current and future occupancy of the home and/or rooms, and to control the network-connected smart devices inside the home in a corresponding manner. For example, outdoor lights 114 can be turned on when it is determined that an occupant is returning home, or smart doorknobs 122 or any other portion of one or more doors 120 can be locked and the security system can be armed when the occupant is leaving home. Also for example, the threshold for notifying authorities of an emergency can be adjusted depending on whether an occupant having a registered device 166 is at home. For example, if the registered occupant is at home when an alarm condition (e.g., fire, distressed person, home invasion, and/or the like) is detected, a message can be sent to the occupant's device 166 requesting confirmation that everything is okay. The authorities may only be notified if the registered occupant responds confirming that there is an emergency or if the registered occupant does not respond within a timeout period. On the other hand, if an alarm condition is detected and there are not registered occupants at home, then the authorities may be immediately notified and a concurrent message is sent to the mobile devices 166 of the registered occupants.

It should also be appreciated that passive RFID tags (e.g., rather than or in addition to devices 166) can be used to determine the room-location of users (e.g., occupants, pets, and/or the like). For example, an RFID may be associated with each of the occupants of the house, such as by including the tags in wallets, bracelets, wristbands, mobile devices, collars, and/or the like. The network-connected smart devices in the various rooms may detect the RFID tags, and send that information to the central server or cloud-computing system 164.

According to some embodiments, users can use their registered devices 166 to access smart-home environment 100. For example, a smart doorknob 122 or any other portion of a smart door 120 or its associated devices and a device 166 may be capable of communicating via near field communication (NFC), Bluetooth, or some other short-ranger wireless protocol. To gain access to the home (e.g., cause a smart doorknob 122 or otherwise a door 120 to unlock), a device 166 of the user may transmit an access code to the smart doorknob 122 or door 120, which may then verify with server 164 that the person is a registered occupant.

Turning to another security-related example, the mesh network can be used to keep a record of a person's movement as the person transitions from room to room. As such, central server or cloud-computing system 164 may be operative to determine which room in the smart-home environment is occupied and by whom (e.g., using identification technology) at all times. For example, low-powered and spokesman nodes (e.g., network-connected smart devices 102, 104, 106, 108, 110, 112, 120, 122, and 170) may detect the person's movement through smart-home environment 100 and communicate corresponding messages through the mesh network. Using the messages that indicate which rooms are occupied, central server or cloud-computing system 164 may log the information for later use and/or instructs various smart devices in the home to perform certain operations, such as turn on and off lights, close and/or lock one or more particular smart doors 120, sound alarms, notify public safety authorities and the home owner, and/or the like, as the person enters and exits rooms.

According to embodiments, central server or cloud-computing system 164 can review the logged information about the occupants' movement in the home to detect signature patterns of movement unique to the various occupants. These signature patterns may help central server or cloud-computing system 164 detect strangers in the home. For example, if an individual is quickly moving from room-to-room at a time when occupants typically are not at home and according to a pattern that is not associated with any of the occupants, central server or cloud-computing system 164 may infer that this individual is a burglar moving from room to room searching for valuable items, and, for example, may automatically close and lock certain doors 120 that were previously open in order to better protect any occupants that are home.

According to embodiments, the smart-home environment may include a small cellular base station, such as a picocell or microcell. Such cellular base stations may provide great LTE, 3G, 4G, 5G, and/or the like data rates in the home and, in some cases, could replace or supplement WiFi. This base station could provide a cellular backup to call emergency personnel such as fire/police in the event of an emergency.

According to an embodiment, in moments of distress, the network-connected smart devices can broadcast a live video stream to registered users and/or nearby emergency personnel, such as police and fire departments. For example, upon detecting an intruder or some other emergency occurring in the home or upon someone pressing a panic button in the home, live video can be broadcast to nearby emergency personnel, such as police, fire, medical, and other first responders. The video, for example, may be transmitted from the room where the most activity is occurring or where the button was pressed. In some cases, the video may be transmitted directly to the police car that is responding to the call (e.g., the closest police car). It should be appreciated that, rather than broadcast, the video may be provided via a secure stream using secure sockets layer (SSL). It should also be appreciated that the security score of the home may be adjusted based on whether the home has the requisite SSL certificates in place to support the secure video stream to emergency personnel.

According to embodiments, some or all of the network-connected devices are equipped with pressure sensors, such as digital air pressure sensors, digital barometric pressure sensors, and/or the like. These pressure sensors may be, for example, resonant types that measure changes in air density, thermal types that measure changes in thermal conductivity of air, ionization types that measure changes in the flow of ions in air, and/or force collector types (e.g., bellow, diaphragm, piston, and/or the like) that measure deflection. One example security-related application for these pressure sensors may be to detect opening and closing of doors 120 as well as occupant movement in the house by sensing pressure variation patterns associated with such activities. For example, when a door 120 opens or closes, the pressure sensors of the network-connected smart devices may record the associated pressure variation. Central server and cloud-computing system 164, upon reviewing the recorded pressure variation, can determine the activity associated with the pressure variation. For example, pressure variation in a first range may indicate that an adult occupant walked through a doorway while transitioning from one room to another, while pressure in a second range may indicate that a particular door, internal or external, was opened or closed. Smart doors 120 may have any other suitable sensors or technology to detect if a door is open and by how much or closed or any other suitable information associated therewith.

According to embodiments, central server or cloud-computing system 164 may process artificial intelligence algorithms capable of making rules-based or learning-based inferences based on sensed patterns of user control of network-connected smart devices, optionally in conjunction with sensed home conditions or other sensed user behaviors. By way of example, for one embodiment, one or more of smart wall switches 108 may be configured to process information acquired by home occupancy sensing devices in conjunction with information from light-switch-control behaviors of the user to produce a result in which smart wall switches 108 may be automatically self-programmed to help the user turn off and on lights according to a preferred schedule, and to mimic the user's patterns when the user is away. This automatic self-programming can also be applied to smart wall plugs 110, which can learn when to turn on and off lamps 118 as well as appliances such as televisions and stereos. Further, it should be appreciated that all network-connected smart devices can automatically self-program.

In one example, the artificial intelligence algorithms can be configured to sense whether there have been a threshold number of days over the past month (or other evaluation period) for which, at roughly the same time of day ("X o'clock"), the user has locked the same or roughly the same set of doors 120 to secure the same or roughly the same rooms in the home. If such a pattern has been detected, the user can be sent a message on their device 166 allowing them to consent to or choose a setting in which one or more the relevant doors 120 may be automatically locked so as to secure the relevant rooms at about X-o'clock. It should be appreciated that the smart-home environment could learn and emulate other patterns. For example, it could learn when the dog barks, such as when a person is within 100 feet of the home or when an occupant returns home from work at about X o'clock, and then record and play back barking sounds at appropriate times. It should also learn when to open and close the garage door to give the appearance that the occupant is going and coming to and from the home, and/or the like A collection of smart-home sensors may be configured to automatically learn selected user behaviors, to assist the user with certain tasks when selected qualifying behaviors are observed, and to automatically stop providing such assistance when one or more straightforward undo actions are taken by the user. Additionally or alternatively, if such a pattern has been detected, central server and cloud-computing system 164 may make an inference that the user intends to leave the home soon. Responsive to this inference, the sensitivity of the network-connected smart devices can be increased in anticipation of the user's imminent departure from the home. For example, the threshold for triggering an alarm indicating a home invasion can be reduced and/or the threshold for detecting a user approaching a door 120 for leaving the home may be reduced.

"Mapping" smart-home environment 100 may provide a number of advantages. For example, informed by a map of smart-home environment 100, central server and cloud-computing system 164 can determine a distressed occupant's or an intruder's location in the home and notify emergency personnel regard the same. This enables emergency personnel to quickly find distressed people or intruders upon entering the home. In other examples, central server and cloud-computer system 164 may determine an emergency exit route for each room of the home. In the event an alarm is activated (e.g., when one or more of smart hazard detectors 104 detects smoke and activates an alarm), central server or cloud-computing system 164 may use occupancy information obtained from the network-connected smart devices in the home to determine which rooms are occupied and then turns on lights (e.g., lights 170, wall switches 108, wall plugs 110 that power lamps, and/or the like) and/or automatically open doors 120 along exit routes from the occupied rooms so as to provide emergency exit lighting and exit capabilities. These are just a few example advantages of mapping the home, and it should be appreciated that there are an unlimited number of advantages.

According to embodiments, mapping of the home can be done automatically. For example, a map may be generated based on positional information obtained from the nodes of the mesh network (e.g., positional information from the network-connected smart devices is used to construct a map of the house). According to this example, the individual network-smart devices obtain or determine their location upon being installed or at some other time, and send the location information to the central server or cloud computing system 164 or to a mapping application on device 166 of a user. For example, when installed, a network-connected smart device can ask the user (by 2D LCD display, 2D/3D holographic projection, voice interaction, and/or the like) a few simple questions such as, "Where am I" and the user can select "bedroom" or "living room" and so forth. In other examples, a smart device can provide the user with instructions, such as "Press button once if I am in the kitchen, press twice if I am in the den," and/or the like. Also, for example, the smart devices may be capable of determining their GPS coordinates and/or transmitting WiFi location or cellphone tower location information. Central server or cloud computing system 164 or the mapping application on a device 166 may use this information to automatically construct a map of the home. In some examples, a robot 168 may 'roam' free in the house and send mapping information to the application on device 166 or to central server or cloud-computing system 164, which may use the mapping information to construct a map of the home. For example, robot 168 could be put into a 'mapping' mode where it obtains location data as it moves along the walls of each room in the house, and then sends the location data to the application on device 166 or to central server or cloud-computing system 164, which may use the mapping information to construct a map of the home.

According to other embodiments, an indoor positioning system (IPS) could be used to map smart-home environment 100. For example, a user could launch a mapping application on device 166 that uses IPS to create a map of the home. In this case, the user may walk along the walls of the home and the mobile device would collect location information using IPS and/or other indoor localization techniques, and use that information to construct a map of the home or send the collected information to central server or could-computer system 164, which may create the map. It should be appreciated that instead of or in addition to using IPS and/or other indoor localization techniques, the application on device 166 could use the device's gyroscope, magnetometer, accelerometer, and altimeter to obtain location information.

According to still other embodiments, RFID tags may be used to map smart-home environment 100. For example, RFID tags may be placed throughout the home. Upon placing the tag, the user could scan the tag using device 166, which may launch an application, instructing the user to input location information. Also for example, instead of instructing the user to input location information, the device could determine its own location (e.g., using any suitable technique(s), such as GPS, at the time of the scan) and associate that location information with the tag.

According to embodiments, central server or cloud-computing system 164 may obtain and store identifying information, such as facial recognition data, for occupants of a smart-home environments 100. In this case, when a "recognized" individual who is an occupant of one of smart-home environments 100 is approaching an external door, such as the front door, of another smart-home environment, smart doorbell 106 and/or smart door 120 of that other smart-home environment, via the processing capabilities of central server or cloud-computing system 164, may be able to recognize the approaching individual and announce his presence. For example, the approaching individual's name and/or status as being a neighbor may be announced, a video of him approaching may be displayed, and/or his image (e.g., a photograph taken from his social networking account) may be displayed inside the smart-home environment 100. A security notification may relate to a home invasion in one home in a neighborhood, where central server and cloud-computing system 164 may increase the sensitivity of smart entry detectors 112, turn on the lighting systems 114, and close and/or lock doors 120 of other houses in the neighborhood.

Turning now to FIGS. 4A-4D, illustrations are provided of example embodiments of a smart door 120. According to embodiments, an important underlying functionality of smart door 120 is to serve as a home entryway interface unit, such by providing various functionalities, including, but not limited to, a doorbell functionality or other visitor arrival functionality, audio/visual visitor announcement functionality, access enabling/restricting functionality through a door frame passageway for any suitable entities (e.g., user entities, fluid entities, etc.), and/or the like. Like a smart thermostat 102, a smart hazard detector 104, a smart doorbell 106, a smart wall switch 108, a smart wall plug 110, and/or the like, a smart door 120 may be further enhanced with network-connectedness and/or a variety of multi-sensing capabilities to accommodate additional functionalities, and there may be substantial overlap/integration among the various smart devices that may utilize their combined processing, sensing, and communications capabilities, as well as their access to cloud-based control and intelligence.

As mentioned, one, some, or each smart door 120 may include a door body 124 that may be coupled to or otherwise positioned with respect to a door frame 130 defining a door frame passageway 135 that may be at least partially blocked by door body 124 at some moment in time for selectively preventing or enabling how and when and what type(s) of elements (e.g., user entities, water, air, etc.) may pass through and/or around door body 124 and, thus, through its associated door frame passageway 135, between any two suitable spaces that may be on opposite sides of door frame passageway 135 of door 120. By virtue of being mounted in place of traditional doors (e.g., through walls 154 or floors 156 or ceilings 158 or the like), smart door 120 may have access to plentiful electrical operating power, such as by connecting to wiring (e.g., to 120V "hot" line voltage wires) that may be within walls 154 or floors 156 or ceilings 158 or the like of smart-home environment 100 and that may be present at or near virtually all standard home entryways. This essentially unlimited power budget, the near-ubiquity of excellent installation locations throughout the smart environment, and the reasonably ample physical space on and/or in its door body and/or its frame to fit the necessary components, combine to enable smart door 120 to accommodate a rich and wide variety of sensing, interface, and communications capabilities for smart-home environment 100, as well as a general platform for the provision of even newer sensing, interface, and communications hardware as it becomes available over the coming decades. While smart door 120 may be connected to steady and reliable power from smart-home environment 100, it should be appreciated that smart door 120 may include a battery for the purpose of replacing or supplementing power obtained from the home wiring. In some embodiments, the battery could be a rechargeable battery, such as a rechargeable Lithium-Ion battery, for extracting power as needed from the house wiring. For example, smart door 120 could charge the battery during time intervals in which the door's power usage is less than what the smart-home environment's wiring can safely provide, and that will discharge to provide the needed extra electrical power during time intervals in which the hardware power usage is greater than what the smart-home environment's wiring can safely provide. Thus, the rechargeable battery could be used as a conventional back-up source or as a reservoir to supply excess DC power if needed for short periods.

Further, it should be appreciated that any of the smart devices described herein, such as the smart hazard detector, the smart thermostat, the smart wall switch, the smart door, and/or the like, could have mechanisms for self-generating power and/or optionally storing the generated power in a local battery. For example, in some embodiments, the smart devices may include a Peltier Junction for generating power. In these embodiments, for example, the Peltier Junction may generate electricity from heat differentials created between the smart device and its mounting location, such as when the smart device gets hot from use. In other embodiments, the smart devices may be equipped with generators, such as piezoelectric devices, that may generate electricity when the device is physically used, such as when a user turns the ring on a smart thermostat or when a user manually opens or closes a smart door (e.g., when a hinge mechanical coupling (e.g., a coupling 403) is used to guide a path of a door body with respect to a door frame). While piezoelectric devices may be used in this example, it should be appreciated that any suitable generator devices now known or hereinafter developed could be used.

A rich variety of new interactions may be made possible between smart door 120 and other devices of smart-home environment 100. Occupancy sensing, for example, can be significantly enhanced by virtue of the great locations (e.g., at room entrances) of most doors, allowing for easy record keeping of occupants or other entities or elements as they may transition between rooms or spaces of smart-home environment 100, predictive occupancy algorithms, and so forth.

FIGS. 4A-6B illustrate example user interfaces and hardware features of door 120. According to embodiments, at the core of door 120 may be powering circuitry, including a rechargeable battery, for extracting power as needed from any suitable remote power source (e.g., from a 120V "hot" line voltage wire of smart environment 100 (e.g., provided within a wall 154)). The rechargeable battery may be used as a conventional back-up source or as a reservoir to supply excess power (e.g., DC power) if needed for short periods.

Figure 4A:
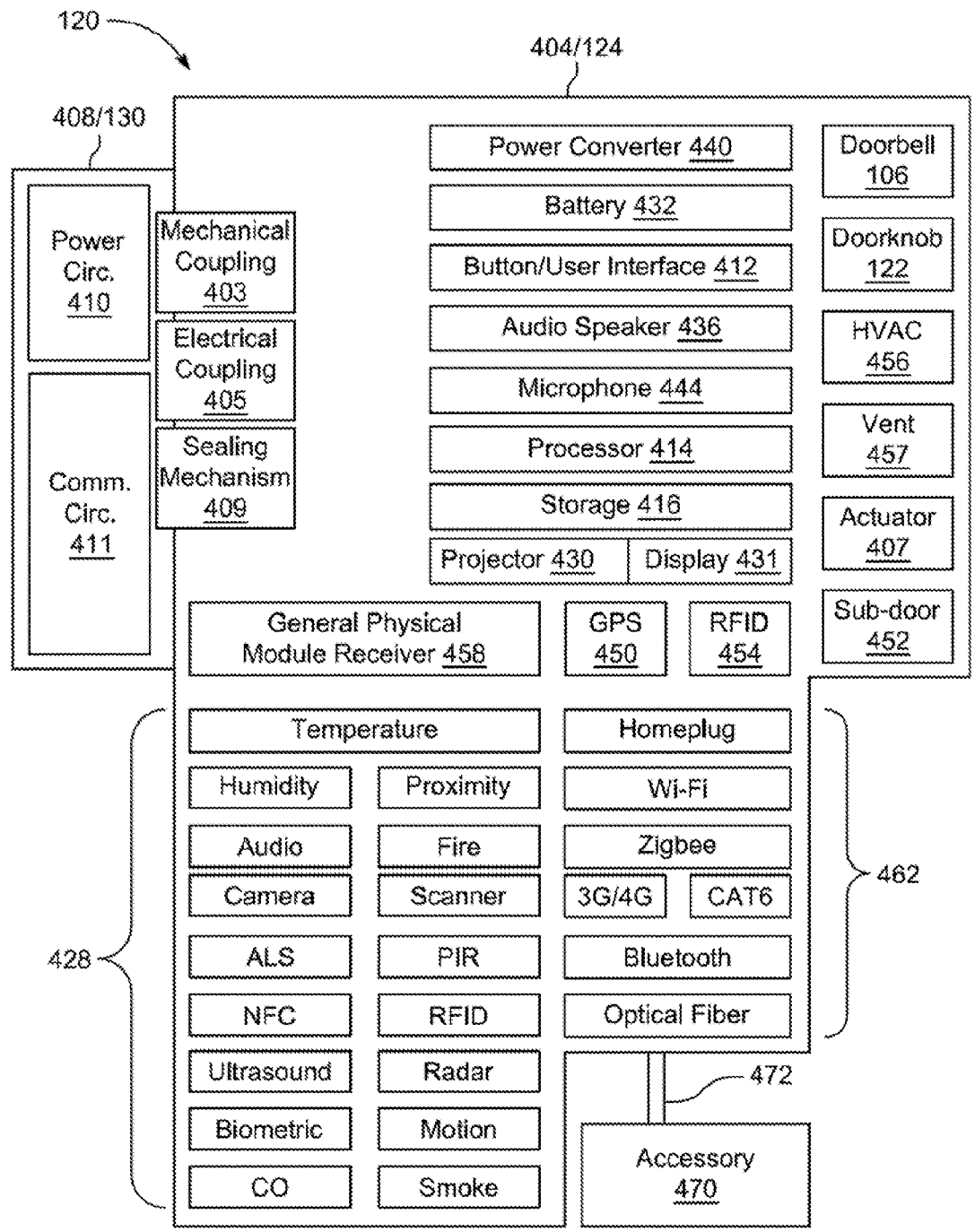
FIG. 4A is a simplified block diagram illustrating components of a smart door, according to at least one embodiment.

As illustrated in FIG. 4A, according to some embodiments, smart door 120 may be split into two parts: a head unit 404 or door body 124 and a backplate 408 or door frame 130. This bifurcation can increase the success and commercial longevity of smart doors 120 by making them a modular platform including two basic components. Backplate 408 or door frame 130 may be a permanent interface box (e.g., sometimes referred to herein as a "docking station 408") that may serve as a physical connection into smart environment 100 (e.g., into a conventional door frame and/or through a wall 154 and/or into a 120V line voltage wires or other wiring of smart-home environment 100), and that may include an AC-to-DC or any other suitable powering circuitry 410. When installed, docking station 408 may resemble a conventional one-gang or two-gang wall box, except no dangerous high-voltage wires may be exposed to a user. According to some embodiments, docking station 408 may also include a cellular wireless interface 411 for communicating with any other suitable components, such as head unit 404 and/or any other smart devices or servers of smart system 199.

Powering circuitry 410 may be electrically coupled to any suitable remote power source (e.g., a 120V or any other suitable magnitude line of environment 100 (e.g., from within a wall 154 (e.g., via a door bus 120B that may extend from a switch 108 or any other power source access point within wall 154 adjacent door 120 (e.g., as shown in FIG. 4C)))). Moreover, such powering circuitry 410 may be electrically coupled to any suitable power circuitry of head unit 404 (e.g., power converter 440), either directly or via any suitable coupling mechanism of door 120, such as an electrical coupling component 405, which may be provided by any suitable mechanism(s) (e.g., wires, wireless mediums, any suitable mechanical couplings (e.g., one or more mechanical couplings 403 of door 120 (e.g., a hinge (e.g., respective hinge mechanisms of door body 124 and door frame 130 that may move with respect to one another) and/or one or more mechanical couplings of doorknob 122 (e.g., between a latch 486 and a plate 490 (e.g., via magnetic inductive charging when latch 486 is held by or proximate to plate 490)), etc.))). Therefore, power may flow from a power source remote from door 120 (e.g., from wall 154), through any suitable portion of door frame 130 (e.g., a strike plate 490 of doorknob 122 and/or a hinge mechanical coupling 403), and then to any suitable portion of door body 120 (e.g., to power converter 440 or battery 432 via latch 486 when held by strike plate 490 and/or via a hinge mechanical coupling 403). Alternatively, power may flow from a power source remote from door 120 (e.g., from wall 154) directly to door body 124 not via door frame 130, but via a retractable power cord 440i (see, e.g., FIG. 4C) that may be provided by door body 124 and that may extend from door body 124 to any standard power outlet provided by environment 100 (e.g., at a portion of wall 154) for providing power directly to door body 124 (e.g., to converter 440 and/or battery 432). In such embodiments, a portion of such a power cord may be configured to provide or travel through at least a portion of a door hinge mechanism (e.g., a strain relief through a door hinge mechanism).

One or more mechanical couplings 403 may be provided to mechanically couple head unit 404 or door body 124 to backplate 408 or door frame 130 and/or to at least partially define one or more possible paths along which door body 124 may move with respect to door frame 130 for exposing or blocking door frame passageway 135. For example, as shown in FIGS. 4A-6B, door 120 may be provided with at least one hinge mechanical coupling, such as an upper hinge mechanical coupling 403u and a lower hinge mechanical coupling 403l, which may be configured to allow door body 124 to rotate about an axis R out from and into door frame passageway 135, where axis R may extend along a side edge of door frame 130, and each hinge mechanical coupling may be positioned along axis R. In other embodiments, the axis of rotation for door body 124 with respect to door frame 130 may be any other suitable axis, such as an axis that extends along a top edge of door frame 130. Alternatively, in some other embodiments, a mechanical coupling 403 may not be provided as a hinge, but may be provided as a track along which door body 124 may move into and out from wall 154 and, thus, into and out from door frame 130 (e.g., a pocket door that may slide sideways into a wall portion next to door frame 130 and/or a door that may slide upwards into a wall portion above door frame 130, etc.). Such movement of door body 124 with respect to door frame 130 may be manually controlled by user who may physically push or pull or otherwise interact with door body 124 to move door body 124 with respect to door frame 130 along a path at least partially defined by one or more mechanical couplings 403. Additionally or alternatively, door 120 may include one or more actuators 407 that may be operative to physically move door body 124 with respect to door frame 130 along a path at least partially defined by one or more mechanical couplings for exposing or blocking door frame passageway 135, where such actuator(s) 407 may be powered by any power provided to door 120 by a remote source (e.g., a power line of environment 120) and/or by a battery of door 120 (e.g., battery 432), and may be controlled by any suitable control signals (e.g., as may be dictated by a processor of door 120 (e.g., processor 414) and/or by central server or cloud-computing system 164). An actuator 407 may be provided within door body 124 and operative to interact with one or more mechanical couplings 403 or within door frame 130 and operative to interact with one or more mechanical couplings 403, or at least partially within each one of door body 124 and door frame 130, or at least partially external to door 120 (e.g., within and/or adjacent to wall 154 through which door frame passageway 135 may extend). One or more actuator(s) 407 may be used to provide a locking mechanism by selectively preventing one or more mechanical coupling(s) 403 from enabling movement of door body 124 with respect to door frame 130.

Door 120 may include one or more sealing mechanisms 409 of any suitable type that may be provided for selectively sealing any, some, or each body-frame gap that may exist between door body 124 and door frame 130 (e.g., as a portion of door frame passageway 135) when door 120 is attempting to block door frame passageway 135 with door body 124. Each sealing mechanism may be provided by any suitable structure of any suitable material(s) that may be selectively activated (e.g., by any suitable actuator 407 (e.g., as may be controlled by processor 414 and/or server 164)) in any suitable manner to block one or more body-frame gaps of any suitable size and shape between door body 124 and door frame 130 and that may be selectively de-activated in any suitable manner to unblock one or more body-frame gaps (e.g., when door body 124 is to be moved out from door frame passageway 135). A sealing mechanism 409 may be provided within or along one or more edges of door body 124 and operative to interact with one or more edges or other suitable portions of door frame 130, or within or along one or more edges of door frame 130 and operative to interact with one or more edges or other suitable portions of door body 124, or at least partially within or along each one of door body 124 and door frame 130, or at least partially external to door 120 (e.g., within and/or adjacent to wall 154 through which door frame 130 may be provided). For example, as shown in FIGS. 4A-6B, door 120 may be provided with at least one sealing mechanism, such as a first sealing mechanism 409u that may be operative to selectively seal one or more body-frame gaps (e.g., an upper body-frame gap 135gu (e.g., as shown in FIG. 5B)) that may exist between door frame 130 and any suitable portion(s) of door body 124 along an upper edge or top surface of door body 124 and/or at one or more top corners of door body 124 and/or at one or more upper portions of one or more side surfaces of door body 124, and/or a second sealing mechanism 409l that may be operative to selectively seal one or more body-frame gaps (e.g., a lower body-frame gap 135g1 (e.g., as shown in FIG. 5B)) that may exist between door frame 130 and any suitable portion(s) of door body 124 along a lower edge or bottom surface of door body 124 and/or at one or more bottom corners of door body 124 and/or at one or more lower portions of one or more side surfaces of door body 124. Additionally or alternatively, although not shown, door 120 may be provided with one or more sealing mechanisms that may be operative to selectively seal one or more body-frame gaps that may exist between door frame 130 and any suitable portion(s) of door body 124 along a portion or the entirety of one or both side surfaces of door body 124, and/or any suitable sealing mechanisms that may be operative to selectively seal any body-frame gaps that may exist between door frame 130 and any portion or the entirety of the periphery of door body 124.

Door 120 may include one or more sub-doors 452 of any suitable size and shape and placement that may be operative to selectively open for exposing a door passageway through door 120 (e.g., for enabling a package or a pet to pass therethrough). Each sub-door 452 may be provided by any suitable structure of any suitable material(s) that may be selectively activated (e.g., by any suitable actuator 407 (e.g., as may be controlled by processor 414 and/or server 164)) in any appropriate way for recoiling or collapsing or lifting or lowering or sliding or otherwise moving at least a portion of the sub-door for exposing a door passageway through door 120 (e.g., an electro-mechanical accordion door). Additionally or alternatively, door 120 may include one or more door HVAC systems 456 that may provide heating or cooling or other thermal control to door 120 and/or to environment 100. One or more sub-doors 452 and/or one or more vents 457 of any suitable size and shape and placement may be provided through door and may be operative to selectively open for exposing a door passageway through door 120 (e.g., for enabling any suitable elements (e.g., air or water or smoke or the like) to pass therethrough (e.g., at the control of door HVAC system 456 (e.g., one or more filters and/or one or more fans or the like of door HVAC system 456 may guide such elements through such vents or sub-doors in one or more particular directions or speeds or the like)). Each sub-door 452 and/or each vent 457 may be provided by any suitable structure of any suitable material(s) that may be selectively activated (e.g., by any suitable actuator 407 (e.g., as may be controlled by processor 414 and/or server 164)) in any appropriate way for recoiling or collapsing or lifting or lowering or sliding or rotating or otherwise moving at least a portion of the sub-door or vent for exposing a door passageway through door 120.

Head unit 404 or door body 124 (e.g., sometimes referred to herein as a "replacement module 404") may actually contain some or all of the sensors, user interfaces, the rechargeable battery, and so forth of smart door 120. Users can plug and unplug unit 404 in and out of docking station 408. Many different commercial and functional possibilities for provisioning, maintenance, and upgrade are possible. For example, after years of using any particular head unit 404, a user will be able to buy a new version of head unit 404 and simply plug it into docking station 408. There are also many different versions for head unit 404, such as low-cost versions with few features, and then a progression of increasingly-capable versions, up to and including extremely fancy head units 404 with a large number of features, and/or versions made of different materials and/or sizes and/or shapes. Thus, it should be appreciated that the various versions of head units 404 can all be interchangeable, with any of them working when placed into any docking station 408. This can advantageously encourage sharing and re-deployment of old head units 404 (e.g., when an important high-capability head unit 404 (e.g., for a front door) can be replaced by a great new version of head unit 404, then the old head unit 404 can be re-deployed to a back or basement door, etc.). When first plugged into a docking station 408, head unit 404 can ask the user (e.g., by 2D LCD display, 2D/3D holographic projection, voice interaction, etc.) a few simple questions such as, "Where am I" and the user can select "front door" or "back door" or "garage door" or "swimming pool gate" or "front gate" or "master bedroom door" or "nursery room door" or "attic door" or "sun roof window" or "window adjacent kitchen stove" and so forth. In other examples, head unit 404 can provide instructions, such as "Press button once if I am at the front door, press twice if I am at the back door," and/or the like.

Sensor devices, such as temperature, humidity, occupancy, ambient light, fire, smoke, carbon monoxide, active proximity, passive infrared motion, any other suitable motion sensing component, ultrasound, radar, CCD/video camera, bar code scanner, and/or the like, as well as input/output (I/O) devices, such as speakers, user interfaces, 2D/3D projectors, and/or the like, may be provided in head unit 404. The sensors and I/O devices may generally be represented at subassembly or component collection or sensor collection or sensors 428. Any one or more of sensor(s) 428 may include or be provided as a tamper-proof and/or multi-sensor that may be operative to determine when door 120 is closed or open (e.g., open at all or by a particular amount and/or in a particular direction) and/or if there is a knock on the door (e.g., on the door body or door frame) and/or if there is motion within any suitable threshold distance of the door (e.g., from one or both sides of the door). For example, one such sensor may be a pico sensor, which may be embedded in an invisible or nearly invisible form factor, and/or which may be contained at least partially within any suitable structural element(s) of the door, including, but not limited to, a door stile, door rail, door inswing-hinge form factor (e.g., within a hinge or replacing a hinge), and/or the like. As one particular example, any one or more of sensor(s) 428 may include or be at least partially provided as a sensor utilizing any suitable radar-based gesture recognition technology (e.g., Project Soli by Google LLC).

Technologies including sensors 428 in combination with rules-based inference engines or artificial intelligence provided at a central server, such as 164, may be used to detect when packages are delivered to the door of the smart-home environment 100, and to take a variety of automated actions in response. According to some embodiments, sensors 428 can "see" the uniform of a delivery person approaching the door or the truck of the delivery person, or the sensors can "hear" the truck in combination with a person or other entity approaching the door within a period after hearing the truck. Once the entity is within a predetermined distance from the door, door 120, such as by using its speaker, may ask the person if he or she is a delivery person, to which that person can reply with an audible response or by indicating as such on a user interface of the door. If the person is making a delivery, the door can instruct the person to place the package in a location proximate the door such that its scanner can scan the bar code or other type of identifying tag affixed to or associated with the package being delivered.

A central server, such as server 164, can use the bar code to obtain information about the package, such as the sender, recipient, a description of the item therein, whether signature is required, and/or the like. Based on this information the rules-based inferences engines or artificial intelligence can make inference regarding which action to take next. For example, if occupants or, more particularly, if the specified recipient or recipients are in the home and the package is from a sender or contains an item that is of particular interest to the one or more occupants, an announcement can be made in the home, indicating the package is currently being dropped off and providing details about the package. On the other hand, if the sender or item is not of particular interest to one of the occupants based on the occupants past responses to receiving such deliveries, then no announcement will be made and the occupants can discover the package in due course. Similarly, if no occupants are home but an inference is made that the package is of particular interest to one of the occupants or users, a text message, email, phone call, and/or the like can be made (e.g., by server 164) to the one or more occupants or users of interest, indicating that the package in being delivered.

In the event signature is required for the package but none of the occupants are home, an inference may be made to not disturb the occupants, the smart door can provide authorization to leave the package. For example, door 120 may present an authorization code (e.g., either in plain text, barcode, or encrypted forms) on its user interface and may prompt the delivery person to use his or her handheld device to record, scan, photograph, or otherwise acquire the authorization code. Once the authorization code has been acquired by the delivery person, smart door 120 can then instruct the delivery person regarding where to leave the package, such as at the front door, around the back of the house in a discrete location, and/or the like.

Technologies including sensors 428, such as noise, motion, and/or facial recognition detection, in combination with rules-based inference engines or artificial intelligence provided at a central server, such as server 164, may be used to detect when one or more unrecognized individuals are approaching the door. A number of learned inferences can be made in this situation. For example, during late evening hours, an alarm may be sounded in the house, giving notice of the approaching person and/or smart door 120 may audibly announce to the individual that he or she is being analyzed by a home security system. Further, in the event the person attempts to enter a door, window, or other access point to the home, a message will be sent to local law enforcement. However, during day time hours when one or more occupants are at home, a learned inference can be made to take no action, such as when a meter reader, mail carrier, garbage collector, and/or the like is approaching the house as per a reasonably predictable and learned schedule.

Smart door 120 may provide a context-based entry keypad. In some examples, the entry keypad can be projected, such as via a 2D/3D holographic projection. In other examples, the entry keypad can be rendered on a display such as a 2D LCD display. Persons standing proximate to smart door 120 can enter a code into the keypad to obtain access to the smart-home environment 100 through passageway 135 of smart door 120. The occupants of the home may get context-based keypads and/or access codes. For example, the parents may get a more sophisticated keypad that provides a variety of controls, whereas children may get a simple keypad into which they can enter their access code. Further, non-occupants may get context-based keypads, too. For example, a delivery person gets one keypad, whereas uncategorized individuals get another keypad. A keypad can vary based on factors such as time of day, current news (e.g., any recent crime in the neighborhood?), proximity of security guards and other law enforcement personnel, and which, if any, occupants are currently at home. For example, if there is a nearby security guard, then the keypad may request a three-digit access code or no access code at all, rather than the usual ten-digit access code. In another example, if no one is home or if only children or elderly people are at home, then a ten-digit code may be required. However, if the parents of the children or the adult children of the elderly are at home then no access code may be required or only a three-digit code is required. If the approaching person is determined to be a guest, then the keypad may prompt the guest to enter the guest access code assigned to him or her. It should also be appreciated that individuals may be prompted to input their access code as they leave the home, too. This way the codes of the guests, the occupants, and recognized categories of strangers (e.g., a delivery person) can be used to keep a record of the goings and comings of those people. It should be appreciated that this keypad can be provided on any smart device in the home, such as the smart door 120, wall switch 108, thermostat 102, hazard detector 104, and wall plug 110.

When a central server, such as server 164, based on information received from smart door 120, such as noise and motion data, determines that the street adjacent to the home has a threshold level of traffic, the inferences may be made regarding the safety of the children residing at the home. For example, an alarm can be triggered in the home in the event one or more of the children are detected by the occupancy sensing to be outside of the home. This alert enables the parents or other caretakers to quickly take actions to protect the child from the traffic. Further, for example, automatic adjustments are made to audio equipment in the home to account for the increased traffic noise, such as by increasing the volume a proportionate amount.

Sensors 428 may include temperature and humidity sensors, the data from which may be used for a number of useful services. For example, the outside humidity and temperature data may be considered by a thermostat 102 when controlling an HVAC 103 to accomplish the occupants' desired comfort preferences. Further, for example, this information may be presented to the occupants through a number of user interfaces, such as a user interface associated with another one of the devices located inside of the home (e.g., an interior surface of smart door 120), the television, mobile and other computing devices, or audibly. In some instances, a central server, such as server 164, may collect this information from a plurality of smart doors 120 from a single smart home and/or from one or more smart doors 120 from a plurality of smart-homes across a plurality of geographic locations. This aggregated data may be sold to weather services or may be used to provide weather data to smart-home occupants.

Smart door 120 may include a button or sensor or any other suitable user interface 412 that, upon being touched, depressed, or otherwise activated, may cause an audible, visual, or otherwise detectable notification to be broadcasted within the home or a message to be sent to user interfaces of devices within the home or to a mobile device associated with occupants of the home. Learned inferences can be made regarding the appropriate response to activation of user interface 412. For example, the audible notification may be only broadcast in occupied rooms, or rooms occupied by one or more occupants who have a relationship with the person at the door, or no alarm may be sounded in rooms where occupants, such as small children, are determined to be sleeping. Also, for example, occupant-selected songs, such as uploaded MP3's, may be broadcast in the home, where different songs may be broadcast for different occupants at home at the time or based on the identity of the person at the door. Further, for example, technologies and sensors at smart door 120 may identify the person based on facial recognition or based on other characteristics, such as the manner in which the person approached the door. For example, over time, based on input received from smart door 120, a central server can build up an address book of profile data about people who approach the door, such as some identifying biometric data. For example, the address book can be built over time using low-resolution data, such as ultrasonic, passive IR, and/or the like, to create a unique signature for individuals. This combined data from different domains may become almost like a fingerprint regarding how that person approaches the house or room or any other space defined or divided by a smart door 120. In some instances, when a "familiar" person approaches the door, smart door 120 may "ask" the person if he is "John Doe", to which the person can verbally or physically respond. Upon obtaining this information, John Doe's name or image can be announced or projected on device in the home and/or John Doe will be given certain access rights to the home, such as, for example, the door may automatically unseal and/or unlock and/or unlatch as he approaches. Further, in addition to or instead of identification based on these unique "signatures", individuals may enable their mobile devices to communicate with smart door 120, such as via BLUETOOTH, NFC, or other wireless protocols. Also, for example, individuals may "swipe" their smart phones in front of the smart door's RFID scanner. Upon identifying the individual, the smart door may give the individual certain access right to the home, such as by automatically unlocking and/or unlatching the door. According to embodiments, technologies including sensors 428 in combination with rules-based inference engines or artificial intelligence provided at a central server, such as server 164, may also make learned determinations.

According to embodiments, a home analyzing and control system may be provided that may include one or more hazard detectors or other audio and/or video capable devices with wireless capability and occupancy detectors and audio speakers, and a smart door 120 having a processor and wireless capability. A door-approaching or door-interaction event may trigger the processor to cause the door to wirelessly communicate with one or more of the hazard detectors to cause its audio speakers to alert occupants of a visitor at the door. Each hazard detector can be configured with a do-not-disturb setting such that it will remain silent under one or more pre-determined conditions. The pre-determined conditions may include one or more of an occupant determined to be sleeping proximate to the hazard detector, room location of hazard detector is unoccupied, hazard detector is located in an occupied bedroom, and hazard detector is located in a kid's bedroom.

Various capabilities of smart door 120 may provide a smart and at least partially automated interface between an occupant of smart-home environment 100 and any potential visitor or other suitable entity or element external to smart-home environment 100, including delivery services, friends, solicitors, strangers, and would-be-thieves, as well as pets, ambient weather conditions, and/or the like. Smart door 120 may be utilized with one or more other network-connected smart devices of environment 100, such as one or more of devices 102, 104, 106, 108, 110, 112, 113, 114, 116, 122, 166, 168, and/or 170, and/or with services platform 200, such that smart door 120 may serve as a trusted and effective liaison between a system user associated with environment 100 (e.g., a resident, owner, occupant, etc.) and a visitor that may approach an entry point of environment 100 at which smart door 120 may be provided, whether or not the system user is currently at environment 100. For example, smart door 120 may be a visitor interface or entryway interface device operative to detect and react to the approach to and/or departure from a location (e.g., an outer door 120 of structure 150 of environment 100) by a person or any other suitable visitor entity, announce such an approach or departure, enhance conventional doorbell functionality and/or enhance conventional doorknob functionality and/or enhance conventional door sealing functionality and/or enhance conventional door locking functionality and/or enhance conventional door latching functionality for both system users and visitors, control settings on a security system, increase the convenience and efficiency of package delivery, increase the traceability of package delivery, enable secure package delivery, detect environmental data and other useful data for environment 100 and system 164, and the like.

By virtue of potentially being mounted in place of a traditional door or other conventional entryway interface (e.g., at an outer structure door 120, at gated entry 116, at a lobby of a shared residence, such as a condominium or apartment building, at the front door of an individual residence at such a building, at a door to a private room of an enclosure, at a door to an outdoor area (e.g., outdoor swimming pool) of an environment, etc.), smart door 120 may have access to plentiful electrical operating power, such as by coupling to wiring (e.g., to 120V "hot" line voltage wires) that may be behind walls 154 of smart-home environment 100 and that may be present at virtually all standard wired areas.

FIGS. 1 and 4A-6B illustrate example user interfaces and hardware features of a smart door 120 that may incorporate or otherwise have access to a host of sensing, interface, and communications capabilities for enhancing comfort, convenience, and safety of its users. Head unit 404/door body 124 of smart door 120 may include one or more of a main processor 414, storage 416, button and/or touch screen display and/or any other suitable user interface 412 (e.g., keyboard, trackball, switch, slide, 3-dimensional user input devices/user interfaces, user sensor (e.g., biometric sensor or motion sensor or touch sensor, etc.), audio speaker 436, microphone 444, power converter 440, global positioning system (GPS) component 450 (e.g., GPS receiver), radio frequency identification (RFID) locator 454, and general physical module receiver 458.

Head unit 404/door body 124 of smart door 120 may additionally or alternatively include one or more types of a wireless and/or wired networking component 462. In view of the ample power availability, a variety of any suitable communications capabilities can be provided by networking component 462 to smart door 120, including Bluetooth, Wi-Fi, ZigBee, 3G/4G/5G and/or the like, wireless, CAT6 wired Ethernet, and even optical fiber from the curb. Furthermore, because smart door 120 may be coupled to a home 120V system or any other suitable wired or wireless power system, a HomePlug or other powerline-communications capability can be provided by networking component 462. Such communication capabilities may enable smart door 120 to communicate with any other smart device of environment 100 and/or with any suitable element of platform 200.

Oftentimes, a door body may be provided by a material or combination of materials that are selected for providing a door that is structurally robust or that may provide certain insulation for noise and/or weather or the like. However, such structure may often prevent certain wireless communication signals to pass through such a door body without significant degradation. Therefore, by providing smart door 120 with one or more networking components 462 at least partially integrated within door body 124 and/or door frame 130, smart door 120 may be operative to promote rather than inhibit the strength of wireless communication signals being communicated throughout environment 100. For example, one or more networking components 462 at least partially integrated within smart door 120 (e.g., Wi-Fi, weave/thread bridge, etc.) may be operative to help communicatively couple communication devices that may be positioned on opposite sides of the smart door (e.g., a first communication device positioned within the ambient environment AE (e.g., outdoor lighting 114) and a second communication device positioned within room 152 (e.g., wireless router 160)). Due to the potential for the size (e.g., height and/or width and/or thickness) of door body 124 to be quite large, one or more large, smart antenna arrays (e.g., with power amplification for cellular back-up) may be operative to be provided by one or more networking components 462 at least partially integrated within door body 124 of smart door 120 in order to provide a large and powerful communication range.

Head unit 404/door body 124 of smart door 120 may additionally or alternatively include any number of any suitable sensor components 428, such as any suitable temperature sensor, any suitable humidity sensor, any suitable motion sensor (e.g., occupancy sensor), any suitable ambient light sensor (ALS), any suitable fire sensor, any suitable smoke sensor, any suitable carbon monoxide (CO) sensor, any suitable proximity sensor, any suitable passive infrared (PIR) or other motion sensor, any suitable ultrasound sensor, any suitable still or video camera or scanner (e.g., a charge-coupled device (CCD) camera, a complementary metal-oxide-semiconductor (CMOS) camera, or any suitable scanner (e.g., a barcode scanner or any other suitable scanner that may obtain identifying information from a code, such as a linear barcode, a two-dimensional or matrix barcode (e.g., a quick response ("QR") code), a three-dimensional barcode, or the like), any suitable near-field communication (NFC) technique sensor (e.g., for sensing an entity wearing an infrared or NFC-capable smartphone or other suitable element), any suitable RFID technique sensor (e.g., for sensing an entity (e.g., a pet or child) wearing an RFID bracelet, RFID necklace, RFID key fob, or other suitable element), any suitable audio sensor (e.g., a microphone, which may operate in conjunction with an audio-processing application that may be accessible to door 120 (e.g., at environment 100, system 164, or other accessible component(s) of platform 200), which may identify a particular voice or other specific audio data for authenticating a user or for any other suitable purpose)), any suitable biometric sensor (e.g., a fingerprint reader or heart rate sensor or facial recognition sensor or eye tracker or retinal scan sensor or voice analyzer or skin temperature sensor or heart rate/pulse sensor or any other feature recognition sensor, which may operate in conjunction with a feature-processing application that may be accessible to door 120 (e.g., at environment 100, system 164, or other accessible component(s) of platform 200), for authenticating a user or for any other suitable purpose), and the like. A rechargeable battery 432 or any equivalently capable onboard power storage medium may also be provided by head unit 404/door body 124 of smart door 120. For example, battery 432 can be a rechargeable Lithium-Ion battery. In operation, smart door 120 may charge battery 432 during time intervals in which the hardware power usage may be less than what power stealing can safely provide, and may discharge to provide any needed extra electrical power during time intervals in which the hardware power usage may be greater than what power stealing can safely provide, which may, thus, extract power as needed (e.g., from the 120V "hot" line voltage wire or other suitable power source). Battery 432 may be used as a conventional back-up source or as a reservoir to supply excess power (e.g., DC power) if needed for short periods.

Due to the potential for the size (e.g., height and/or width and/or thickness) of door body 124 and/or door frame 130 to be quite large, one or more large, high-capacity batteries 432 may be easily provided within the structure of smart door 120 and utilized not only for powering any functionality of smart door 120 but also for powering any functionality of any other smart device of system 199 that may be electrically coupled to smart door 120. Certain functionalities of smart door 120 may be functionalities that ought to work at all times, even when remote power is not able to be provided to smart door 120 (e.g., due to power outages of main electricity sources to environment 100), such as locking/unlocking, latching/unlatching, sealing/unsealing, and/or closing/opening door 120. Additionally or alternatively, when certain power is not able to be provided for such functionalities, door 120 may be configured to enable manual control of such functionalities (e.g., a mechanical door lock accessible by a physical key of a user may be enabled for use in locking or unlocking smart door 120 when electronic powered control of such a functionality is not possible (e.g., due to lack of power)).

Head unit 404/door body 124 of smart door 120 may include one or more user interfaces (UIs) 412 of any suitable type, such as one or more visual displays (e.g., thin film transistor (TFT), organic light-emitting diode (OLED), or any other suitable display), touchscreen or any suitable display 431, and/or button input capabilities, audio speaker 436, microphone 444, and/or the like. Head unit 404/door body 124 of smart door 120 may provide a portion or the entirety of a smart doorbell 106 and/or a portion or the entirety of a smart doorknob 122, where at least a portion of a user interface 412 may provide a user interface portion of such a smart doorbell 106 and/or a user interface portion of such a smart doorknob 122. In some embodiments, (e.g., as may be shown in FIG. 4B), a particular head unit 404/door body 124 of smart door 120 may include user interface 412 with a click-and-rotate annular ring input button. According to such embodiments, the click-and-rotate annular ring input button may be used by a visitor to simply "ring" a doorbell 106 (e.g., for a visitor to attempt to announce itself). Furthermore, in some embodiments, such a click-and-rotate annular ring input button may be operative to provide menu-driven interfaces for user governance of some or all of the various capabilities of door 120. User interface 412 may additionally or alternatively be configured to take a variety of forms, including, but not limited to, a touch pad, dial, click wheel, scroll wheel, touch screen, 3-dimensional input and/or output interface, one or more buttons (e.g., a single conventional doorbell-like button or multiple buttons of a keyboard), mouse, joy stick, trackball, and/or the like. Moreover, one or more of sensor components 428 may also be at least partially used as an input component and/or may be at least partially integrated into user interface 412 (e.g., by sensing data from a user (e.g., as a microphone, camera, scanner, motion sensor, biometric sensor, and the like (e.g., user interface 412 may include a biometric fingerprint scanner to detect the fingerprint of an entity that may touch user interface 412))). A 2D image and/or 3D holographic image projector 430 may also be provided so that the effective dimension of the display may not just be limited to the physical size of a face of a display 431 of head unit 404. For example, if a package is to be deposited by a visitor, smart door 120 may utilize projector 430 to project a defined drop-off area for the package (e.g., area AL of FIG. 1). When button 412 (e.g., of a doorbell 106 of a smart door 120) is depressed, touched, or otherwise selectively interacted with and/or utilized by a visitor, door 120 may be operative to generate and transmit a signal (e.g., via any suitable wired or wireless communication path) to a user-communicative component for alerting a user that a visitor is at door 120, where such a user-communicative component may be any suitable smart component of smart environment 100 (e.g., an output component of a hazard device 104 or a communication mechanism available to a user device 166) or any conventional component of a user environment (e.g., a chime of a conventional doorbell and/or an emergency light of a home).

Figure 4D:
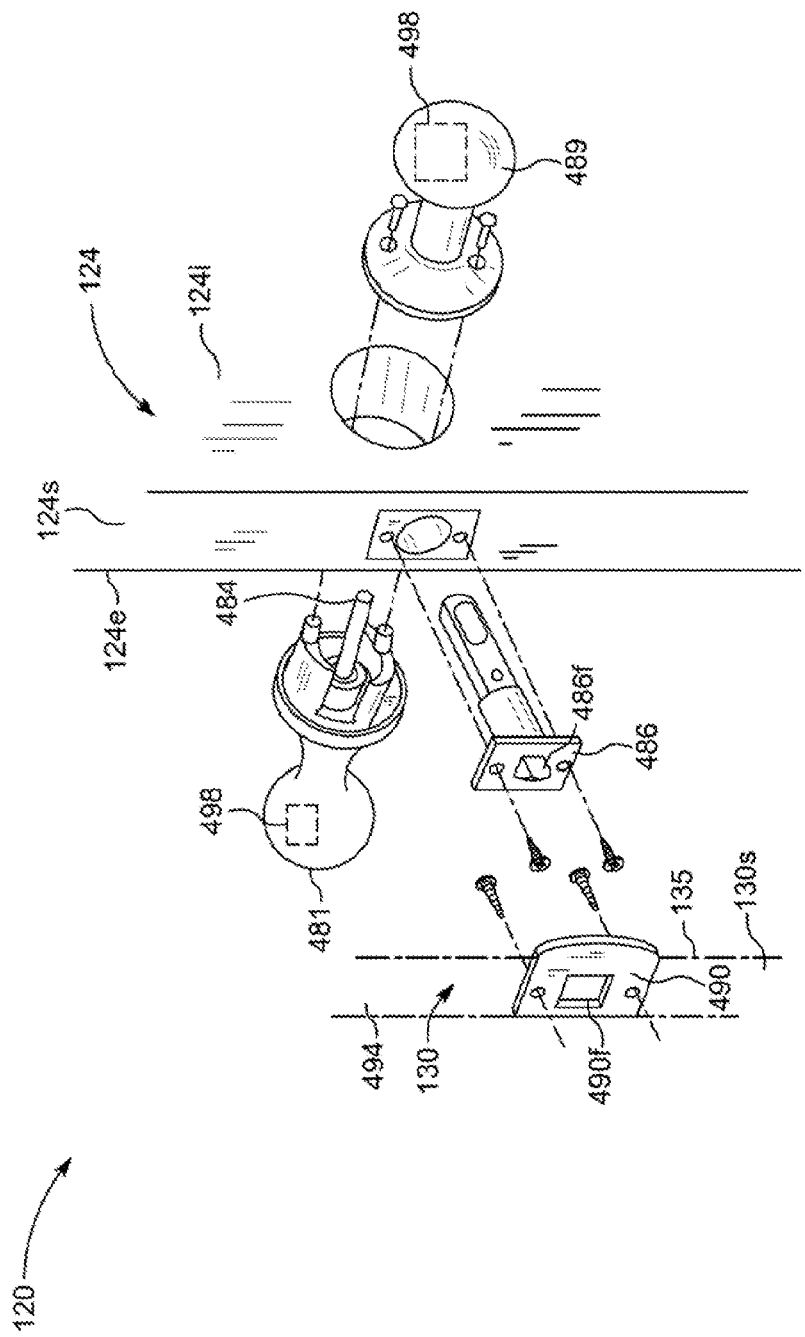
FIG. 4D is a perspective view of the smart door of FIGS. 4A-4C, according to at least one embodiment.

A smart door knob 122 may be configured to selectively unlock and/or selectively unlatch door body 124 with respect to door frame 130. While a latch may be any suitable device that may keep a door or window in a certain position with respect to a frame until a user manually unlatches the latch to free the door for movement with respect to the frame (e.g., a metal hook through a loop or a freely rotatable shaft that pulls a latch of the door out from a socket in the door frame), a lock may be any suitable device that prevents movement of the door with respect to the frame unless a separate key or authentication process is used to enable unlocking (e.g., any suitable locking mechanism unlockable by any suitable key or process, including, but not limited to, a physical key lock, an RFID key lock, a biometric key lock, a password key lock, and/or the like). In some embodiments, latching and locking features may be provided by distinct latching and locking mechanisms that may interact with a door in different ways and/or at different positions. Alternatively, latching and locking features may be provided by a combined latch/lock mechanism (e.g., mechanism(s) of a smart doorknob). For example, as illustrated in FIG. 4D, a smart doorknob 122 may include a remote controlled electronic lock that may lock a spindle 484. This may lock door 120 because it may prevent spindle 484 from disengaging a latching feature 486*f* (e.g., retractable nub) of latch 486 of doorknob 122 (e.g., as may be provided by or otherwise held by door body 124 (e.g., extending from or otherwise exposed through a side surface 124*s* of door body 124)) from a latching feature 490*f* (e.g., recess) strike plate 490 of a door stop 494 of doorknob 122 (e.g., as may be provided by or otherwise held by door frame 130 (e.g., extending from or otherwise exposed by a side surface 130*s* of door frame 130)). Accordingly, smart doorknob 122 may be able to automatically unlock door 120 without a user having to touch doorknob 122. For example, smart doorbell 106 or smart doorknob 122 or any other suitable device of door 120 or of environment 100 generally may be configured to detect or otherwise recognize a registered occupant approaching door 120 and instruct smart doorknob 122 to automatically unlock. It should also be appreciated that users (e.g., occupants or otherwise) can use a registered mobile device 166 to remotely unlock the door. For example, if when inside the home, the occupant receives notice from smart doorbell 106 that a trusted neighbor is approaching the door, the occupant can use the mobile device 166 to unlock the door so the neighbor can let himself or herself in. Alternatively, the occupant can speak an audible command instructing smart doorknob 122 to unlock. When locked, spindle 484 may not be able to move (e.g., rotate) for disengaging latch 486 from strike plate 490. However, when unlocked, spindle 484 may be able to move (e.g., rotate) for disengaging latch 486 from strike plate 490. When, unlocked, for example, a user may manually interact with a handle portion of doorknob 122 for rotating spindle 484 for unlatching door body 124 from door frame 130. According to some embodiments, smart doorknob 122 may include a remote controlled electronic motor that may be configured to turn spindle 484 to disengage latch 486 of doorknob 122 from strike plate 490 of door stop 494 for unlatching door body 124 from door frame 130. Accordingly, smart doorknob 122 may be able to automatically unlock and/or automatically unlatch door 120 without a user having to touch doorknob 122. Similarly, smart doorknob 122 may be able to automatically latch and/or automatically lock door 120 without a user having to touch doorknob 122.

Certain visitor behavior may be detected as suspicious and used to increase the security of environment 100 in one or more ways. For example, platform 200 may be operative to detect if/when a visitor attempts to open a door or other entry point to a portion of environment 100 before platform 200 has granted that visitor access to such an entry point, in response to which platform 200 may be operative to use the detection of such suspicious visitor behavior to adjust certain security mechanisms of environment 100. For example, one or more sensing components of doorbell 106 (e.g., a camera) or of entry detector 112 or otherwise of door 120 may be operative to detect when a visitor touches doorknob 122 and/or otherwise attempts to gain access to structure 150 through door 120. As another example, as shown in FIG. 4D, smart doorknob 122 may include one or more sensing components 498, which may include any suitable sensing components similar to those described above with respect to sensing components 428 or the like, and which may be operative to detect when a visitor twists, grabs, pulls, or at least touches doorknob 122 and/or otherwise attempts to gain access through door 120. For example, one or more of sensing components 498 may be positioned within a handle portion 481 of doorknob 122 that may be accessible to a visitor beyond an external side 124*e* of door body 124, where an internal side 124*i* of door body 124 may face an interior of structure 150 (e.g., room 152) when door 120 is closed for preventing entry of the visitor into structure 150, and at least one sensing component 498 may be operative to detect visitor touching, rotation, pulling, grabbing, or any other suitable visitor interaction with doorknob handle 491 or with any other suitable portion of doorknob 122. Additionally or alternatively, one or more of sensing components 498 may be positioned within a handle portion 489 of doorknob 122 that may be accessible to an occupant or other user beyond internal side 124*i* of door body 124, and at least one such sensing component 498 may be operative to detect any user touching, rotation, pulling, grabbing, or any other suitable user interaction with doorknob handle 489 or with any other suitable portion of doorknob 122. For example, one doorknob sensing component 498 may include an accelerometer or any other suitable motion sensing component for detecting certain visitor interaction with doorknob 122. Additionally or alternatively, a doorknob sensing component 498 may include a biometric sensing component, such as a facial recognition detector or fingerprint detector or user device identification detector, that may be operative to detect certain specific identification information of a visitor interacting with doorknob 122 (e.g., for use in determining visitor trust and/or unlocking doorknob 122). Any other suitable visitor behavior may be detected and deemed suspicious by platform 200 for initiating enhanced security features other than visitor interaction with doorknob 122 prior to being granted access through closed door 120. For example, platform 200 may be operative to analyze detected information to deem any one of the following or any combination of the following visitor interactions to be suspicious: any suitable unauthorized interaction with doorknob 122 (e.g., physically touching, grabbing, twisting, pulling, etc.); any suitable unauthorized interaction with structure 150 (e.g., visitor physically knocking on door 120 or opening a mail slot or other feature of door 120); one or more failed attempts by the visitor to supply a correct access code or other suitable authentication for entry through closed door 120; interaction with user interface/button 412 of doorbell 106 or otherwise of door 120 in an unauthorized manner (e.g., a visitor pressing button 412 when button 412 is presented as disabled); any inappropriate visitor interaction with one or more components of a smart device (e.g., a visitor blocking a camera sensing component 428 of doorbell 412 or otherwise of door 120); any visitor behavior that prevents or inhibits visitor identification (e.g., a visitor detected to be wearing a mask); and the like.

Smart door 120 of environment 100 may be configured to include any suitable combination of any of the components described above with respect to any component of platform 200 so as to appropriately interact with other smart devices of environment 100 and services platform 200 and any other suitable entity, such as system users registered with or associated with environment 100 (e.g., owners, occupants, pets, etc.) and/or visitor entities that may visit environment 100 (e.g., package deliverers, friends, solicitors, strangers, would-be-thieves, etc.) and/or any other suitable elements (e.g., smoke, air, pollen, fire, water, etc.). For example, smart door 120 may be a visitor interface or entryway interface device operative to detect and react to the approach to and/or departure from a location (e.g., an outer door 120 of structure 150 of environment 100) by a person or any other suitable visitor entity, announce such an approach or departure, enhance conventional doorbell functionality and/or enhance conventional doorknob functionality and/or enhance conventional door sealing functionality and/or enhance conventional door locking functionality and/or enhance conventional door latching functionality for both system users and visitors, control settings on a security system, increase the convenience and efficiency of package delivery, increase the traceability of package delivery, enable secure package delivery, detect environmental data and other useful data for environment 100 and system 164, and the like. Door 120, on behalf of smart environment 100 and platform 200 (e.g., system 164), may act as a custodian to environment 100 with respect to any visitors or other user entities or other elements that may approach or otherwise interact with environment 100.

One or more sensors 428 of door 120, alone or in combination with other smart devices and/or rules-based inference engines and/or artificial intelligence and/or any other processing capabilities provided at environment 100 and/or otherwise by services platform 200, may be operative to detect when a package is attempted to be delivered to smart-home environment 100, and then door 120 may be operative to take one or more of a variety of automated actions in response to such detection. For example, as shown in FIG. 1, if a visitor entity or deliverer DL (e.g., a human courier or a drone or otherwise) is attempting to deliver a package PL to a portion of environment 100, such as to structure 150 at a door 120, door 120 may be operative to access certain package identification information associated with package PL. Door 120 may be operative to receive certain package identification information from deliverer DL, such as by deliverer DL actively physically communicating such package identification information to door 120 (e.g., audibly to any suitable sensing component 428 of door 120) and/or by deliverer DL electronically communicating such package identification information to a networking communication component 462 of door 120 (e.g., by communicating digital data from a deliverer's mobile device 266, which may be similar to a user device 166) using any suitable communications protocol (e.g., via a communication path 107). Door 120 may be operative to access certain package identification information directly from package PL, such as by a scanner sensing component 428 of door 120 that may be operative to scan information (e.g., code information) from a label ID (e.g., a shipping label or delivery label) coupled to or otherwise associated with package PL (e.g., via a communication path 105). In response to detecting such package identification information of package PL, platform 200 (e.g., door 120, alone or in combination with other smart devices and/or rules-based inference engines and/or artificial intelligence provided at environment 100 and/or services platform 200) may be operative to access additional information based on that detected package identification information (e.g., the sender, recipient, a description of the contents of package PL, whether signature is required to complete the delivery, etc.) and/or to take one or more of a variety of automated actions based on that detected package identification information and/or additionally accessed information.

Such package identification information that may be associated with a package (e.g., package PL) may be generated by any suitable entity or combination of entities using any suitable data. In some embodiments, certain package identification information that may be associated with package PL may uniquely identify a particular smart-home environment 100 and/or a system user registered with or otherwise associated with environment 100 (e.g., a resident of environment 100) and/or a mode setting thereof, such that an entity with access to such package identification information may be able to access additional information associated with that environment 100 or user of environment 100. For example, a delivery entity (e.g., a courier service) that may be in the process of delivering package PL to environment 100 may use certain package identification information to access any suitable smart environment data (e.g., dynamic data) regarding environment 100 or a user thereof that may be identifiable by that package identification information for increasing the convenience and efficiency of package delivery. Such smart environment data may be indicative of a status of environment 100 and/or of a particular user of environment 100 (e.g., the availability of someone at environment 100 to receive package PL), such that a delivery entity may be able to utilize such smart environment data for more efficiently attempting to deliver package PL.

System 164 may enable proper drop-off of package PL by providing an accessory device that may be coupled to package PL for enabling secure record keeping and/or measuring and/or analyzing of package PL by system 164 (e.g., by door 120). For example, rather than instructing deliverer DL towards a safe or lobby that may be temporarily made accessible to deliverer DL for depositing package PL (e.g., by temporarily unsealing and/or unlocking and/or unlatching at least a portion of door 120 (e.g., a top portion (e.g., an upper door body portion 124*u* but not a lower door body portion 124l of a door body of a dutch door 120))), system 164 may utilize door 120 or any other suitable smart device of environment 100 to instruct deliverer DL to couple an accessory component 470 to package PL and then to leave package PL with accessory component 470 near door 120 for secure handling. As shown in FIG. 1, accessory component 470 of door 120 may be coupled to package PL (e.g., fastened, adhered, affixed, snapped, tied to, rest on, or otherwise attached), where accessory component 470 may be operative to communicate with or be detected by any other component(s) of door 120 (e.g., any suitable communications component 462 (e.g., Bluetooth) and/or sensor component 428) or any other suitable components of environment 100 or platform 200 when coupled to package PL such that platform 200 may keep a record of and/or measure and/or analyze the location and/or any other suitable characteristic(s) of package PL (e.g., based on the measured and/or analyzed location and/or any other suitable characteristic(s) of accessory component 470). For example, accessory component 470 may be configured to include any suitable sensing components (e.g., motion sensing components or any other suitable sensing components as described above with respect to sensing components 428) that may detect movement or any other suitable characteristic of accessory component 470 and, thus, package PL when coupled thereto, and such sensed characteristics may be communicated to or otherwise detected by any other component(s) of door 120 and/or any other suitable smart device of environment 100 and, thus, system 164. Alternatively or additionally, door 120 and/or any other suitable smart device of environment 100 may be operative to detect the location of accessory component 470 such that if package PL is moved after deliverer DL leaves package PL (e.g., by an animal or wind or otherwise), door 120 and/or any other suitable smart device of environment 100 may be operative to keep a record of such movement for use in finding package PL for recovery. Such a physical coupling of package PL to a component of environment 100 (e.g., accessory 470 of door 120) may increase the ability and/or effectiveness of system 164 to securely keep a record of and/or measure and/or analyze and/or handle a package during and after an unsupervised drop-off. Accessory component 470 may be reusable anytime a new package is to be deposited for secure handling by door 120 and/or any other suitable smart device of environment 100. As just one example, accessory component 470 may be an RFID tag that may be communicatively coupled to or otherwise recognized by another component of door 120. Any movement of package PL (e.g., as may be detected through using accessory component 470) at all or above a certain threshold may trigger one or more additional sensing components of door 120 or otherwise of environment 100 to keep a record of and/or measure and/or analyze and/or handle package PL/component 470 so as to heighten the secure supervision of package PL. Accessory component 470 may be operative to wirelessly communicate with other components of door 120 and/or any other suitable smart device of environment 100 and/or may communicate via a wire 472 that may extend between accessory component 470 and other any other suitable components of door 120 (e.g., of head unit 404/door body 124). If wire 472 is cut or otherwise disrupted, additional heightened security may be enacted by system 164 to keep a record of package PL. In some embodiments, a holder 471 of door 120 and/or any other suitable smart device of environment 100 may be selectively opened and closed (e.g., through electronic control of system 164) for selectively enabling accessory component 470 to be removed from the remainder of door 120 and/or any other suitable smart device of environment 100 for attachment to package PL.

Once package PL has been disposed in a secure area of environment 100 or otherwise disposed for secure handling (e.g., using accessory component 470) by deliverer DL, system 164 may continue to intermittently or continuously supervise package PL and/or the secure area (e.g., area AL) to maintain the security of the dropped-off package. As one example, environment 100 may be configured to continuously or intermittently keep a record of and/or measure and/or analyze and/or supervise the position of dropped-off package PL, such as by detecting status data from accessory component 470 coupled to package PL or by sensing package PL within area AL or by confirming that a secure area (e.g., a lobby or safe) has remained inaccessible since disposal of package PL therein. After any suitable supervising period of any suitable length during which the security of package PL has been confirmed by environment 100, system 164 may be configured to communicate such security status with any suitable entity, such as delivery entity business 228 and/or any suitable user of environment 100 (e.g., an intended recipient of package PL). However, if at any time after secure disposal of package PL by deliverer DL, environment 100 detects any type of change in the status of package PL or of a secure area or component with which environment 100 may be securing package PL, any suitable sensing functionality of environment 100 may be activated or enhanced and/or any suitable alarm or notification functionality may be activated. For example, if any movement of package PL is detected by environment 100 (e.g., by a motion sensing component 428 of door 120), additional sensing components of environment 100 (e.g., a camera sensor 428 of door 120) and/or other helpful components of environment 100 (e.g., outdoor lighting 114) may be activated to sense additional information about the status of package PL and/or its surroundings (e.g., whether an animal or other entity may be moving package PL). Alternatively or additionally, in such instances, an alarm may be activated and communicated within structure 150 (e.g., if any occupancy currently exists within structure 150) and/or outside of environment 100 (e.g., at door 120 and/or to any suitable law enforcement entities 222 or delivery entity business 228 or users of environment 100 for aid in securing package PL). When a package PL has been deposited by deliverer DL for secure handling by environment 100, any suitable events may be supervised for enhancing the protection of package PL, including, for example, detecting when any unrecognized or unregistered user or visitor may come within a certain distance of a secure area at which package PL has been deposited. For example, door 120 or any other suitable portion of smart environment 100 that may be able to handle package PL may be equipped with walkup-identification technology (e.g., face recognition, RFID, ultrasonic sensors) that may "fingerprint" or create or otherwise have access to a "signature" for recognized or registered users of environment 100, such that, in operation, when a person who does not live in the home or is otherwise not registered with the smart-home or whose fingerprint or signature is not recognized by the smart-home "walks up" to package PL, environment 100 may provide an alarm and/or may increase the protection of package PL by activating a new form of package supervising/securing (e.g., a more sensitive movement sensor with respect to package PL).

When a package PL has been left by a deliverer DL at environment 100, system 164 may be configured to communicate information indicative of that package deposit to any suitable entity (e.g., a system user of environment 100 and/or delivery entity business 228 and the like). Additionally or alternatively, system 164 may be configured to send any suitable reminders at any suitable moment to a system user or delivery entity or other suitable entity that may keep such an entity mindful of the status of a package that has been left at environment 100 but that has not yet been claimed by a system user. Such reminders may be achieved via any suitable communication technique, such as e-mail, telephone, text message, alert via any suitable smart device (e.g., via a user interface of a hazard device 104 within structure 150 or via a user interface 412 of door 120 that may be easily detected by a user of environment 100 upon walking up within structure 150 to internal side 124i of door body 124 of door 120 (e.g., via an internal display user interface 431i) or upon approaching the exterior of structure 150 to external side 124e of door body 124 of door 120 (e.g., via an external display user interface 431e)). As just one example, when a recognized or registered system user of environment 100 arrives at structure 150 (e.g., at door 120), door 120 may be operative to detect that arrival and, responsive thereto, communicate to that user that package PL has been recently left by deliverer DL for user retrieval (e.g., an audible or textual message via an output component of door 120 that may state or otherwise present a message indicative of something along the lines of "welcome home user X, a package PL was delivered by delivered by deliverer DL at time Y and is currently secured at location Z awaiting your retrieval"). Alternatively, a simple blinking light may be provided by door 120 (e.g., by projector 430) when a package is awaiting user retrieval.

The components of door 120 may be arranged in any suitable manner with respect to door body 124 and door frame 130. For example, as shown in FIG. 4B, when door 120 is closed (e.g., when door body 124 is positioned to block door frame passageway 135), a first side of door 120, such as an external side of door 120 with respect to enclosure 150 if door 120 separates an interior room 152 of enclosure 150 from ambient environment AE, may include an external side 124e of door body 124 and an external side 130e of door frame 130. External side 124e of door body 124 may at least partially expose or otherwise functionally provide external display user interface 431e, an external projector 430e, one or more external audio speakers 436e, one or more external microphones 444e, one or more external sensors 428e (e.g., one or more external cameras, external temperature sensors, external humidity sensors, external occupancy sensors, external ambient light sensors, external fire sensors, external smoke sensors, external carbon monoxide sensors, external active proximity sensors, external passive infrared motion sensors, external ultrasound sensors, external scanner sensors, external biometric sensors, external NFC sensors, and/or the like), external handle portion 481 of smart doorknob 122 and/or any other suitable user interface for a smart door lock and/or smart door latch, any suitable user interface portions of smart doorbell 106, any other suitable external user interface(s) 412e, holder 471 for selectively enabling accessory component 470 to be removed from the remainder of door 120, one or more external vent openings 457e of vent 457 (e.g., any suitable ventilation panels (e.g., any suitable electro-mechanical ventilation panels) that may each be controlled by any suitable actuator(s) 207 and/or any controller(s) of system 199 to open and/or close in any suitable direction(s) and/or amount(s) and/or with any suitable filter(s)), an external sub-door surface 452e of a sub-door 452, and/or any other suitable features of door 120. Moreover, as shown in FIG. 4B, at least a portion of sealing mechanism 409u may extend over any suitable portion of external side 130e of door frame 130 and any suitable portion of external side 124e of door body 124 (e.g., for sealing one or more body-frame gaps of door frame passageway 135 that may exist between door frame 130 and any suitable portion(s) of door body 124 along an upper edge or top surface of door body 124 and/or at one or more top corners of door body 124 and/or at one or more upper portions of one or more side surfaces of door body 124) and/or at least a portion of sealing mechanism 409l may extend over any suitable portion of external side 130e of door frame 130 and any suitable portion of external side 124e of door body 124 (e.g., for sealing one or more body-frame gaps of door frame passageway 135 that may exist between door frame 130 and any suitable portion(s) of door body 124 along a lower edge or bottom surface of door body 124 and/or at one or more bottom corners of door body 124 and/or at one or more lower portions of one or more side surfaces of door body 124).

Additionally, as shown in FIG. 4C, when door 120 is closed (e.g., when door body 124 is positioned to block door frame passageway 135), a second side of door 120, such as an internal side of door 120 with respect to enclosure 150 if door 120 separates an interior room 152 of enclosure 150 from ambient environment AE, may include an internal side 124i of door body 124 and an internal side 130i of door frame 130. Internal side 124i of door body 124 may at least partially expose or otherwise functionally provide internal display user interface 431i, an internal projector 430i, one or more internal audio speakers 436i, one or more internal microphones 444i, one or more internal sensors 428i (e.g., one or more internal cameras, internal temperature sensors, internal humidity sensors, internal occupancy sensors, internal ambient light sensors, internal fire sensors, internal smoke sensors, internal carbon monoxide sensors, internal active proximity sensors, internal passive infrared motion sensors, internal ultrasound sensors, internal scanner sensors, internal biometric sensors, internal NFC sensors, and/or the like), internal handle portion 489 of smart doorknob 122 and/or any other suitable user interface for a smart door lock and/or smart door latch, any other suitable internal user interface(s) 412i, one or more internal vent openings 457i of vent 457, an internal sub-door surface 452i of sub-door 452, and/or any other suitable features of door 120. Moreover, as shown in FIG. 4C, at least a portion of sealing mechanism 409u may extend over any suitable portion of internal side 130i of door frame 130 and any suitable portion of internal side 124i of door body 124 (e.g., for sealing one or more body-frame gaps of door frame passageway 135 that may exist between door frame 130 and any suitable portion(s) of door body 124 along an upper edge or top surface of door body 124 and/or at one or more top corners of door body 124 and/or at one or more upper portions of one or more side surfaces of door body 124) and/or at least a portion of sealing mechanism 409l may extend over any suitable portion of internal side 130i of door frame 130 and any suitable portion of internal side 124i of door body 124 (e.g., for sealing one or more body-frame gaps of door frame passageway 135 that may exist between door frame 130 and any suitable portion(s) of door body 124 along a lower edge or bottom surface of door body 124 and/or at one or more bottom corners of door body 124 and/or at one or more lower portions of one or more side surfaces of door body 124). Although possible to be exposed by an external side of door 120 or to not be exposed by either the internal or external side of door 120 but rather hidden between a side surface of door body 124 and door frame 130, the internal side of door 120 as shown in FIG. 4C may include at least a portion of upper hinge mechanical coupling 403u that may include or be controlled by an upper hinge actuator 407u and/or lower hinge mechanical coupling 403l that may include or be controlled by a lower hinge actuator 407l (e.g., for controlling movement (e.g., rotation) of one or more portions of door body 124 with respect to door frame 130 about axis R (e.g., a shared axis of hinge coupling mechanisms 403u and 403l) for moving such portion(s) out from door frame passageway 135). Additionally or alternatively, as shown in FIGS. 4C and 6B, an arm actuator 407a may be physically coupled to door body 124 and door frame 130 and may be operative to selectively push door body 124 away from door frame 130 or selectively pull door body 124 towards door frame 130 (e.g., an actuatable arm may extend between door body 124 and door frame 130 with a variable length (e.g., expand in direction of arrows D or contract in the direction of arrows R of FIG. 6B) for controlling at what angle door body 124 may rotate about axis R for selectively exposing or blocking door frame passageway 135).

System 199 may be configured to provide stage-dependent functionality of a smart door based upon detecting different stages of a user's interaction with the door or otherwise with the smart environment and/or upon detecting different stages of a user's approach towards the door that may satisfy different triggering events. As mentioned, a smart door may be configured to carry out various functions, including, but not limited to, sealing or unsealing one or more body-frame gaps between the door body and door frame of the door when the door is closed or substantially closed, locking or unlocking the door, latching or unlatching the door, and/or exposing or blocking a door frame passageway of the door by moving the door body of the door with respect to the door frame of the door. The ability to carry out certain ones of such functionalities may be dependent upon other ones of such functionalities being carried out first. For example, in some embodiments, a door body may not be moved with respect to a door frame for transitioning the door from a closed position to one or more open positions unless the door is unsealed (e.g., a sealing mechanism of a sealed door may prevent movement of the door body with respect to the door frame for opening the door) and/or unless the door is unlocked (e.g., a locking mechanism of a locked door may prevent movement of the door body with respect to the door frame (e.g., for preventing the door from opening (e.g., until the locking mechanism is unlocked))) and/or unless the door is unlatched (e.g., a latching mechanism of a latched door may prevent movement of the door body with respect to the door frame (e.g., for preventing the door from opening (e.g., until the latching mechanism is unlatched))). As another example, in some embodiments, a door body may not be sealed unless the door is in a closed or substantially closed position (e.g., a portion of a door body of an open door may prevent actuation of a sealing mechanism for sealing the door. As another example, in some embodiments, a door body may not be latched closed unless the door is in a closed or substantially closed position (e.g., a portion of a door body of an open door may prevent actuation of a latching mechanism for latching the door closed). As another example, in some embodiments, a door body may not be locked closed unless the door is in a closed or substantially closed position (e.g., a portion of a door body of an open door may prevent actuation of a locking mechanism for locking the door closed). As another example, in some embodiments, a door body may not be unlatched with respect to a door frame unless the door is unlocked (e.g., a locking mechanism of a locked door may prevent a latching mechanism of a latched door from unlatching (e.g., a doorknob may include a spindle that, if locked, may be prevented from moving in such a way as to enable a latch to be unlatched). Therefore, in some embodiments, one or more first actions must be carried out before one or more second actions may be carried out for enabling one or more particular functionalities of a smart door. For example, in some particular embodiments, a door may be configured such that it must be unsealed and unlocked and unlatched before it may be opened. Therefore, certain service functions must be carried out in one of one or more particular orders for a particular type of smart door to function properly.

When a first type of service function ought to be carried out before a second type of service function ought to be carried out in order to achieve a particular end result for a door (e.g., when an unsealing service function ought to be carried out before an opening service function ought to be carried out for positioning a door body in an open position with respect to a door frame), then different triggering events may be detected and used to initiate such different service functions in order to provide an efficient yet secure process for achieving the end result. As mentioned, smart doors 120 are often used for moving a door body 124 with respect to a door frame 130 for enabling or preventing one or more user entities to pass through a door frame passageway 135. However, even when door body 124 is in a closed position with respect to door frame 130, door 120 may still enable certain elements (e.g., air, smoke, water, etc.) to pass through a body-frame gap of door frame passageway 135 unless an effective sealing mechanism 409 is engaged for forming a strong seal (e.g., to prevent unwanted air or water transfer through the gap). However, activation of such a sealing mechanism for forming such a strong seal (i.e., a sealing process) and/or deactivation of such a sealing mechanism for breaking such a strong seal (i.e., an unsealing process) may take at least a particular amount of time, which may delay the ability for the door to move from a closed position to an open position (i.e., an opening process), such that a user hoping for a closed door to be opened may first be forced to wait until the completion of an unsealing process. Therefore, it may be helpful, faster, improved, and/or better to initiate an unsealing process at a moment prior to when it may be desirable to initiate an opening process. A smart door may be configured to initiate an unsealing process in response to detecting any suitable unsealing triggering event and to initiate an opening process in response to detecting any suitable opening triggering event that may be different than the unsealing triggering event. Similarly, other service functions of a smart door may be triggered in response to detecting respective triggering events (e.g., a smart door may be configured to initiate an unlocking process in response to detecting any suitable unlocking triggering event and to initiate an unlatching process in response to detecting any suitable unlatching triggering event that may be different than the unlocking triggering event). Different triggering events may be defined in such a way so as to maintain security of the smart environment in which the smart door is provided but also to enable efficient achievement of a certain sequence of different processes respectively associated with the different triggering events.

As shown in FIGS. 5A-5E, smart environment 100 may be configured such that the detection of different triggering events may be utilized to automatically initiate different respective processes for changing a state of smart door 120, which may be separating ambient environment AE and a room 152 or any other suitable spaces. Such processes for changing a state of a smart door may include, but are not limited to, unsealing or sealing the door, unlocking or locking the door, unlatching or latching the door, opening or closing the door, and/or the like. Such triggering events that may be detected for automatically initiating such processes may include, but are not limited to, characteristics of a user of the smart environment (e.g., user location, user gesture or user action, user inputted device instructions, etc.), characteristics of any portion of the smart environment (e.g., temperature, humidity, any other suitable weather characteristics, time of day, day of week, day of month, day of year, any other suitable temporal characteristics, etc.), and/or the like. For example, any suitable sensor(s) of door 120 or otherwise of system 199 may detect or determine or identify or compute or measure or fine any suitable data that may be indicative of a potential triggering event. Such potential triggering event data may then be processed by any suitable processing component(s) of system 199 (e.g., processor 414 of smart door 120 itself, a processor of any other smart device that may be communicatively coupled to smart door 120, a processor of system 164, and/or the like (e.g., any suitable processor(s), controller(s), central processing unit(s), microcontroller unit(s), etc.)) to determine whether or not the detected potential triggering event data (e.g., alone or in combination with any other data that may be available to the processing component(s)) satisfies the requirement(s) of any particular triggering event (e.g., as may be defined in any suitable manner (e.g., by software, inferences (e.g., rules-based or learning-based inferences), preferences, other system characteristic data (e.g., location, time of day, current environment occupancy, etc.))) for transitioning smart door 120 from its current door state to a new door state. Then, when a determination is made that the detected potential triggering event data does satisfy a particular triggering event for transitioning smart door 120 from its current door state to a new door state, the suitable processing component(s) may communicate any suitable door state transitioning instruction data to any appropriate component(s) of smart door 120 that may be received and utilized by smart door 120 to transition smart door 120 to such a new door state.

A smart door may be configured to be in any suitable default door state given a particular default environment state of the smart environment. As just one example, when the smart environment is determined to be in a default or secured and sealed or first environment state, such as when a space protected by a smart door (e.g., room 152 of FIGS. 5A-5E) is unoccupied and a difference in temperature between the two spaces separated by the smart door (e.g., ambient environment AE and room 152 of FIGS. 5A-5E) is greater than a certain threshold (e.g., 20°) or the like, then system 199 may be configured to control the smart door such that the smart door is in a particular default or secured and sealed or first door state, where the door is closed, latched, locked, and sealed. Such a state may be shown by a first door state 500A of FIG. 5A, in which smart door 120 of smart environment 100 may be in a closed state, a latched state, a locked state, and a sealed state. Such a closed state of first door state 500A may be a state in which door body 124 may be completely or substantially completely positioned within door frame passageway 135. Such a latched state of first door state 500A may be a state in which the closed position of door body 124 within door frame passageway 135 may be held absent some manual interaction by any user (e.g., actuator(s) 407 controlling mechanical coupling(s) 403 may hold door body 124 within door frame passageway 135 absent a user manually pushing or pulling door body 124 from that closed position or absent a user approaching the door within a particular threshold, latch 486 may engage plate 490 of doorknob 122 for holding door body 124 within door frame passageway 135 absent a user manually engaging doorknob 122 for disengaging latch 486 from plate 490 or absent a user approaching the door within a particular threshold, etc.). Such a locked state of first door state 500A may be a state in which the closed position of door body 124 within door frame passageway 135 may be held absent a user successfully being authenticated as an entity with authority to unlock door 120 (e.g., actuator(s) 407 controlling mechanical coupling(s) 403 may hold door body 124 within door frame passageway 135 absent a user being authenticating as an entity with authority to unlock door 120 (e.g., via any suitable authentication process(es) and device(s) of system 199), spindle 484 may engage or otherwise lock latch 486 for preventing latch 486 from being able to disengage from plate 490 of doorknob 122 for holding door body 124 within door frame passageway 135 absent a user being authenticating as an entity with authority to unlock door 120, etc.). Such a sealed state of first door state 500A may be a state in which one, some, or each body-frame gap that may exist between door body 124 and door frame 130 may be sealed by any suitable sealing mechanism(s) 409 (e.g., actuator(s) 407 controlling sealing mechanism(s) 409 may hold such sealing mechanism(s) 409 in an activated state for blocking or otherwise sealing one, some, or each body-frame gap that may exist between door body 124 and door frame 130 (e.g., as a portion of door frame passageway 135)).

A smart door may be configured to transition from a first door state, in which the door may be closed, latched, locked, and sealed, to a second door state, in which the door may remain closed, latched, and locked, but may be unsealed. Such a transition from a sealed state to an unsealed state may be carried out automatically by the smart system in response to the detection of any suitable unsealing or first triggering event(s), such as detection of any suitable user action that may be indicative of a user's potential intention to pass through the smart door. As just one example, when the smart environment, in a default or secured and sealed environment state, detects any suitable user (e.g., pet, visitor, occupant, etc.) within a threshold distance of the smart door (e.g., within a threshold distance TDE from external side 124e of door 120's door location PD and/or within a threshold distance TDI from internal side 124i of door 120's door location PD, which may be the same or different distances), and/or otherwise detects any suitable user approach to the smart door, then system 199 may be configured to transition to a secured but unsealed or second environment state, and system 199 may be configured to control the smart door such that the smart door may transition to a secured but unsealed or second door state, where the door is closed, latched, and locked, but unsealed. For example, any suitable sensor(s) of door 120 or otherwise of system 199 (e.g., a radar sensor 428 of smart door 120, a camera sensor 428 of smart door 120, a motion sensor or infrared sensor (e.g., passive or active) or other suitable sensor 428 of smart door 120) may detect any suitable data that may be indicative of such a user's approach as a potential triggering event (e.g., any suitable walkup-identification technology (e.g., face recognition, RFID, ultrasonic sensors) may be utilized to detect such potential triggering event data). As another example, the transition may occur in response to detection of any user action that may indicate any possibility of the door being opened in the somewhat near future (e.g., detection of a user interacting with (e.g., pressing, attempting to ring for contacting an occupant, etc.) a user interface button of a doorbell 106 that may be distinct from door 120 and/or with a user interface button of a doorbell 106 of door 120 or any other user interface 412 of door 120 or otherwise of system 199). As another example, the transition may occur in response to detection of any user action that may indicate any possibility of the user approaching the door in the somewhat near future (e.g., detection of the user entering a space protected by the door (e.g., user entering room 152 via another door of room 152 (e.g., a garage door for a car opening where the smart door to be transitioned is a door leading from the garage to the user's kitchen))). Such a state may be shown by a second door state 500B of FIG. 5B, in which smart door 120 of smart environment 100 may be in a closed state, a latched state, and a locked state, but an unsealed state (e.g., a state that may be transitioned to when a user UE in ambient environment AE is detected to be within threshold distance TDE of external side 124e of door 120's door location PD (e.g., in response to user UE moving in the direction of arrow E1 from user position P1 of FIG. 5A to user position P2 of FIG. 5B)). Such a closed state of second door state 500B may be the same as the closed state of first door state 500A, such a latched state of second door state 500B may be the same as the latched state of first door state 500A, and such a locked state of second door state 500B may be the same as the locked state of first door state 500A. However, as shown, such an unsealed state of second door state 500B may differ from the sealed state of first door state 500A, in that such an unsealed state of second door state 500B may be a state in which one, some, or each body-frame gap that may exist between door body 124 and door frame 130 may be unsealed by any suitable sealing mechanism(s) 409 (e.g., actuator(s) 407 controlling sealing mechanism(s) 409 may hold such sealing mechanism(s) 409 in a de-activated state for unblocking or otherwise unsealing one, some, or each body-frame gap that may exist between door body 124 and door frame 130 (e.g., as a portion of door frame passageway 135)). Particularly, as shown in FIG. 5B, first sealing mechanism 409u may be selectively controlled not to seal upper body-frame gap 135gu, while second sealing mechanism 409l may be selectively controlled not to seal lower body-frame gap 135gl. Therefore, system 199 may be operative to predicatively disengage or unlock or open or unfasten or unseal or free any suitable sealing mechanism(s) when any suitable triggering event data is detected by the system that is determined to satisfy any appropriately defined triggering event requirements (e.g., predictive actuated unsealing of a front door responsive to sensor-detected user approach may be enabled).

As may be seen by the differences between FIGS. 5A and 5B, any suitable mechanical and/or electrical and/or structural and/or other suitable portions of any suitable sealing mechanisms 409u and 409l or actuator(s) thereof may be configured such that they may hinder or prevent movement of door body 124 out from door frame passageway 135 when such sealing mechanisms 409u and 409l are in their sealed state of FIG. 5A, but such that they may not hinder or not prevent or at least hinder less movement of door body 124 out from door frame passageway 135 when such sealing mechanisms 409u and 409l are in their unsealed state of FIG. 5B. Therefore, transitioning door 120 from a sealed state to an unsealed state may be a requirement or at least a preference or at least a faster and/or improved and/or better sub-process for enabling door 120 to transition from a closed state to an open state. However, such unsealing alone may not enable door 120 to transition from a closed to an open state, as unlocking and/or unlatching may also be necessary for such a closed to open transition in some embodiments. Therefore, while the transition from closed, latched, locked, and sealed first door state 500A to closed, latched, locked, and unsealed second door state 500B may configure door 120 to be in a closed state that may be more easily transitioned to an open door state (e.g., due to an unsealing transition having already occurred, which may require any suitable length of time or noise emission or the like), such a transition from closed, latched, locked, and sealed first door state 500A to closed, latched, locked, and unsealed second door state 500B may still keep the door secure in that it may not be opened without first being unlocked and/or unlatched. Thus, system 199 may be configured to transition between first door state 500A and second door state 500B in response to detection of any suitable triggering event(s) (e.g., unsealing or first triggering event(s)) that may be utilized by system 199 to anticipate a potential need for opening the door but that may not on their own be utilized by system 199 to authenticate a user's authorization for unlocking the door. Such triggering events may enable system 199 to safely adjust a state of a door through pre-emptive unsealing such that the door may more quickly be opened in the future while still maintaining the security of the door.

A smart door may be configured to transition from a second door state, in which the door may be closed, latched, locked, and unsealed, to a third door state, in which the door may remain unsealed and closed and, optionally latched, but may be unlocked. Such a transition from a locked state to an unlocked state may be carried out automatically by the smart system in response to the detection of any suitable unlocking or second triggering event(s), such as detection of any suitable user action that may be indicative of a user's authority to pass through the smart door. As just one example, when the smart environment, in a secured and unsealed but closed environment state, detects an authorized user (e.g., pet, visitor, occupant, etc.) with authority to pass through the smart door (e.g., by authenticating, in any suitable manner, a user with any suitable relationship to the door (e.g., within any suitable distance of the door)), then system 199 may be configured to transition to an unsecured and unsealed but closed or third environment state, and system 199 may be configured to control the smart door such that the smart door may transition to an unsecured and unsealed but closed or third door state, where the door is closed, but unlocked and unsealed (and optionally unlatched or still latched). Various different kinds of sensors can be used to determine a user's authority to pass through a door frame passageway (e.g., to authenticate a user's authority to unlock a locked door), such as video cameras with AI-trained face recognition, RFID detection sensors, NFC detection sensors, ultrasonic sensors, voice recognition sensors, any suitable user biometric information recognition sensors, and/or the like for authenticating a particular user's authorization or for authenticating a particular type of user's authorization or the like. Such an unsecured and unsealed but closed or third environment state may be shown by a third door state 500C of FIG. 5C, in which smart door 120 of smart environment 100 may be in a closed state, a latched state or unlatched state, an unsealed state, but an unlocked state (e.g., a state that may be transitioned to when a user UE in ambient environment AE is detected to be a user with authorization to pass through door 120 from ambient environment AE to room 152). Such a closed state of third door state 500C may be the same as the closed state of first door state 500A and of second door state 500B, and such an unsealed state of third door state 500C may be the same as the unsealed state of second door state 500B. However, as shown, such an unlocked state of third door state 500C may differ from the locked state of second door state 500B, in that such an unlocked state of third door state 500C may be a state in which latching feature 490*f* of latch 486 may be disengaged from door frame 130 (e.g., actuator(s) 407 controlling doorknob 122 may retract feature 490*f* into door body 124 for unlocking door body 124 from frame 130). Alternatively, such an unlocked state of third door state 500C may differ from the locked state of second door state 500B in any other suitable way such that door body 124 may be unlocked from door frame 130 (e.g., actuator(s) 407 controlling mechanical coupling(s) 403 may not move door body 124 out from within door frame passageway 135 but may transition from requiring door body 124 remain in door frame passageway 135 to holding door body 124 in such a way that any manual user interaction with door body 124 may move door body 124 out from door frame passageway 135 (e.g., no locking or latching feature of a door body may be disengaged from a door frame for mechanically de-coupling the door body and door frame in any way, but mechanical coupling(s) 403 and/or actuator(s) 407 thereof may be adjusted for enabling a user to manually move the door body with respect to the door frame rather than preventing a user from manually moving the door body with respect to the door frame)).

Figure 5C:
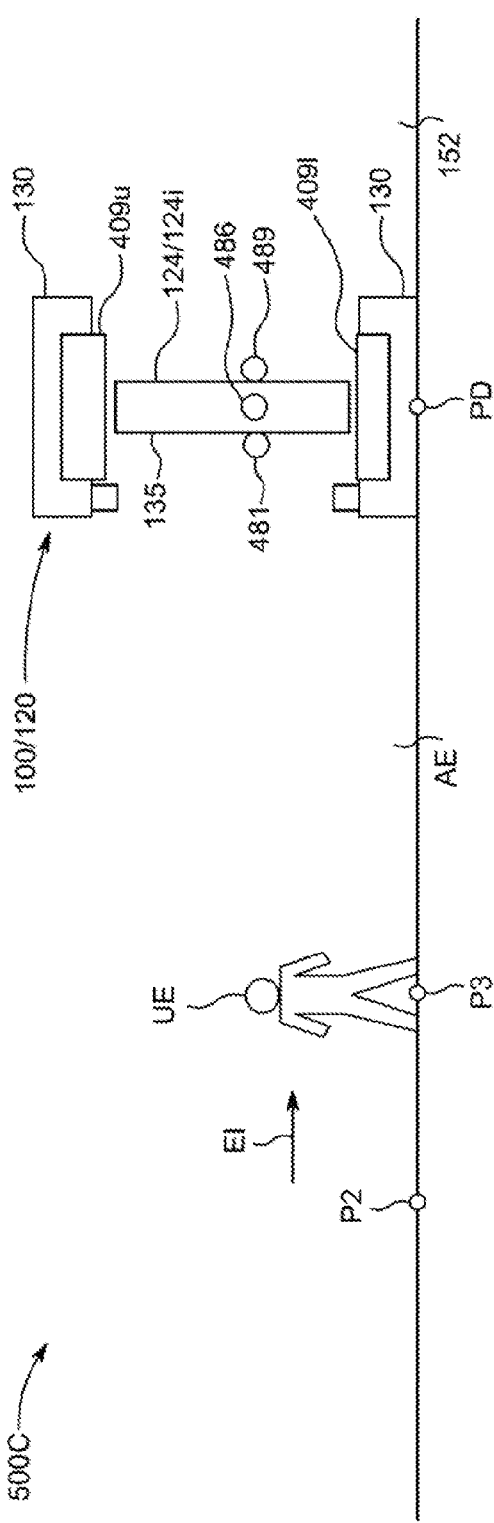

As may be seen by the differences between FIGS. 5B and 5C, a locking feature (e.g., feature 529*f* of doorknob 122 or of mechanical coupling(s) 403 or actuators thereof or otherwise) may be configured to lock door body 124 in its locked state of FIG. 5B, but may be configured to unlock door body 124 for transitioning door 120 to its unlocked state of FIG. 5C, while still maintaining door body 124 in its closed state. Therefore, transitioning door 120 from an unsealed but locked and closed state to an unsealed but unlocked yet still closed state may be a requirement or at least a preference or at least a faster and/or improved and/or better sub-process for enabling door 120 to transition from a closed state to an open state. However, such unlocking combined with an unsealed state alone may not enable door 120 to transition from a closed to an open state, as unlatching and/or otherwise actively opening the door may also be necessary for such a closed to open transition. Therefore, while the transition from unsealed but locked and closed second door state 500B to unsealed but unlocked yet still closed third door state 500C may configure door 120 to be in a closed state that may be more easily transitioned to an open door state (e.g., due to an unlocking transition having already occurred, which may require any suitable length of time or noise emission or the like), such a transition from unsealed but locked and closed second door state 500B to unsealed but unlocked yet still closed third door state 500C may still keep the door somewhat secure or unobtrusive in that it is not yet opened. Thus, system 199 may be configured to transition between second door state 500B and third door state 500C in response to detection of any suitable triggering event(s) (e.g., unlocking or second triggering event(s)) that may be utilized by system 199 to further anticipate a potential need for opening the door but that may not on their own be utilized by system 199 to actually open the door. Such triggering events may enable the system to safely adjust a state of a door through pre-emptive unlocking (e.g., with or without any pre-emptive unlatching, which may also occur in any suitable manner during this transition or a later transition), such that the door may more quickly be opened in the future while still maintaining some security or unobtrusiveness of the door.

The system may be configured to transition automatically from second door state 500B to third door state 500C in response to detection of any suitable triggering event(s) (e.g., any suitable unlocking or second triggering event(s)). While FIG. 5C shows that user UE has moved closer to door 120 from position P2 to position P3 in the direction of arrow E1, detection of such movement may or may not be a triggering event for the transition from second door state 500B to third door state 500C. Instead, any suitable event(s) that may be operative to authenticate user UE's authority to pass through door 120 may be utilized to initiate such a transition (e.g., the user or the user's device communicating any suitable passcode to any suitable other device(s) of system 199, any suitable authenticating biometric information of the user being detected by any suitable device(s) of system 199, any suitable key fob or touch to unlock interactions, and/or the like), which may be more convenient and/or less cumbersome than requiring a user take out a set of keys and manually insert a key into a keyhole for unlocking a door. Alternatively, system 199 may be configured to transition automatically from second door state 500B of FIG. 5B back to first door state 500A of FIG. 5A (e.g., by re-sealing door 120) in response to detection of any suitable resealing triggering event(s), including, but not limited to, detection of user UE moving beyond threshold distance TDE from door 120 (e.g., when user UE moves from position P2 back to position P1 in the direction of arrow EX), any other suitable detection of the user's intention not to pass through door 120 (e.g., detection of user UE sitting down at position P2), detection of any suitable threshold duration of time elapsing after transitioning to second door state 500B without first detecting any suitable unlocking or second triggering event(s) that may otherwise incite a transition from second door state 500B of FIG. 5B to third door state 500C of FIG. 5C.

A smart door may be configured to transition from a third door state, in which the door may be closed, but unlocked and unsealed, to a fourth door state, in which the door may remain unsealed and unlocked, but may be open. Such a transition from a closed state to an open state may be carried out automatically by the smart system in response to the detection of any suitable opening or third triggering event(s), such as detection of any suitable user action that may be indicative of a user's intention to pass through the smart door imminently or immediately. As just one example, when the smart environment, in an unlocked and unsealed but closed environment state, detects a previously-authorized user (e.g., pet, visitor, occupant, etc.) make any suitable action that may be interpreted as imminently intending to pass through the smart door (e.g., by detecting, in any suitable manner, the previously-authorized user moving closer to the door or conducting any other gesture associated with opening the door (e.g., a head nod or exclamation of "open" or the like)), then system 199 may be configured to transition to an unsecured and unsealed and open or fourth environment state, and system 199 may be configured to control the smart door such that the smart door may transition to an unsecured and unsealed and open or fourth door state, where the door is unsealed and unlocked and open (e.g., opened to any suitable degree with respect to door frame 130 and in any suitable direction with respect to the user (e.g., opened towards the user or opened away from the user)). Such a state may be shown by a fourth door state 500D of FIG. 5D, in which smart door 120 of smart environment 100 may be in an unsealed state, an unlocked state, an unlatched state, and an open state (e.g., a state that may be transitioned to when a user UE in ambient environment AE is detected to be not only authorized to pass through door 120 but now also to be with intention to imminently pass through door 120 from ambient environment AE to room 152). Such an unlocked state of fourth door state 500D may be the same as the unlocked state of third door state 500C, such an unsealed state of fourth door state 500D may be the same as the unsealed state of first door state 500A and of second door state 500B and of third door state 500C, and such an unlatched state of fourth door state 500D may be the same as an unlatched state of third door state 500C (if applicable) or may be a newly unlatched stated that occurred simultaneously with the transition to the open state. However, as shown, such an open state of fourth door state 500D may differ from the closed state of third door state 500C, in that such an open state of fourth door state 500D may be a state in which at least a portion of door body 124 previously within door frame passageway 135 may be moved out from door frame passageway 135 (e.g., actuator(s) 407 controlling doorknob 122 may disengage a latching feature 490f for unlatching door body 124 from frame 130 and door 120 may be configured such that mechanical coupling(s) 403 may automatically allow door body 124 to move out from door frame passageway 135 (e.g., due to gravity or other natural forces that may automatically affect door body 124 to move in such a manner) and/or actuator(s) 407 controlling mechanical coupling(s) 403 may automatically move door body 124 out from within door frame passageway 135). System 199 may be configured to move door body 124 out from door frame passageway in any suitable direction (e.g., towards the user or away from the user (e.g., based on structural limitations of door 120 or based on any other detected characteristics of the environment (e.g., open the door towards user UE in ambient environment AE when an occupant is detected by system 199 to be standing adjacent internal surface 124i of door 120 or otherwise detecting a system user to be preferring or favoring for the door to open outwards (e.g., in response to detecting user UE gesticulate away from room 152), or open the door away from user UE and into room 152 when user UE is detected by system 199 to be too close to external surface 124e of door 120 or otherwise detecting a system user to be preferring or favoring for the door to open inwards (e.g., in response to detecting user UE gesticulate towards room 152)))). Additionally or alternatively, system 199 may be configured to move door body 124 out from door frame passageway by any suitable amount (e.g., by a limited first amount (e.g., by 15% or by any other suitable amount (e.g., angle θ1 of FIG. 6A)) based on authorization limitations of the detected user (e.g., if the user is to only be granted limited access through door frame passageway 135 (e.g., only an amount such that the user may pass a package being delivered through passageway 135 from ambient environment AE to room 152)) and/or based on any other suitable conditions that may be detected by system 199 (e.g., the user may be detected to have full access but also the ability to further open the door manually as he or she sees fit, such that the door may only be minimally opened automatically to reduce unnecessary airflow through the passageway until the user manually opens the door further (if necessary)) or by a larger or full second amount (e.g., 100% or by any other suitable amount (e.g., angle θ2 of FIG. 6A)) based on full authorization of the detected user (e.g., if the user is allowed unfettered access through door frame passageway 135 and/or based on any other suitable conditions that may be detected by system 199 (e.g., the user may be detected to have full access but also no ability to further open the door manually as he or she sees fit (e.g., due to holding a baby), such that the door may be fully opened or sufficiently opened automatically for enabling easy access by the user through the passageway without any manual user interaction))). In some embodiments, system 199 may be configured to automatically adjust an amount by which any component(s) of door 120 extend from a surface of door body 124 when door body 124 is moved by a particular amount from door frame passageway 135. For example, as shown in FIG. 6A, at least a portion or the entirety of handle portion 481 and/or of handle portion 489 of doorknob 120 may be automatically retracted into door body 124 (e.g., in the direction of respective arrows I and N) when door body 124 is moved further out from passageway 135 (e.g., from angle θ1 to angle θ2 (e.g., as may be detected by any suitable sensor(s) of the system)), for example, in order to prevent handle portion 481 hitting user UE or damaging another portion of the environment (e.g., hitting and making a hole or dent into an adjacent wall of the environment (e.g., as may be detected by any suitable sensor(s) of the system)) and/or in order to prevent handle portion 489 from catching on an accessory of user UE as the user passes by door body 124 (e.g., to prevent the user's clothing or jewelry or the like from snagging on handle portion 489 (e.g., as may be detected by any suitable sensor(s) of the system)), and at least a portion or the entirety of handle portion 481 and/or of handle portion 489 of doorknob 120 may be automatically extended out from door body 124 (e.g., in the direction of respective arrows O and X) when door body 124 is moved back toward passageway 135 (e.g., from angle θ2 to angle θ1 or back to the closed position (e.g., as may be detected by any suitable sensor(s) of the system)), for example, in order to enable handle portion 481 and/or handle portion 489 to be manually interacted with by a user. Additionally or alternatively, a hook or other suitable structural accessory 487 may be configured to automatically be extended from a surface of a smart door (e.g., from internal side 124i of door body 124 (e.g., in the direction of arrow H)), such as when the door has been closed or almost closed, in order to enable that extended hook 487 to be used by a user for hanging a purse or jacket or otherwise thereon (e.g., when such an item may be detected as being held or worn by a user passing through the door being closed or having been closed). In some embodiments, handles 481 and 489 may be positioned at different heights along their respective sides of the door, which may account for a stoop on the exterior and lack of a stoop on the interior that may affect the relationship of a user's height to the height of the handle depending on the side of the door on which the user is positioned, and positioning the handles at different heights on different sides of door may allow for a more constant user-handle relationship if a stoop is only on one side of the door.

Figure 5D:
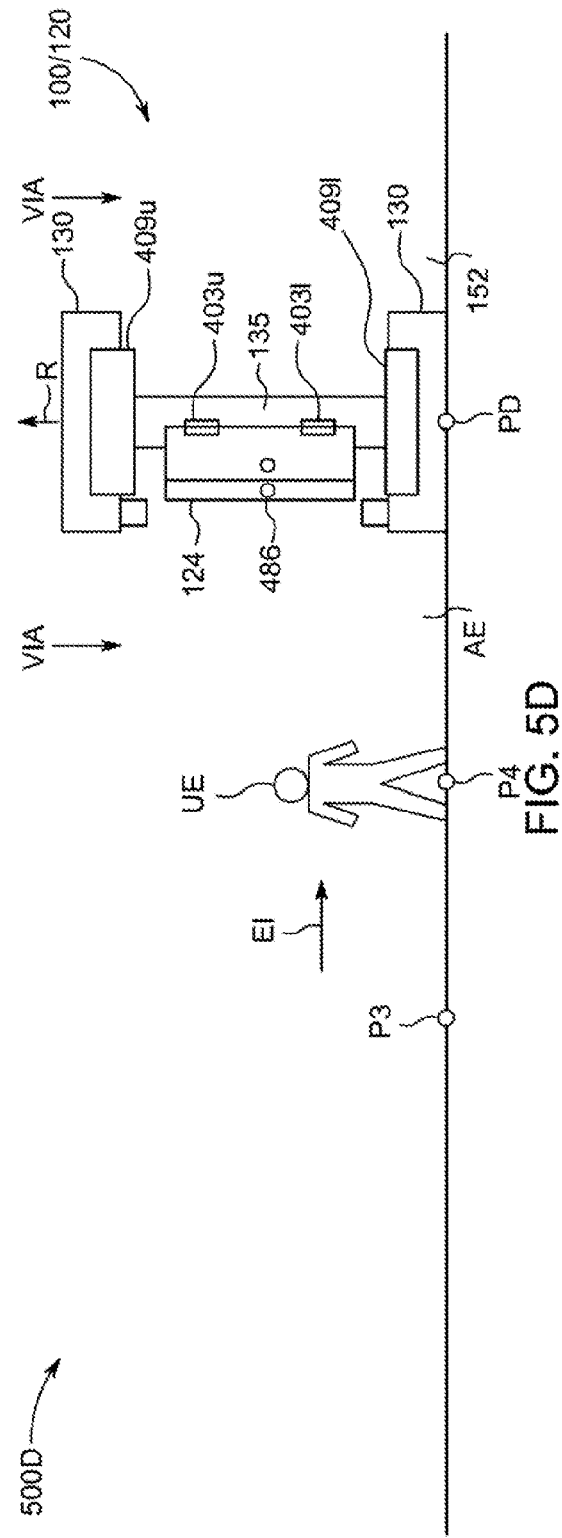
Figure 5E:
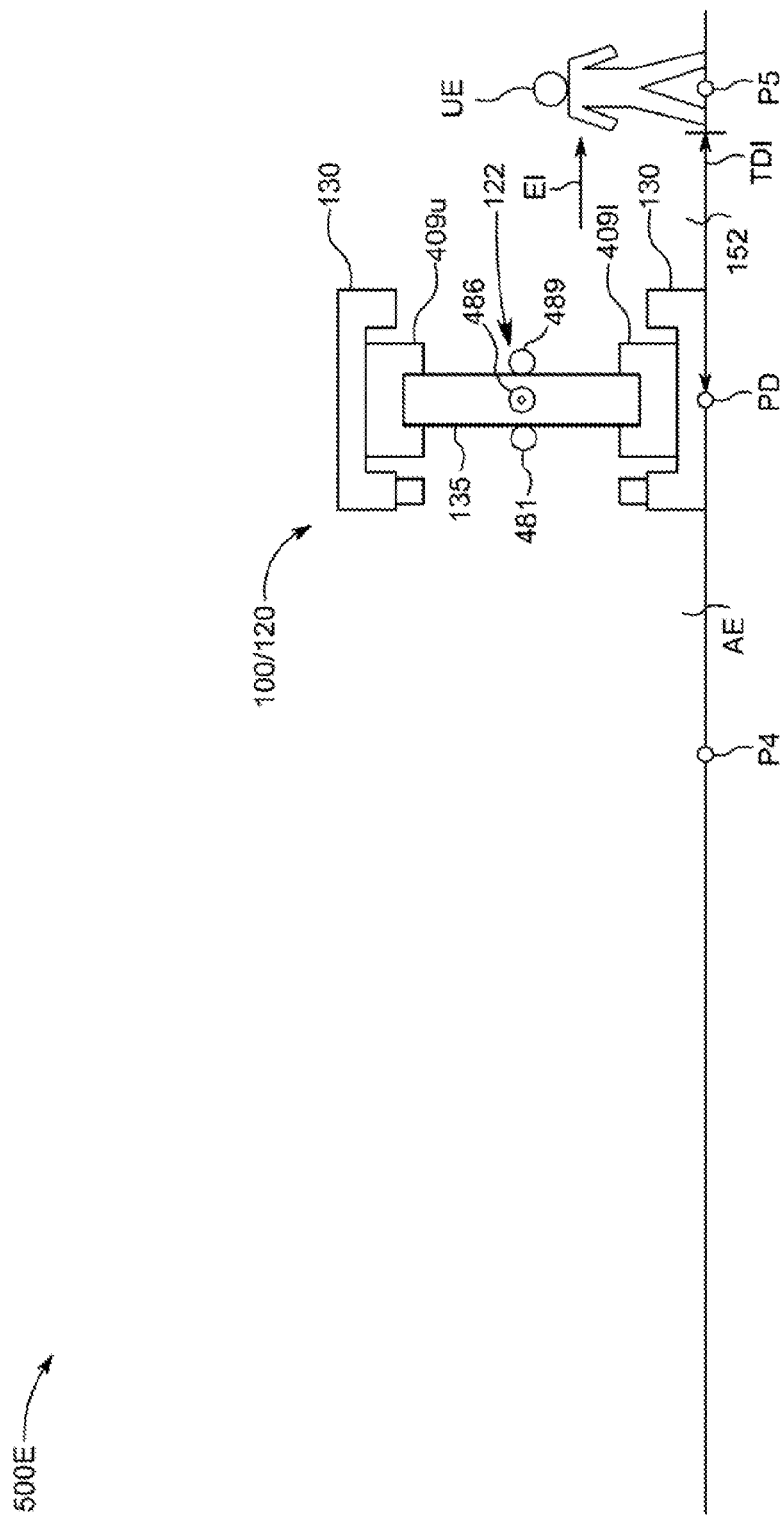

As may be seen by the differences between FIGS. 5C and 5D, any suitable door body position adjusting feature (e.g., mechanical coupling(s) 403 and/or actuator(s) 407 thereof or otherwise) may be configured to not allow door body 124 to be moved manually by a user from its closed state of FIG. 5C to any chosen open position, but may be configured to move door body 124 in any suitable direction and by any suitable amount for transitioning door 120 to its open state of FIG. 5D, while still maintaining some security over door 120 (e.g., by preventing door body 124 to move too far open or to move back towards closed so as to prevent any injuries or other undesired conditions (e.g., by preventing the door to close unless no user or other foreign objects are detected in the path of the door and/or by preventing the door to open further for limiting the access to certain users (e.g., package deliverers) and/or for limiting the passage of certain other elements (e.g., cold air, noise, etc.)). Therefore, transitioning door 120 from an unsealed and unlocked but closed state to an unsealed and unlocked and open state may be a requirement or at least a preference or at least a faster and/or improved and/or better process for enabling door 120 to allow certain passage therethrough. However, while the transition from unsealed and unlocked but closed third door state 500C to unsealed and unlocked and open fourth door state 500D may configure door 120 to be in an open state for enabling certain passage therethrough, such a transition from unsealed and unlocked but closed third door state 500C to unsealed and unlocked and open fourth door state 500D may still keep the door somewhat secure or unobtrusive even in an open state. Thus, system 199 may be configured to transition between third door state 500C and fourth door state 500D in response to detection of any suitable triggering event(s) (e.g., any suitable opening or third triggering event(s)) that may be utilized by system 199 to further handle a need for definitively opening the door but that may not on their own fully dictate by how much and for how long the door may remain open. Such triggering events may enable the system to safely adjust a state of a door through automatic opening to at least some degree (e.g., a full open or a limited open or a minimal pop-open (e.g., via a mechanical spring coupled to a mechanical coupling)) such that the door may more easily be maneuvered by a user while still maintaining some security or unobtrusiveness of the door. In some embodiments, any suitable electromagnetic mechanism(s) may be used to purposefully shift the door hinges out of alignment just enough to have the door open or shut on its own (e.g., using gravity). Once this is done, the hinges may be realigned automatically. Alternatively, unlatching without opening may be carried out such that a user need only manually touch (e.g., lean against or kick or pull or tap, etc.) or otherwise interface with any suitable component(s) of door body 124 (e.g., user interface 412) or with any other suitable user interface of the system for moving an unlatched or never latched door body out from the door frame passageway (e.g., any suitable user interface 412 may be provided by door 120 for detecting any suitable user gesture that may be detected and analyzed by system 199 for automatically controlling door 120 to unlatch and/or open by any suitable amount). For example, an external user interface 412e may be provided as a kickplate along a bottom of door body 124 or frame 130 or along any other suitable portion of the system that may detect any suitable kicking gesture (or hand or foot waving gesture or the like) by a user that may be analyzed by the system for use in automatically controlling door body 124 to be unlatched from door frame 130 and/or to move at least a portion of an unlatched or never latched door body 124 out from door frame passageway 135.

The system may be configured to transition automatically from third door state 500C to fourth door state 500D in response to detection of any suitable triggering event(s). While FIG. 5D shows that user UE has moved closer to door 120 from position P3 to position P4 in the direction of arrow E1 (e.g., to within a distance from the smart door that is shorter than distance TDE), detection of such movement may or may not be a triggering event for the transition from third door state 500C to fourth door state 500D. Instead, any suitable event(s) that may be operative to determine user UE's imminent intention to pass through door 120 may be utilized to initiate such a transition (e.g., the user communicating any suitable intention audibly or through any suitable gestures or otherwise that may be detected by any suitable device(s) of the system, and/or the like). Alternatively, system 199 may be configured to transition automatically from third door state 500C back to second door state 500B (e.g., by re-locking door 120) in response to detection of any suitable triggering event(s), such as detection of user UE moving away from door 120 (e.g., when user UE moves from position P3 back to position P2 in the direction of arrow EX) and/or any other suitable detection of the user's intention not to pass through door 120 (e.g., detection of user UE sitting down at position P3) and/or back to first door state 500A (e.g., by re-locking and re-sealing door 120) in response to detection of any suitable triggering event(s), such as detection of user UE moving beyond threshold distance TDE from door 120 (e.g., when user UE moves from position P3 back to position P1 in the direction of arrow EX) and/or any other suitable detection of the user's intention not to pass through door 120 (e.g., detection of user UE sitting down at position P2 or otherwise). Alternatively, system 199 may be configured to transition automatically from fourth door state 500D (e.g., a state in which the door may be open by any suitable amount in any suitable direction or in which the door may be closed but not latched) to a fifth door state 500E of FIG. 5E, which may be similar to third door state 500C (e.g., by closing (and possibly also latching) door 120) or that may be similar to second door state 500B (e.g., by closing (and possibly also latching) and locking door 120) or that may be similar to first door state 500A (e.g., by closing (and possibly also latching) and locking and sealing door 120), in response to detection of any suitable triggering event(s). For example, detection of any suitable triggering event(s) may be utilized by system 199 for automatically transitioning door 120 from the fourth door state 500D to the fifth door state 500E, such as detection of user UE moving through door frame passageway 135, into room 152, and beyond any suitable threshold TDI from position PD of door 120 (e.g., when user UE moves from position P4 to a position P5 in the direction of arrow E1) and/or any other suitable detection of the user's intention not to pass back through door 120 (e.g., detection of user UE communicating such an intention verbally or through any suitable gesture) and/or detection of any safe closing condition(s) (e.g., detection of no fingers or other portion of any user within or near passageway 135 or any portion of the closing path of door body 124) and/or otherwise. It should be noted that system 199 may be configured to prevent door body 124 from being moved towards passageway 135 for at least partially or fully closing door 120 when any or at least certain types of elements are detected within passageway 135 or within a certain threshold distance of passageway 135 for protecting such elements (e.g., children, pets, etc.) from potentially being damaged by closure of door 120 (e.g., using any suitable detection capabilities of system 199 (e.g., of door 120 or otherwise)). The system may be configured to automatically present the user with any suitable feedback in response to any suitable door state transition action in order to alert the user of that transition. For example, rather than a user turning around and interacting with the door in order to confirm whether or not the door has been fully closed and/or re-latched and/or re-locked (e.g., by attempting to turn handle portion 489 of doorknob 122 and/or by attempting to reopen the door by pushing against door body 124), system 199 may automatically present a closing confirmation in response to closing door 120 (e.g., a first audible and/or visible and/or tactile output via any output component of door 120 or otherwise of system 199 that may be easily detected by the user such that the user need not worry about the door being left open) and/or system 199 may automatically present a latching confirmation in response to latching door 120 (e.g., a second audible and/or visible and/or tactile output via any output component of door 120 or otherwise of system 199 that may be easily detected by the user such that the user need not worry about the door being left unlatched) and/or system 199 may automatically present a locking confirmation in response to locking door 120 (e.g., a third audible and/or visible and/or tactile output via any output component of door 120 or otherwise of system 199 that may be easily detected by the user such that the user need not worry about the door being left unlocked), such that the user may continue in the direction of arrow E1 without having to worry about whether or not the door has been resecured in one or more ways.

A smart door may be provided with any suitable mechanical coupling(s) and any suitable actuator(s) thereof such that the system may intelligently and automatically control the direction and/or the amount in which a door body may be moved with respect to a door frame passageway in response to any suitable detection of any suitable trigger events. For example, once door body 124 is initially opened any suitable amount in any suitable direction (e.g., once door 120 is transitioned to initially open door state 500D), the way in which a user may manually interact with door body 124 for further opening or closing door 120 may be limited by any suitable mechanical and/or electrical controls of system 199. As just one example, system 199 may be configured to prevent door body 124 from being moved towards passageway 135 manually by a user (or the wind or otherwise) for at least partially or fully closing door 120 when any or at least certain types of elements are detected within passageway 135 or within a certain threshold distance of passageway 135 for protecting such elements from potentially being damaged by closure of door 120 (e.g., using any suitable detection capabilities of system 199 (e.g., of door 120 or otherwise)). As another example, system 199 may be configured to prevent door body 124 from being moved away from passageway 135 manually by a user (or the wind or otherwise) for at least further or fully opening door 120 when any or at least certain types of elements are detected within the path of such potential movement for protecting such elements from potentially being damaged by such movement of door 120 and/or when certain limitations may be defined for any user who was authenticated during a transition from a locked state to an unlocked state of the door (e.g., limiting the range of openness of the door such that the user may pass a package therethrough but not enter therethrough himself or herself). Therefore, no matter how far and in what direction the door may be automatically initially opened (e.g., angle θ1), system 199 may enforce a maximum openness (e.g., angle θ2) that a user may manually further open the door (e.g., using any suitable uni-directional movement-enabling mechanism(s) of mechanical coupling(s) 403 and/or actuator(s) 407 thereof).

A smart door may include two or more distinct door body portions, such as an upper door body portion 124*u* and a lower door body portion 124*l* that may be operative to move independently of one other for opening the door in different configurations. For example, as shown in FIG. 6B, only upper door body portion 124*u* may be opened (e.g., by upper mechanical coupling 403*u* and/or actuator(s) thereof), while lower door body portion 124*l* may remain closed, if not also locked and/or latched and/or sealed (e.g., by a lower doorknob 122*l* with a lower latching and/or locking feature 486*fl* for engaging a lower portion of door frame 130), where an intermediate locking mechanism 122*m* may be provided for being selectively controlled by system 199 for latching/locking and unlatching/unlocking the different door body portions from one another. In such a configuration, which may be referred to herein as a dutch door embodiment, each door body portion may be independently controlled by the system for selectively sealing, latching, locking, and opening each door body portion independently from the other door body portion(s) (e.g., at least a first actuator 407*u* and at least a first mechanical coupling 403*u* may control movement of first door body portion 124*u* while at least a second actuator 407*l* and at least a second mechanical coupling 403*l* may independently control movement of second door body portion 124*l*). As just one example, only a second (e.g., lower) door body portion may be opened if a user determined to be imminently passing therethrough is a pet. As just one other example, only a second (e.g., lower) door body portion may be opened if a user determined to be imminently passing therethrough is a pet, while only a first (e.g., upper) door body portion may be opened (e.g., as shown in FIG. 6B) if a user determined to be imminently passing therethrough is a package of a deliverer but not the deliverer himself or herself (e.g., for preventing the deliverer and/or any pets (e.g., dogs) to pass through the door frame passageway, while still allowing the deliverer to drop a package through the door frame passageway and into room 152). As just one other example, different portions may be simultaneously opened in different directions and/or by different amounts for various reasons, such as controlling air flow through the door frame passageway in one or more particular manners.

Any suitable thresholds that may be used for defining any suitable triggering events for transitioning between any two suitable door states (e.g., threshold TDE or threshold TDI or the like) and/or any other suitable defining characteristic(s) of one or more such triggering events and/or of one or more such door state transitioning actions (e.g., amount, direction, and/or speed of door opening) can be varied based on activities or characteristics detected as occurring in the environment. More particularly, technologies including the sensors of the network-enabled smart devices in combination with rules-based inference engines or artificial intelligence provided by central server and cloud-computer system 164 or otherwise (e.g., by a smart door itself) may be used to vary thresholds and/or triggering event definitions and/or door state transitioning actions based on any suitable detected activities. Inferences about occupants' activities or otherwise can be learned based on data received over time and used to adjust how system 199 may define or detect a triggering event and/or define and/or carry out a door state transition action. For example, if any suitable smart device (e.g., a smart hazard detector 104 or a smart door 120) located in the kitchen observes increased temperature, humidity, and motion in the kitchen, then an inference can be made that one or more of the occupants are cooking (e.g., "cooking inference"). These data inputs can be considered on a sliding scale based on time of day and day of week. For example, only slight increases in temperature and humidity may invoke the cooking inference at 5:00 PM on weekdays, when history may show that is when the occupants typically cook. However, much larger increases may be required to invoke the cooking inference at 10:00 AM on a weekday, when the occupants are typically away at that time. In some embodiments, a smoke-alarm threshold (e.g., a threshold by which a door body portion may be opened for increasing air flow) may be varied when the cooking inference is made. For example, a smart door 120 in the kitchen may become less sensitive when one of the occupants is cooking (e.g., when a cooking inference has been made), whereas smart doors in other rooms may remain in normal operation. As another example, the amount by which a door may be opened and/or a direction in which a door may be opened and/or the speed with which a door may be opened may be at least partially dictated by one or more inferences made by system 199 (e.g., about the particular user approaching the door, about the weather or other environmental characteristics of one or both spaces protected by the door, etc.). For example, a smart door 120 may automatically open by a lesser amount when the difference is greater between the respective temperatures of the two spaces protected by the door. As another example, a smart door 120 may automatically open to an initial amount that has previously been observed as the average or maximum or minimum amount needed or previously used by the user currently approaching the door.

Therefore, the system may utilize any suitable sensors in a smart door or otherwise as may be available to the smart environment in order to predictively disengage a sealing mechanism being used to maintain a relatively air-tight seal or water-tight seal or hermetically sealed seal and/or the like between a door body and a door frame. Various different kinds of sensors can be used to detect the approach or initial potential intent of a user, such as radar, video cameras with AI-trained face recognition, passive/active infrared sensors, and so forth. By virtue of the predictive disengagement of the sealing mechanism, the user, once its door passage is imminent, may not have to wait for the sealing mechanism to complete its unlocking cycle in order to open the door, and can open the door at will and unimpeded by the mechanical limitations of the sealing mechanism. In an exemplary use case, when one or more sensors (e.g., as integrated within or otherwise associated with the door) sense presence of a user who desires to open the door, one or more processor(s) of the door and/or of the system more generally may instruct the sealing mechanism to unseal so that when the user later attempts to open the door or pass therethrough, he or she does not have to wait for the sealing mechanism to finish its unsealing cycle. In another embodiment, the door may preemptively unseal the mechanical seal in response to a door bell or garage door opening event. Advantageously, because any "accidental" unsealing of a door may not be a security threat (e.g., as the door itself remains locked until it is unlocked by a suitable security mechanism), it may not be required that a high degree of scrutiny be applied in the determination to predictively unseal the door. Thus, even a relatively limited sensor (e.g., a passive infrared sensor) can be used to detect an approaching user and trigger the unsealing process, and, if it later turns out to be a solicitor, who does not have authorization to pass through the door in any way, the system may be configured just to re-seal the door a short time later without any security breach made likely. Therefore, the system may be configured to enable any suitable stage-dependent functions of a smart door upon detection of a user's approach or initial potential intention to pass through a door. Various stages of user approach detection and/or various stages of user door passage intent detection and/or various stages of user door passage authorization detection and/or various stages of user system interaction detection may be utilized to trigger different state transitions for a smart door (e.g., unsealing after a first stage is detected, unlocking after a different second stage is detected, unlatching and/or opening after a third stage is detected, and/or the like). For example, a relatively slow-action service function (e.g., unsealing) may be triggered in response to a first stage of detection, while an additional service function (e.g., unlocking) may be triggered in response to a second stage of detection after the first stage of detection, while an additional service function (e.g., opening) may be triggered in response to a third stage of detection after the second stage of detection. Therefore, predictive unsealing or a prediction of any other suitable service function may resolve certain speed or latency issues that may be present when attempting to transition directly from a first door state to a fourth door state in response to a particular triggering event.

Various sensors provided by a smart door and/or various actuators and couplings operative to control automatically the opening and closing of a smart door may be utilized by the system to detect and handle certain panic conditions. For example, when an occupant must handle a potential intruder who is fighting to pass through a door, there is often little time for the occupant to call authorities for help or grab an object that may help ward off the threat. Instead, system 199 may be configured to utilize detection of one or more suitable panic triggering events in order to automatically invoke one or more appropriate panic response actions. Any suitable panic triggering event(s) may be detected by any suitable sensors of smart door 120 or otherwise of system 199 in order for system 199 to determine that a panic situation exists and that one or more panic response actions ought to be automatically carried out. Such panic triggering event(s) may include, but are not limited to, any violent door actions that may be detected by any suitable sensors (e.g., violent motion of door body 124 detected with respect to frame 130 and/or of door 120 detected with respect to a wall 154 through which door 120 (e.g., door open versus door close struggle or large vibrations of door 120 (e.g., as may be detected by any suitable motion sensor or otherwise of sensor(s) 428))), any suitable violent user actions that may be detected by any suitable sensors (e.g., violent screams (e.g., as may be detected by any suitable audio sensor or otherwise of sensor(s) 428)), any suitable safety user actions that may be detected by any suitable sensors (e.g., utterances of one or more pre-defined "safe words" by a user (e.g., as may be detected by any suitable audio sensor or otherwise of sensor(s) 428 of door 120) and/or user pressings of a panic button (e.g., any suitable button or UI 412 of door 120 or otherwise), and/or the like. The system may be configured to carry out automatically any suitable panic response action(s) in response to detecting one or more particular panic triggering event(s). Such panic response action(s) may include, but are not limited to, automatically closing a currently open door (e.g., using any suitable actuator(s) 407 and/or mechanical coupling(s) 403 of door 120 that may be operative to overpower any objects or forces that may attempt or otherwise be operative to keep the door open), automatically opening a currently closed door (e.g., using any suitable actuator(s) 407 and/or mechanical coupling(s) 403 of door 120 that may be operative to overpower any objects or forces that may attempt or otherwise be operative to keep the door closed), automatically locking a currently unlocked door (e.g., using any suitable actuator(s) 407 and/or locking mechanism(s) (e.g., doorknob 122) of door 120 that may be operative to overpower any objects or forces that may attempt or otherwise be operative to keep the door unlocked), automatically unlocking a currently locked door (e.g., using any suitable actuator(s) 407 and/or locking mechanism(s) (e.g., doorknob 122) of door 120 that may be operative to overpower any objects or forces that may attempt or otherwise be operative to keep the door locked), and/or the like.

Platform 200 may be operative to utilize any suitable data that may be sensed by any suitable smart device of environment 100 for enhancing the security or convenience of environment 100. Additionally or alternatively to sensing data that may be indicative of the physical presence, identity, and/or intent of a user at environment 100, one or more sensing components of one or more smart devices of system 199 (e.g., smart door 120) may be operative to sense any other suitable data that may be utilized by system 199 in enhancing the security and/or convenience of system users of environment 100 in any suitable ways.

Smart door 120 may include one or more sensing components that may be operative to measure one or more characteristics for determining the quality of the air or any other similar detectable entity of one or both of the spaces protected by the smart door (e.g., of ambient environment AE and/or of room 152). For example, one or more external sensors 428e that may be at least partially exposed through external side 124e of door body 124 of smart door 120 may be similar to any suitable sensing component of a hazard detector device 104 positioned within structure 150 (e.g., within room 152) or otherwise, but for measuring air quality and/or detecting harmful volatile organic compounds (VOCs) and/or potent harmful gases, particulate, dust, pollen, mold, or the like of ambient environment AE (e.g., at least when door 120 is closed). Such external environment data sensed by smart door 120 or any other suitable smart device or by any other data source of platform 200 (e.g., a third party air quality business 228) may be utilized by system 199 (e.g., by platform 200) in combination with any other suitable data for adjusting a platform functionality (e.g., a functionality of a smart device of environment 100 or for reporting to any suitable entity for analysis). For example, the detected air purity within a particular area or the entirety of structure 150 (e.g., as may be sensed by one or more hazard detector devices 104 and/or by one or more internal sensors 428i that may be at least partially exposed through internal side 124i of door body 124 of smart door 120 (e.g., at least when door 120 is closed)) may be compared by system 199 (e.g., by system 164 or any suitable processing component local to environment 100) with the detected air purity outside of structure 150 (e.g., as may be sensed by smart door 120 or otherwise) to control a functionality of a smart device of the system. As a particular example, if the outside air is determined to be purer than the inside air, then system 199 may be operative to instruct smart door 120 and/or one or more smart thermostat devices 102 to open one or more vents 457 and/or one or more sub-doors 452 (e.g., of door HVAC system 456) and/or one or more sealing mechanisms 409 of smart door 120 to permit fresh air into structure 150 via door passageway 135 and/or to open one or more vents of HVAC system 103 to permit fresh air otherwise into structure 150, otherwise system 199 may be operative to instruct smart door 120 and/or one or more smart thermostat devices 102 to recirculate air within structure 150 and to not draw in outside air. Additionally or alternatively, as another particular example, system 199 may be operative to send detailed information about the air quality within and external to structure 150 to a personal device user device 166 or other suitable smart device of a user, which may help the user identify which pollen or other air impurity may be the culprit of any allergies that the user may be experiencing. As one other example, system 199 may be operative to send an alert to a system user when cigarette smoke is detected by any suitable external sensor (e.g., to catch a child attempting to sneak a cigarette outside front door 120). As another example, system 199 may be operative to aggregate air quality data received from multiple environments in various geographic locations or other suitable groupings and to provide, for example, smog alerts, pollen warnings, and/or the like of those groupings to any suitable entity (e.g., weather reporting business entities 228). As another example, system 199 may be operative to compare detected external and/or internal air quality of different areas of environment 100 (e.g., different rooms and/or spaces protected by the same door or different doors) with one another at a specific time or historically (e.g., by time of day, day of week, season of year, etc.) for identifying certain areas that may have issues to be addressed (e.g., a corner room of structure 150 that is exposed to significantly more pollen than other portions of environment 100 during the Spring and may benefit from additional filtration or inspection of flora and fauna near that area at that time). As another example, system 199 may be operative to compare detected external and/or internal air quality of environment 100 with other smart environments. Any one or more of such comparisons or data aggregations with respect to air quality of one or more internal or external areas of environment 100 may be stored for and/or shared with certain entities, such as prospective buyers of environment 100 (e.g., at real estate business entity 228), for determining whether such qualities of environment 100 are suitable. Additionally or alternatively, any other weather phenomena or characteristic of the air quality (e.g., temperature, humidity, wind levels (e.g., strength/speed of the movement of the air), wind direction (e.g., direction of the movement of the air), etc.) may be detected (e.g., by any sensing component(s) of one or more smart doors 120) at environment 100 (e.g., internal to and/or ambient of structure 150) and utilized in any other suitable fashion. For example, the outside humidity and temperature data of an ambient environment and/or of one or more specific rooms may be compared with or considered by system 199 when controlling any suitable HVAC functionalities (e.g., of one or more smart doors 120 and/or of one or more HVAC systems 103) to best accomplish occupants' comfort preferences. Further, for example, this information may be presented to the occupants through a number of user interfaces, such as a user interface associated with another one of the devices located inside of the home, the television, mobile and other computing devices, or audibly. In some instances, platform 200 (e.g., system 164) may collect such weather data from multiple smart environments across a plurality of geographic locations or other suitable groupings, and such aggregated weather data may be sold or otherwise provided to weather services (e.g., any suitable business entity 228) or may be used to provide weather data to smart home occupants or potential buyers.

Smart door 120 may include one or more sensing components that may be operative to measure one or more characteristics for determining noise of one or both of the spaces protected by the smart door (e.g., of ambient environment AE and/or of room 152). For example, one or more external sensors 428e that may be at least partially exposed through external side 124e of door body 124 of smart door 120 (e.g., a microphone 444) may be positioned external to structure 150 for sensing any suitable noise external to structure 150 in ambient environment AE (e.g., at least when door 120 is closed). Such ambient noise data sensed by smart door 120 or any other suitable smart device or by any other data source of platform 200 (e.g., a third party noise detection business 228) may be utilized by platform 200 in combination with any other suitable data for adjusting a platform functionality (e.g., a functionality of a smart device of environment 100 or for reporting to any suitable entity for analysis). For example, the detected noise levels within a particular space of environment 100 protected by a smart door (e.g., as may be sensed by one or more sensors of the smart door) may be compared by platform 200 (e.g., by system 164 or any suitable processing component local to environment 100) with the noise levels of any other space of structure 150 (e.g., as may be sensed by the same or a different smart door or any other smart device or otherwise of the system) to control a functionality of a smart device of environment 100. As a particular example, if the noise level outside of structure 150 in ambient environment AE significantly spikes (e.g., due to a helicopter hovering overhead), then platform 200 may be operative to instruct a smart appliance 113 (e.g., a television) or smart hazard detector device 104 or smart door 120 or any other suitable smart device to increase its volume output level to overcome or otherwise compensate for the additional ambient noise pollution (e.g., so a system user may still hear important warnings or other communications from such smart devices). As another example, platform 200 may be operative to analyze ambient noise detected at ambient environment AE (e.g., by smart door 120) to determine that a street adjacent to structure 150 may meet a threshold level of traffic, where such a determination may result in one or more inferences being made by platform 200 about the safety of any children currently occupying environment 100 (e.g., a child playing outside of structure 150 in ambient environment AE). For example, platform 200 may be operative to trigger any suitable alarm (e.g., at environment 100, such as with a hazard detector 104 within structure 150 or with any suitable output component (e.g., speaker 436) of internal surface 124*i* of smart door 120) in the event one or more of the children are detected by the occupancy sensing to be outside of the home during such a detected traffic event. Such an alert may enable a parent or other caretaker at environment 100 (e.g., a user within structure 150) to quickly take action to protect the child from the detected traffic (of course, other suitable environment detectors, such as a camera and/or motion detector alone or in combination with such a noise sensor may also enable platform 200 to facilitate such a security feature). Additionally or alternatively, as another particular example, platform 200 may be operative to send detailed information about the noise levels within and external to structure 150 to a personal device user device 166 or other suitable smart device of a user, which may help the user identify which areas of environment may be experiencing more problematic noise issues. As another example, platform 200 may be operative to aggregate noise data received from one or more spaces from each one of multiple environments in various geographic locations or other suitable groupings and to provide, for example, noise pollution reports of those groupings to any suitable entity (e.g., law enforcement entities 222). As another example, platform 200 may be operative to compare detected external and/or internal noise levels of different areas of environment 100 (e.g., different rooms and/or spaces protected by the same door or different doors) with one another at a specific time or historically (e.g., by time of day, day of week, season of year, etc.) for identifying certain areas that may have issues to be addressed (e.g., a corner room of structure 150 that is exposed to significantly more noise than other portions of environment 100 at certain times of day and may benefit from additional sound proofing or noise filtration or other accommodations). As another example, platform 200 may be operative to compare detected external and/or noise levels of environment 100 with other smart environments. Any one or more of such comparisons or data aggregations with respect to noise levels of one or more internal or external areas of environment 100 may be stored for and/or shared with certain entities, such as prospective buyers of environment 100 (e.g., at a real estate agent business 228), for determining whether such qualities of environment 100 are suitable. Additionally or alternatively, any motion levels or other suitable activity may be detected (e.g., by any sensing component(s) one or more smart doors 120) at environment 100 (e.g., internal to and ambient of structure 150) and utilized similarly to any noise levels described above (e.g., a combination of detected motion and noise levels may be utilized to detect a traffic threshold for enabling platform 200 to initiate an alarm for protecting any children of environment 100, or motion levels may be detected to indicate a stranger casing environment 100 for potential theft or an animal wandering in the backyard, etc.). Additionally or alternatively, any ambient light levels or other suitable ambient conditions may be detected (e.g., by any sensing component(s) one or more smart doors 120) at environment 100 (e.g., internal to and ambient of structure 150) and utilized similarly to any noise levels described above.

As described above (e.g., with respect to detected air quality), any suitable data indicative of any suitable characteristic or phenomena internal to and/or external to structure 150 (e.g., noise levels, activity levels, ambient light levels, weather, etc.) that may be detectable by any sensing component(s) one or more smart doors 120 or any other suitable data source of platform 200 may be analyzed in any suitable manner (e.g., with respect to any other suitable data) for system utilization in any suitable way. As one particular example, any suitable detected ambient data of structure 150 may be compared with any suitable internal data of environment 100 or analyzed on its own or with respect to any other suitable data for adjusting a platform functionality, such as for adjusting a functionality of a smart device and/or for adjusting a mode or mode setting enabled or to be enabled (e.g., ambient detected noise (e.g., by a microphone sensing component 444 of door 120) may be utilized to adjust the volume level of audio output by a smart device within structure 150 (e.g., from a smart hazard detector device 104 or any suitable controllable device such as a stereo) for dynamically tuning such internal volume to overcome any ambient noise sources). Additionally or alternatively, as another particular example, platform 200 may be operative to send detailed information about the detected value of certain ambient conditions of environment 100 to a personal device user device 166 or other suitable smart device of a user, which may help the user identify when and where certain noises are coming from. As another example, platform 200 may be operative to aggregate ambient data received from multiple environments in various geographic locations or other suitable groupings and to provide, for example, air pollution reports of those groupings to any suitable entity (e.g., law enforcement entities 222). As another example, platform 200 may be operative to compare detected external and/or internal phenomena from different areas of environment 100 (e.g., different rooms and/or spaces protected by the same door or different doors) with one another at a specific time or historically (e.g., by time of day, day of week, season of year, etc.) for identifying certain areas that may have issues to be addressed (e.g., a corner of structure 150 that is exposed to significantly more noise pollution than other portions of environment 100 at a specific time of day and may benefit from additional sound proofing). This may be operative to enable detection of degrading thermal insulation of one or more spaces (e.g., a self-sealing smart door may be operative to detect whether any air gaps or leaks develop over time in order to inform the system of increased energy use and/or inefficient protection, which may enable more efficient use in the future and/or enable certain subsidies to be offered to users of systems with such capabilities). As another example, platform 200 may be operative to compare detected external and/or internal phenomena of environment 100 with other smart environments. Any one or more of such comparisons or data aggregations with respect to detected phenomena (e.g., air quality, noise levels, activity (e.g., motion) levels, ambient light levels, weather, etc.) of one or more internal or external areas of environment 100 may be stored for and/or shared with certain entities, such as prospective buyers of environment 100, for determining whether such qualities of environment 100 are suitable. Therefore, a smart door may equip environment 100 with environmental sensing capabilities that may configure system 199 as a weather station.

By sensing air quality, temperature, noise level, and/or any other suitable element characteristics within different spaces (e.g., spaces on opposite sides of a single smart door or spaces protected by different smart doors), one or more smart doors may be operative to detect information that may be utilized to intelligently and/or effectively and/or efficiently control various functional components of any smart devices automatically, such as ventilation capabilities of one or more smart doors themselves. For example, one or more sub-doors 452 and/or one or more vents 457 and/or one or more door body portions (e.g., portion(s) 124l and/or 124u) and/or one or more sealing mechanisms 409 and/or any filter(s) thereof and/or the like of one or more smart doors 120 may be independently or collectively controlled by system 199 to open or close by any suitable amount and/or in any suitable direction and/or with any suitable speed in order to automatically provide intelligent and/or effective and/or efficient heating and/or cooling and/or ventilating and/or noise insulating and/or the like for one or more particular spaces adjacent either side of each smart door. In some embodiments, door HVAC 456 of smart door 120 may include at least a portion of any suitable heat pump assembly (e.g., a furnace), where, due to smart door 120 having access to each one of the two spaces that it protects, such a heat pump assembly may be vented on one side or the other of the smart door (e.g., effectively using colder air on one side of door and hotter air on other side of the door). In some particular embodiments, such a heat pump assembly of a smart door 120 may be utilized to enable operational compliance of the smart door under extreme conditions (e.g., even when the temperature on at least one side of the door is freezing, such as by controlling the heat pump assembly to de-ice or otherwise provide anti-freezing measures (e.g., to prevent the door from freezing shut and preventing door opening and closing transitions)). In some embodiments, door vent(s) 457 of smart door 120 may include at least a portion of any suitable thermal and/or noise insulator, where, due to smart door 120 having access to each one of the two spaces that it protects, such an insulator may be controlled to dynamically adjust how heat and/or noise and/or any other suitable element (e.g., pollen, smoke, etc.) may be passed from one space to the other via door frame passageway 135 of the smart door and/or may be prevented from passing from one space to the other via door frame passageway 135 of the smart door. For example, when children are playing in ambient environment AE but a parent is working inside room 152 on opposite sides of a closed smart door 120, one or more door vents 457 or other ventilation features of smart door 120 (one or more sub-doors 452 and/or one or more door body portions (e.g., portion(s) 124l and/or 124u) and/or one or more sealing mechanisms 409 and/or any filter(s) thereof and/or the like of one or more smart doors 120) may be independently or collectively controlled by system 199 to open or close by any suitable amount and/or in any suitable direction and/or with any suitable speed and/or be adjusted in any other suitable manner(s) in order to automatically enhance the ability of the parent inside room 152 to hear via door frame passageway 135 any noises made by the children in ambient environment AE while limiting or preventing any hot air or pollen or other desirable elements from also passing via door frame passageway 135. Therefore, one or more adjustable mechanisms of smart door 120 may be automatically controlled to selectively pass certain desirable elements through door frame passageway 135 in one or more particular directions (e.g., noise of spaces occupied by children, etc.) but also to selectively prevent certain other elements through door frame passageway 135 in one or more particular directions (e.g., pollen to enter from outside a structure to inside a structure). Additionally or alternatively, one or more sub-doors 452 and/or one or more vents 457 and/or one or more door body portions (e.g., portion(s) 124l and/or 124u) and/or one or more sealing mechanisms 409 and/or any filter(s) thereof and/or the like of a smart door 120 may be independently or collectively controlled by system 199 to open or close by any suitable amount and/or in any suitable direction and/or with any suitable speed in order to automatically provide intelligent and/or effective and/or efficient cooling of and/or ventilation for any heat-generating component(s) that may be partially positioned within door body 124 of that smart door (e.g., any suitable battery and/or other electronics of the door). Therefore, there may be no more need for a screen door, as a smart door may be configured to automatically circulate fresh air from outside based on thermostat settings and/or sensor conditions of the system or as instructed by a user.

Any suitable sensor(s) 428 may be provided in any suitable manner at least partially within door body 124 of a smart door for detecting any direct user interactions with that door body. For example, one or more motion sensors and/or ambient light sensors and/or radar sensors and/or cameras and/or the like, as may be provided at least partially within door body 124, may be operative to detect various types of direct user interactions (e.g., physical knocking, rubbing, scratching, etc.) with or on any suitable portion or the entirety of a surface of door body 124, such as external side 124e of door body 124. Therefore, one or more sensor(s) 428 may be operative to provide a smart door knocker that may be operative to detect any suitable user interactions (e.g., knocks of various intensities and/or lengths and/or positions on a door surface).

Platform 200 may be configured in any suitable way (e.g., by a system user or automatically through heuristics or rules or inferences or any other suitable data or controlling entity of platform 200) to define the period of time within which one or more visitor interactions with a smart door may result in a single communication to a system user and/or the length of time during which a single visitor interaction may last that may result in a single communication to a system user. This may enable various modes whereby a certain type of visitor interaction may result in different communications to a system user depending on various factors (e.g., environment mode, occupancy status, visitor identification, etc. and/or user customized settings for how defining particular visitor interaction types may be handled and communicated to that user). In some embodiments, a pattern of two or more visitor interactions with smart door 120 and/or a single interaction with smart door 120 of at least a specific length may result in a particular type of communication to a system user. For example, if more than a certain amount of visitor interactions with a smart door 120 are detected within a particular amount of time and/or if a single visitor interaction with a smart door 120 is held for more than a certain amount of time and/or any other suitable type of visitor interaction with a smart door 120 is detected (e.g., a specific pattern of multiple visitor interactions of specific types with a smart door 120), platform 200 may be operative to communicate a respective particular type of alert to a system user (e.g., to indicate an "urgent" visitor disposition or a "unique" visitor interaction (e.g., a specific 7-note "shave and a haircut—two bits" rhythmic interaction by a visitor with a smart door 120 may be detected and operative to generate a melodic version of that same "shave and a haircut—two bits" riff as a communication to a system user via a smart device output component)). This may enable a certain type of visitor interaction to override certain standard response settings of platform 200 so as to enable a visitor to communicate to a system user an urgent communication or an otherwise unique communication. Therefore, while ten visitor knocks on a surface of a smart door 120 within ten seconds may result in the same user communication attempt as one visitor knock within ten seconds (e.g., a single buzzer sound emitted from one or more smart devices within environment 100 and/or a single message conveyed within environment 100 (e.g., "a visitor has knocked on the door") so as to not annoy or otherwise disturb a system user by providing ten distinct user communication attempts (e.g., ten distinct buzzer sounds)), eleven visitor knocks on a smart door 120 within ten seconds may result in a different (e.g., more urgent) user communication attempt (e.g., multiple buzzer sounds emitted from one or more smart devices within environment 100 and/or a single but stronger message conveyed within environment 100 (e.g., "a visitor has URGENTLY knocked on the door")). Therefore, while platform 200 may be operative to filter down certain "annoying" visitor interaction types for providing a more palatable alert to a system user, platform 200 may also be operative to determine certain visitor interaction types to be urgent or otherwise unique in nature for providing a more urgent or otherwise unique alert to a system user. While visitor interactions with environment 100 have been described with respect to visitor "knocks" or other suitable interactions with a smart door 120, any suitable visitor interaction type with respect to any suitable input component(s) and/or sensing component(s) of any suitable smart door 120 of environment 100 (e.g., a visitor's audible communication via a microphone 444 of smart door 120 or selection of an option on a touchscreen user interface 412 of smart door 120 via touching that touchscreen) may be processed and handled in any suitable manner by platform 200 for filtering any undesirable or otherwise annoying visitor interactions while also appropriately detecting certain visitor interactions that may be utilized for adjusting any handling of that visitor (e.g., automatically opening the door and/or the urgency or uniqueness or any other suitable tone of an attempted communication by platform 200 to a system user in response to such detecting).

Platform 200 may be operative to disable a functionality of a user interface or input component 412 of a smart door 120 for any suitable reason (e.g., based on any suitable settings or inferences, etc.). For example, a message may be conveyed to the visitor that the smart door input component has been disabled, thereby discouraging the visitor from even attempting to functionally interact with the smart door input component (e.g., through the visitor knocking on the smart door or pressing any smart doorbell button(s) of the smart door). Alternatively or additionally, whether or not it is conveyed to the visitor that a functionality of an input component of a smart door 120 is disabled, platform 200 may be operative to prevent contacting a system user in certain manners or at all in response to an interaction of any visitor with that smart door input component under certain system circumstances (e.g., if the visitor interacts with the smart door input component before providing the smart environment with any requested visitor identification information and/or visitor intent information). This may be considered "whitelisting", as platform 200 may be operative to require that certain requirements be met before enabling the functionality of the smart door input component for a visitor generally (e.g., before platform 200 may be operative to generate any system user notifications in response to any visitor interaction with that smart door input component), such as determining a specific identification of the visitor and/or at least determining whether the visitor is trusted or untrusted.

Alternatively or additionally, platform 200 may be operative to prevent contacting a system user in certain manners or at all in response to an interaction of a particular visitor with that smart door input component (e.g., if a particular visitor has been determined to interact with environment 100 (e.g., doorbell 106 or any sensor(s) of smart door 120) in a manner that is undesirable to a system user. This may be considered "blacklisting", as platform 200 may be operative to prevent certain visitor interaction by a certain visitor from being communicated as system user notification, which may be done whether the certain visitor is determined to be trusted or untrusted. Therefore, platform 200 may be operative to enable a system user to easily "blacklist" a particular visitor during a particular mode of smart environment 100 (e.g., by defining a mode setting) such that certain or all interactions by that particular visitor with environment 100 (e.g., with any smart door button 412) may not result in a system user notification that might otherwise be generated by platform 200 for a non-blacklisted visitor interacting in the same manner. A blacklisted visitor may be detected like any other suitable visitor. For example, any suitable fingerprint or signature of a visitor may be identified (e.g., through facial recognition, receipt of affirmatively provided visitor identification, detection of an NFC or RFID tag for that particular visitor, Wi-Fi pairing signals or any other suitable signals that may be detected from a visitor personal device 266 and analyzed by platform 200, etc.).

Platform 200 may be operative to blacklist a visitor or at least certain visitor interactions of a visitor in any suitable way (e.g., based on inferences or system user instructions). For example, in some embodiments, platform 200 may be operative to record a log (e.g., as home data 202) that may include a listing of the identity (e.g., general or specific) of some or all of the visitors detected each day at environment 100 as well as a listing of any interaction each visitor may have had with environment 100 (e.g., "Visitor A pressed smart door button 412e of smart door 120 five times within a ten second period starting at 3:45:15 PM on Tuesday"). Platform 200 may be operative to provide such a log for review by a system user of environment 100 such that the system user may select certain visitors or certain interactions of certain visitors to be added to a blacklist, whereby, going forward, platform 200 may be operative to prevent such visitors or such interactions of such visitors from resulting in the generation of system user notifications (e.g., via a smart device output component proximate the system user). Once a particular visitor (e.g., all interactions by "Visitor A") and/or a particular visitor interaction (e.g., an interaction by "Visitor A" that includes pressing button 412e more than once within a ten second period) has been blacklisted, platform 200 may be operative to handle such a blacklisting in any suitable manner when detected. For example, in response to detecting a blacklisted interaction, platform 200 may be operative to convey a message to the visitor (e.g., via speaker 436 or projector 430 or otherwise) that such an interaction will not be recognized by a system user and that discourages such behavior going forward. The message may include a customized message from the system user as to why the interaction has been blacklisted and what may be a preferable alternative.

As just one real-world example, there may be an overly enthusiastic mailman deliverer DL that always presses smart door button 412e when he or she delivers the mail each day, despite a system user's requests to the contrary (e.g., because user notifications provided in response to such presses inevitably wake up a napping child within environment 100). After 2-3 days of this same activity, platform 200 may be operative to determine or otherwise recognize that the same Wi-Fi pairing signal is sensed when smart door button 412e is pressed each day, and platform 200 may be operative to store such data in a suitable log by identifying different interactions on different days as being provided by the same visitor. Later, after the third day or so, the angry homeowner system user may be enabled by platform 200 to review that log and realize that this same visitor was the button presser at these offending times, and then "blacklist" that visitor. Notably, in one embodiment, the actual identity of the "blacklisted" may not be specifically established or revealed by platform 200 in the log, and such a visitor may simply be identified in the log as "Visitor A" or "Visitor whose Wi-Fi beacon is XYZ". However, in other embodiments, the actual identity of one or more visitors may be provided in such a log (e.g., through any suitable technique described herein, such as comparing any detected visitor signature data to one or more databases available to platform 200).

Such a log may be utilized by platform 200 for any suitable purpose. For example, rather than identifying a particular visitor or a particular visitor interaction in the log for blacklisting that visitor or interaction for preventing future system user notifications in response thereto, platform 200 may be operative to assign a particular type of system user notification to a particular visitor or particular visitor interaction identified via a log or otherwise such that such a particular type of system user notification may be utilized by platform 200 in the future in response to detecting such a particular visitor or particular visitor interaction. For example, platform 200 may be operative to enable a certain audible message type (e.g., a particular "ringtones") to be provided by platform 200 as at least a portion of a system user notification in response to a future detection of a particular visitor or a particular visitor interaction (e.g., to associate a melodic version of the "shave and a haircut—two bits" riff with a particular rhythmic interaction by a visitor of that same "shave and a haircut—two bits" riff with any sensor(s) (e.g., any suitable sensitive surface) of the smart door. Additionally, any suitable sensor(s) of a smart door may be operative to detect any physical item(s) left by a user on the smart door (e.g., a note affixed to a door surface, or a note scribbled by the user with his finger on a touch sensitive surface of the door, etc.), and indication of detection of that item may be communicated by the system in any suitable way(s) to any suitable other system user(s) or device(s).

A smart door may be configured to be used by the system to provide any suitable intelligent residential entry door differentiators and/or emotional features. For example, smart door 120 may be operative to provide an intelligent door assistant. No more specific doorbell buttons and/or door knockers may be needed, but various internal sensor(s) may be used to carry out the functionalities of such components in a more streamlined fashion. A smart door may be configured to proactively greet people detected to be approaching the door with a "Hello, can I help you?" or other suitable greeting. Any suitable video and/or audio feed captured at and/or by a smart door may be communicated to any other suitable smart device of the system and/or back through any suitable interfaces of that smart door (e.g., for deterring burglars, etc.). For example, if a recognized family friend of the environment owner is detected asking for a particular potential occupant, the smart door may be configured to present a friendly response, such as "Hello, Mark—Lawrence is not available right now—would you like to send him a text message, leave a voice message, or request a video chat?", where each presented option may be enabled by the smart door. As another example, if a recognized delivery person is detected with a package not requiring an active user signature, the smart door may be configured to present a friendly response, such as "Thank you, please leave the package at the door" or "Please slide the package through the door" and the delivery door may automatically open an appropriate amount to securely receive the package. As another example, if a recognized occupant or registered user/owner is detected at the smart door, the smart door may be configured to present a friendly response, such as "Good evening, Lawrence," and/or a simulated hand wave if owner has been coming in and out, and/or notification of any messages and reminders and/or personalized entry music (e.g., with different volume settings for greetings (e.g., dependent upon time of day, etc.)). A display or any other suitable user interface component(s) of a smart door may be configured to provide any suitable messages to any suitable user when that user may be passing through a door in any suitable direction. For example, when an occupant user is detected to be leaving an environment (e.g., via a front smart door to a home), the smart door may be configured to present any suitable data of interest to that user, including, but not limited to, weather forecasts, traffic reports, queue up direction requests for the user's personal device 166 or in-car navigation, call ahead for reservations, reminders or notes (e.g., "Remind Christine to pick up the kids today" or "Do you have your car keys?" or "Would you like to turn off the lights?" or "The home is being armed" and/or the like. As another example, when an occupant user is detected to be entering an environment (e.g., via a front smart door to a home), the smart door may be configured to disarm any or all alarms (e.g., automatically) and/or present any suitable data of interest to that user, including, but not limited to, "the alarms have been disarmed" or "the basketball game is on in the living room" or the like.

Any suitable camera may be provided in any suitable manner by a camera sensor of a smart door. In some embodiments, a camera sensor 428c of sensor(s) 428 of door body 124 may be provided as both an external sensor 428*e* that may be at least partially exposed through external side 124*e* of door body 124 and also an internal sensor 428*i* that may be at least partially exposed through internal side 124*i* of door body 124, such that the camera sensor may be operative to detect all user movement with respect to the door. As shown in FIG. 6A, for example, camera sensor 428*c* may include a single camera module 428*cm* that may be communicatively coupled not only to an externally facing lens 428*cle* (e.g., as may be at least partially exposed through external side 124*e* of door body 124) but also to an internally facing lens 428*cli* (e.g., as may be at least partially exposed through internal side 124*i* of door body 124), which may enable a single camera with multiple lenses to capture multiple views of the door's environment (e.g., a 360° camera to detect all movement on each side of door body 124, no matter what position door body 124 may be in with respect to door frame 130. Additionally or alternatively, as shown in FIG. 5A, for example, an upper camera 428*mu* may be provided on an upper portion of door frame 130 for capturing images between the upper portion and a lower portion of the door frame 130 across door frame passageway 135, and/or a lower camera 428*ml* may be provided on a lower portion of door frame 130 for capturing images between the upper portion and the lower portion of the door frame 130 across door frame passageway 135, which may be operative to capture image(s) useful by the system to determine a degree by which the door may be opened and/or its speed of movement and/or the like. The positioning of a camera at a surface of a door body may be much more effective for capturing user behavior with respect to the door than if a camera were positioned adjacent to the door (e.g., in a corner of the room facing the door), as a user may be more likely to look straight at a camera provided by a door than at a camera adjacent a door (e.g., a door camera that may be positioned in a center surface of a door at eye level of an average user). This positioning may also be useful for any creative endeavors or otherwise of a user, such as the system being configured to capture an image of a user's face at least once for each day that the user passes through the door (e.g., the user's front door) in order to create a photo album exhibiting how the user's appearance changed over time).

Oftentimes, a door body may be provided by a material or combination of materials that are selected for providing a door that is structurally robust or that may provide proper insulation for noise and/or weather or the like. However, such structure may often be insufficient to address all potential functional characteristics of the door. Therefore, in order to provide a door that is constructed in such a way so as to be not only energy efficient but also structurally robust and also cosmetically appealing and operative to provide certain user interfaces, two or more particular material layers may be combined to provide a door body for smart door 120. For example, external layers 125*a* and 125*e* may provide respective sides 124*e* and 124*i* of door body 124, while intermediate layers 125*b* and 125*d* may respectively separate external layers 125*a* and 125*e* from a middle or core layer 125*c*. Core layer 125*c* may be at least partially provided by a wooden frame or a steel frame, which may provide strength to door body 124. Each one or both of intermediate layers 125*b* and 125*d* may be at least partially provided by a fiberglass structure that may be of any suitable shape and size (e.g., molded with a particular design) and/or that may be filled with any suitable insulation, as fiberglass may be light and operative to house insulation efficiently. Each one or both of external layers 125*a* and 125*e* may be at least partially provided by a cosmetic wood structure (e.g., with design for exterior cosmetics). At least some of the wood components may be operative to be cosmetically functional and/or resistant to dents. In some embodiments, one or more of external layers 125*a* and 125*e* may be provided by wood or glass or plastic or any other suitable materials (e.g., wood with one or more small perforations or near-perforations) for providing a dead front display (e.g., for providing one or more of display user interfaces 431*e* and 431*i* and/or one or more of user interfaces 412*e* and 412*i*). It is to be appreciated that any or all features of door 120 may be optional and/or customized by an end user, such as cosmetic finishes, styles, sizes, colors, sensing capabilities, battery storage size, and/or the like.

Figure 7:
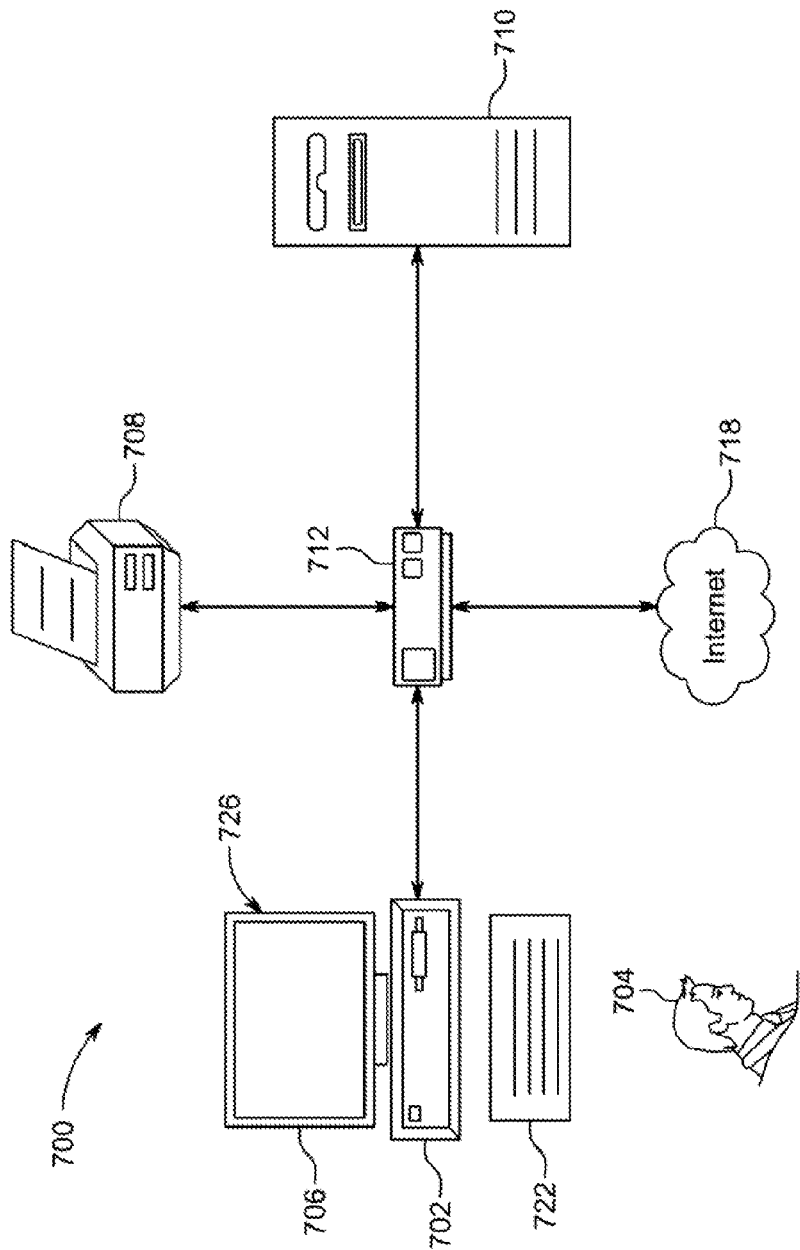
FIG. 7 illustrates a block diagram of an embodiment of a computer system, according to at least one embodiment.

Referring next to FIG. 7, an example environment with which embodiments may be implemented is shown with a computer system 700 that can be used by a user 704 to remotely control, for example, one or more of the sensor-equipped, network-connected smart-home devices according to one or more of the embodiments. Computer system 700 can alternatively be used for carrying out one or more of the server-based processing paradigms described hereinabove, can be used as a processing device in a larger distributed virtualized computing scheme for carrying out the described processing paradigms, or for any of a variety of other purposes consistent with the present teachings. Computer system 700 can include a computer 702, keyboard 722, a network router 712, a printer 708, and a monitor 706. Monitor 706, processor 702 and keyboard 722 may be part of a computer system 726, which can be a laptop computer, desktop computer, handheld computer, mainframe computer, and/or the like. Monitor 706 can be a CRT, flat screen, and/or the like.

A user 704 can input commands into computer 702 using various input devices, such as a mouse, keyboard, trackball, touch screen, scanner, sensing component, and/or the like. If computer system 700 includes a mainframe, a designer 704 can access computer 702 using, for example, a terminal or terminal interface. Additionally, computer system 726 may be connected to a printer 708 and a server 710 using a network router 712, which may connect to the Internet 718 or a WAN.

Server 710 may, for example, be used to store additional software programs and data. In one embodiment, software implementing the systems and methods described herein can be stored on a storage medium in server 710. Thus, the software can be run from the storage medium in server 710. In another embodiment, software implementing the systems and methods described herein can be stored on a storage medium in computer 702. Thus, the software can be run from the storage medium in computer system 726. Therefore, in this embodiment, the software can be used whether or not computer 702 is connected to network router 712. Printer 708 may be connected directly to computer 702, in which case, computer system 726 can print whether or not it is connected to network router 712.

Figure 8:
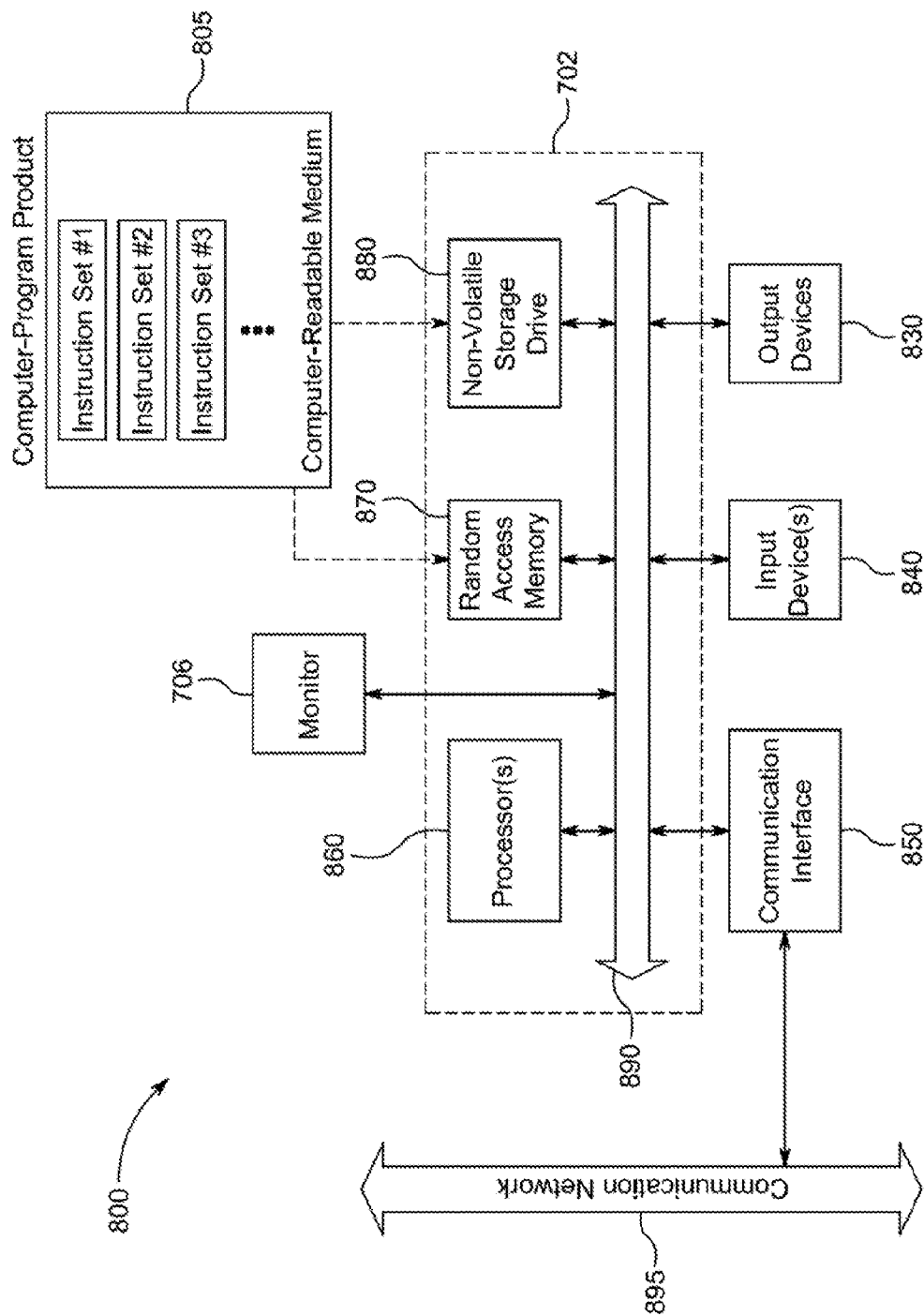
FIG. 8 illustrates a block diagram of an embodiment of a special-purpose computer, according to at least one embodiment.

With reference to FIG. 8, an embodiment of a special-purpose computer system 800 is shown. The above methods may be implemented by computer-program products that direct a computer system to perform the actions of the above-described methods and components. Each such computer-program product may include sets of instructions (e.g., codes) embodied on a computer-readable medium that directs the processor of a computer system to perform corresponding actions. The instructions may be configured to run in sequential order, or in parallel (e.g., under different processing threads), or in a combination thereof. After loading the computer-program products on a general purpose computer system 626, it may be transformed into special-purpose computer system 800.

Special-purpose computer system 800 may include computer 702, monitor 706 coupled to computer 702, one or more additional user output devices 830 (optional) coupled to computer 702, one or more user input devices 840 (e.g., keyboard, mouse, trackball, touch screen, scanner, sensing component, etc.) coupled to computer 702, an optional communications interface 850 coupled to computer 702 and/or a communication network 895, and/or a computer-program product 805 that may be stored in a tangible computer-readable memory in computer 702 (e.g., memory 870 and/or memory 880). Computer-program product 805 may direct system 800 to perform the above-described methods. Computer 702 may include one or more processors 860 that communicate with a number of peripheral devices via a bus subsystem 890. These peripheral devices may include user output device(s) 830, user input device(s) 840, communications interface 850, and a storage subsystem, such as random access memory (RAM) 870 and non-volatile storage drive 880 (e.g., disk drive, optical drive, solid state drive), which are forms of tangible computer-readable memory.

Computer-program product 805 may be stored in non-volatile storage drive 880 or another computer-readable medium accessible to computer 702 and loaded into memory 870. Each processor 860 may include a microprocessor. To support computer-program product 805, computer 702 may run an operating system that handles the communications of product 805 with the above-noted components, as well as the communications between the above-noted components in support of the computer-program product 805.

User input devices 840 include all possible types of devices and mechanisms to input information to computer system 702. These may include a keyboard, a keypad, a mouse, a scanner, a digital drawing pad, a touch screen incorporated into the display, audio input devices such as voice recognition systems, microphones, scanners, any other sensing components, and other types of input devices. In various embodiments, user input devices 840 may be typically embodied as a computer mouse, a trackball, a trackpad, a joystick, wireless remote, a drawing tablet, a voice command system, and/or the like. User input devices 840 may typically allow a user to select objects, icons, text and the like that appear on the monitor 706 via a command such as a click of a button or the like. User output devices 830 may include all possible types of devices and mechanisms to output information from computer 702. These may include a display (e.g., monitor 706), printers, non-visual displays, such as audio output devices, and/or the like.

Communications interface 850 may provide an interface to other communication networks and devices and may serve as an interface to receive data from and transmit data to other systems, WANs and/or the Internet 718. Embodiments of communications interface 850 typically include an Ethernet card, a modem (e.g., telephone, satellite, cable, ISDN), a (e.g., asynchronous) digital subscriber line (DSL) unit, a FireWire® interface, a USB® interface, a wireless network adapter, and the like. For example, communications interface 850 may be coupled to a computer network, to a FireWire® bus, or the like. In other embodiments, communications interface 850 may be physically integrated on the motherboard of computer 702, and/or may be a software program, or the like.

RAM 870 and non-volatile storage drive 880 are examples of tangible computer-readable media configured to store data such as computer-program product embodiments of the present disclosure, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 870 and non-volatile storage drive 880 may be configured to store the basic programming and data constructs that provide the functionality of various embodiments of the present disclosure, as described above.

Software instruction sets that provide the functionality of the present disclosure may be stored in RAM 870 and non-volatile storage drive 880. These instruction sets or code may be executed by the processor(s) 860. RAM 870 and non-volatile storage drive 880 may also provide a repository to store data and data structures used in accordance with the present disclosure. RAM 870 and non-volatile storage drive 1680 may include a number of memories including a main random access memory (RAM) to store of instructions and data during program execution and a read-only memory (ROM) in which fixed instructions are stored. RAM 870 and non-volatile storage drive 880 may include a file storage subsystem providing persistent (non-volatile) storage of program and/or data files. RAM 870 and non-volatile storage drive 880 may also include removable storage systems, such as removable flash memory.

Bus subsystem 890 may provide a mechanism to allow the various components and subsystems of computer 702 to communicate with each other as intended. Although bus subsystem 890 is shown schematically as a single bus, alternative embodiments of the bus subsystem may utilize multiple busses or communication paths within the computer 702.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" may refer to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data. According to embodiments, storage media and computer readable media for containing code, or portions of code, may include any appropriate media, including storage media and communication media, such as, but not limited to, volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

Figure 9:
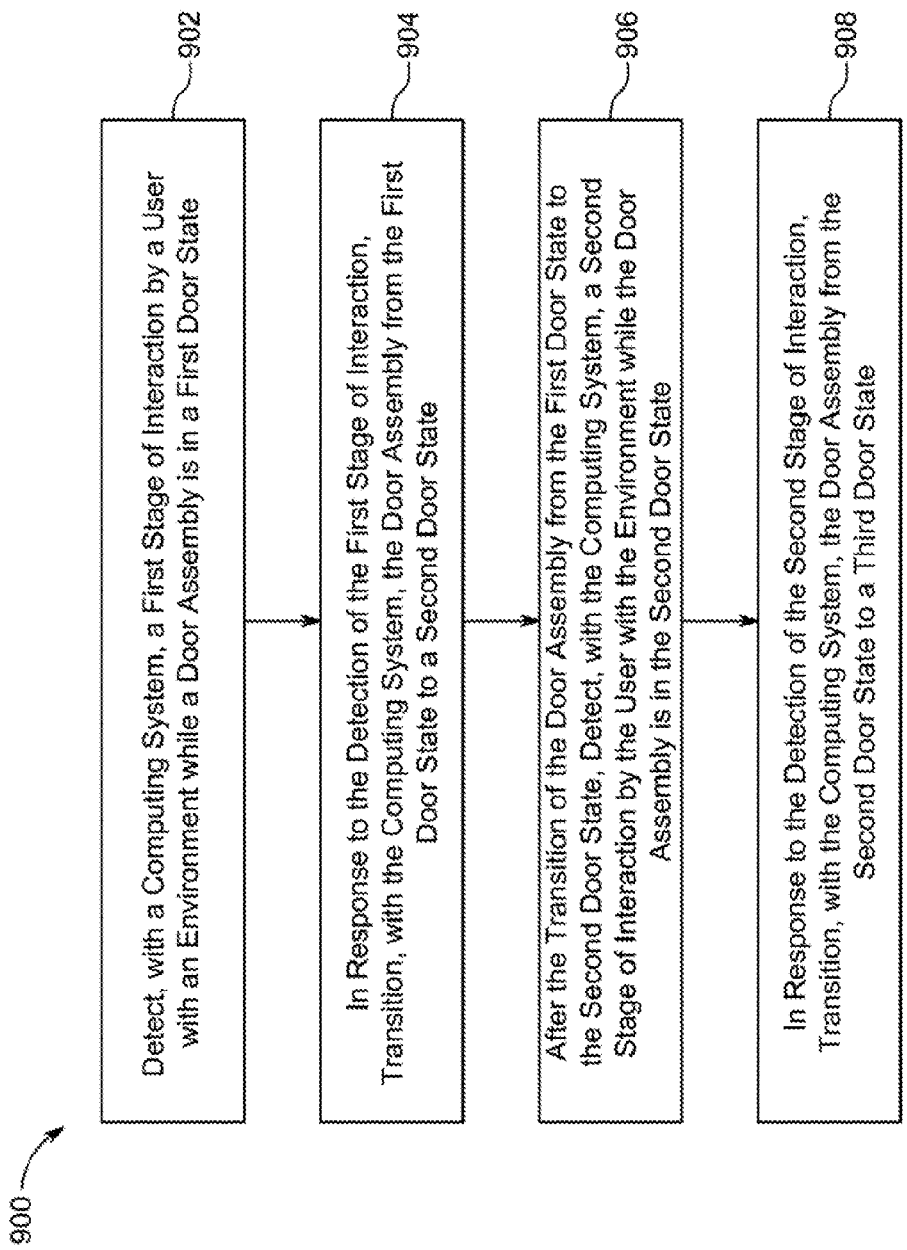
FIGS. 9-11 provide exemplary processes for controlling a smart door

FIG. 9 is a flowchart of an illustrative process 900 for adjusting a door assembly of a computing system (e.g., smart door 120 of computing system 199), wherein the door assembly may include a door frame that defines a door frame passageway between two spaces of an environment and a door body that is movable with respect to the door frame between a closed door state and a plurality of open door states (e.g., door frame 130 that defines door frame passageway 135 between ambient environment AE and room 152 of environment 100 and door body 124 that may be movable with respect to door frame 130 between a closed door state (e.g., of FIG. 5A) and an open door state (e.g., of FIG. 5D and/or FIG. 6A and/or FIG. 6B)). At operation 902, process 900 may include the computing system detecting a first stage of interaction by a user with the environment while the door assembly is in a first door state. In response to the detection of the first stage of interaction at operation 902, process 900 may include the computing system transitioning the door assembly from the first door state to a second door state at operation 904. After the transition of the door assembly from the first door state to the second door state at operation 904, process 900 may include the computing system detecting a second stage of interaction by the user with the environment while the door assembly is in the second door state at operation 906. In response to the detection of the second stage of interaction at operation 906, process 900 may include the computing system transitioning the door assembly from the second door state to a third door state at operation 908. In some embodiments, the first door state of process 900 may include the closed door state and the door assembly of process 900 may be configured to transition from the first door state to any open door state of the plurality of open door states only via the second door state (e.g., door 120 may only transition from a sealed state to an open state by first transitioning to an unsealed state). In some embodiments, the first door state of process 900 may not include any open door state of the plurality of open door states. In some embodiments, the transitioning of operation 904 from the first door state to the second door state may include unsealing a body-frame gap of the door frame passageway between the door body and the door frame (e.g., by disengaging a sealing mechanism 409 of smart door 120), and wherein the transitioning of operation 908 from the second door state to the third door state may include unlocking the door body from the door frame (e.g., using any suitable locking mechanism of smart door 120), and wherein the first stage of interaction of process 900 may include the user approaching within a threshold distance of the door assembly (e.g., distance TDE or distance TDI) and/or wherein the second stage of interaction of process 900 may include the user authenticating the user's authority to pass through the door frame passageway (e.g., using any suitable sensor(s) of system 199). In some embodiments, the transitioning of operation 908 may include moving the door body from the closed door state to an open door state, wherein the first stage of process 900 may include the user approaching within a first threshold distance of the door assembly (e.g., distance TDE or distance TDI) and/or wherein the second stage of process 900 may include the user approaching within a second threshold distance of the door assembly that is shorter than the first threshold distance. In some embodiments, process 900 may also include, after the transition of operation 908, detecting, with the computing system, a third stage of interaction by the user with the environment while the door assembly is in the third door state and, in response to the detecting the third stage of interaction, transitioning, with the computing system, the door assembly from the third door state to a fourth door state, wherein the transitioning the door assembly from the first door state to the second door state may include unsealing a body-frame gap of the door frame passageway between the door body and the door frame and/or wherein the transitioning the door assembly from the second door state to the third door state may include unlocking the door body from the door frame and/or wherein the transitioning the door assembly from the third door state to the fourth door state may include moving the door body from the closed door state to an open door state.

It is understood that the operations shown in process 900 of FIG. 9 are merely illustrative and that existing operations may be modified or omitted, additional operations may be added, and the order of certain operations may be altered.

Figure 10:
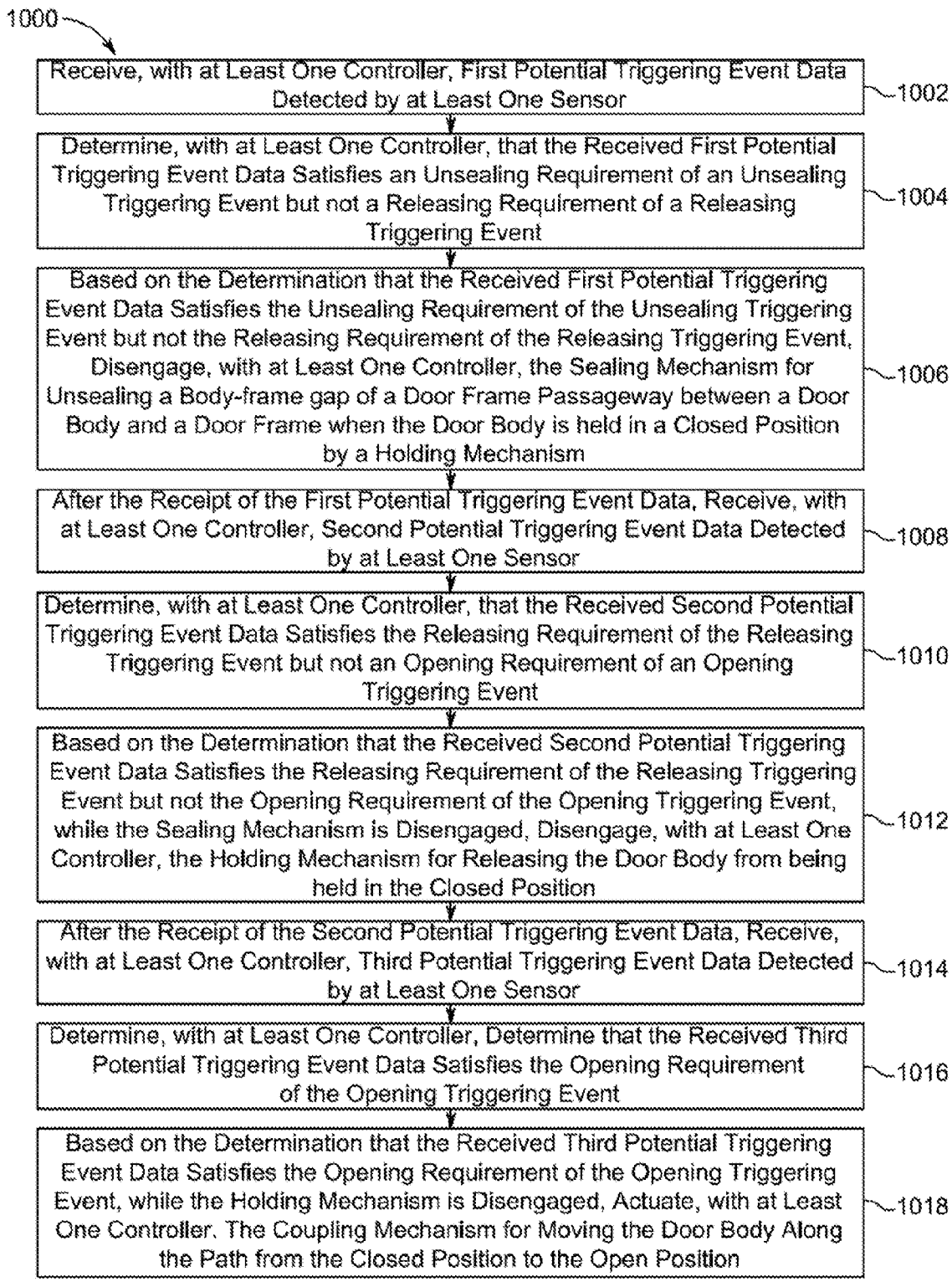

FIG. 10 is a flowchart of an illustrative process 1000 for adjusting a door assembly of a system (e.g., smart door 120 of computing system 199), wherein the door assembly may include a door frame that may define a door frame passageway, a door body, a holding mechanism that may be operative to be selectively engaged for holding the door body in a closed position with respect to the door frame, and a sealing mechanism that may be operative to be selectively engaged for sealing a body-frame gap of the door frame passageway between the door body and the door frame when the door body is in the closed position (e.g., door frame 130 that defines door frame passageway 135 and door body 124 and any suitable locking mechanism and/or coupling mechanism of door 120 (e.g., for holding door 120 in a closed door state (e.g., of FIG. 5A) and any suitable sealing mechanism 409 for sealing any gaps 135g of passageway 135 of door 120)), wherein the system may also include at least one sensor operative to detect potential triggering event data (e.g., any sensor(s) of system 199), and at least one controller (e.g., any controller(s) of system 199). At operation 1002, process 1000 may include at least one controller receiving first potential triggering event data detected by at least one sensor. At operation 1004, process 1000 may include at least one controller determining that the first potential triggering event data received at operation 1002 satisfies an unsealing requirement of an unsealing triggering event but not a releasing requirement of a releasing triggering event. Based on the determination of operation 1004, process 1000 may include at least one controller disengaging the sealing mechanism for unsealing the body-frame gap of the door frame passageway between the door body and the door frame when the door body is held in the closed position by the holding mechanism at operation 1006. In some embodiments, the at least one sensor may be at least partially positioned within the door body. In some embodiments, the received first potential triggering event data of process 1000 may satisfy the unsealing requirement of the unsealing triggering event by being indicative of a user's potential intention to pass through the door frame passageway. Alternatively, in some embodiments, process 1000 may also include, after operation 1002, receiving second potential triggering event data detected by at least one sensor, determining that the received second potential triggering event data satisfies the releasing requirement of the releasing triggering event, and, based on the determination that the received second potential triggering event data satisfies the releasing requirement of the releasing triggering event, while the sealing mechanism is disengaged, disengaging the holding mechanism for releasing the door body from being held in the closed position, wherein the received second potential triggering event data may satisfy the releasing requirement of the releasing triggering event by being indicative of a user's authority to pass through the door frame passageway, or wherein the received first potential triggering event data may satisfy the unsealing requirement of the unsealing triggering event by being indicative of a potential intention of a user to pass through the door frame passageway and the received second potential triggering event data may satisfy the releasing requirement of the releasing triggering event by being indicative of an authorization of the user to pass through the door frame passageway, or wherein the received second potential triggering event data may satisfy the releasing requirement of the releasing triggering event by being indicative of a user's intention to pass through the door frame passageway imminently, or wherein the received first potential triggering event data may satisfy the unsealing requirement of the unsealing triggering event by being indicative of a potential intention of a user to pass through the door frame passageway and the received second potential triggering event data may satisfy the releasing requirement of the releasing triggering event by being indicative of an imminent intention of the user to pass through the door frame passageway. In some embodiments, the door assembly may also include a coupling mechanism that may define a path along which the door body may move with respect to the door frame between the closed position and an open position (e.g., a mechanical coupling mechanism 403 may define a path along which door body 124 may move with respect to door frame 130 between a closed position of FIG. 5A and an open position of FIG. 5D and/or FIG. 6A and/or FIG. 6B), where, after operation 1002, process 1000 may also include at least one controller receiving second potential triggering event data detected by at least one sensor at operation 1008. In such embodiments, process 1000 may also include at least one controller determining at operation 1010 that the second potential triggering event data received at operation 1008 satisfies the releasing requirement of the releasing triggering event but not an opening requirement of an opening triggering event. In such embodiments, process 1000 may also include, based on the determination of operation 1010, and while the sealing mechanism is disengaged (e.g., after operation 1006), at least one controller disengaging the holding mechanism for releasing the door body from being held in the closed position at operation 1012. In such embodiments, process 1000 may also include at least one controller receiving at operation 1014 third potential triggering event data detected by at least one sensor after operation 1008. In such embodiments, process 1000 may also include at least one controller determining at operation 1016 that the third potential triggering event data received at operation 1014 satisfies the opening requirement of the opening triggering event. In such embodiments, based on the determination of operation 1016, process 1000 may also include at least one controller actuating the coupling mechanism for moving the door body along the path from the closed position to the open position while the holding mechanism is disengaged (e.g., after operation 1012). In some embodiments, the first potential triggering event data received at operation 1002 may satisfy the unsealing requirement of the unsealing triggering event by being indicative of a potential intention of a user to pass through the door frame passageway (e.g., the user coming within a threshold distance TDE of smart door 120), the second potential triggering event data received at operation 1008 may satisfy the releasing requirement of the releasing triggering event by being indicative of an authorization of the user to pass through the door frame passageway (e.g., an authorized user's biometric information being provided to one or more appropriate sensors of system 199), and the third potential triggering event data received at operation 1014 may satisfy the opening requirement of the opening triggering event by being indicative of an imminent intention of the user to pass through the door frame passageway (e.g., the user coming within a shorter threshold distance of smart door 120 (e.g., to position P4)).

It is understood that the operations shown in process 1000 of FIG. 10 are merely illustrative and that existing operations may be modified or omitted, additional operations may be added, and the order of certain operations may be altered.

Figure 11:
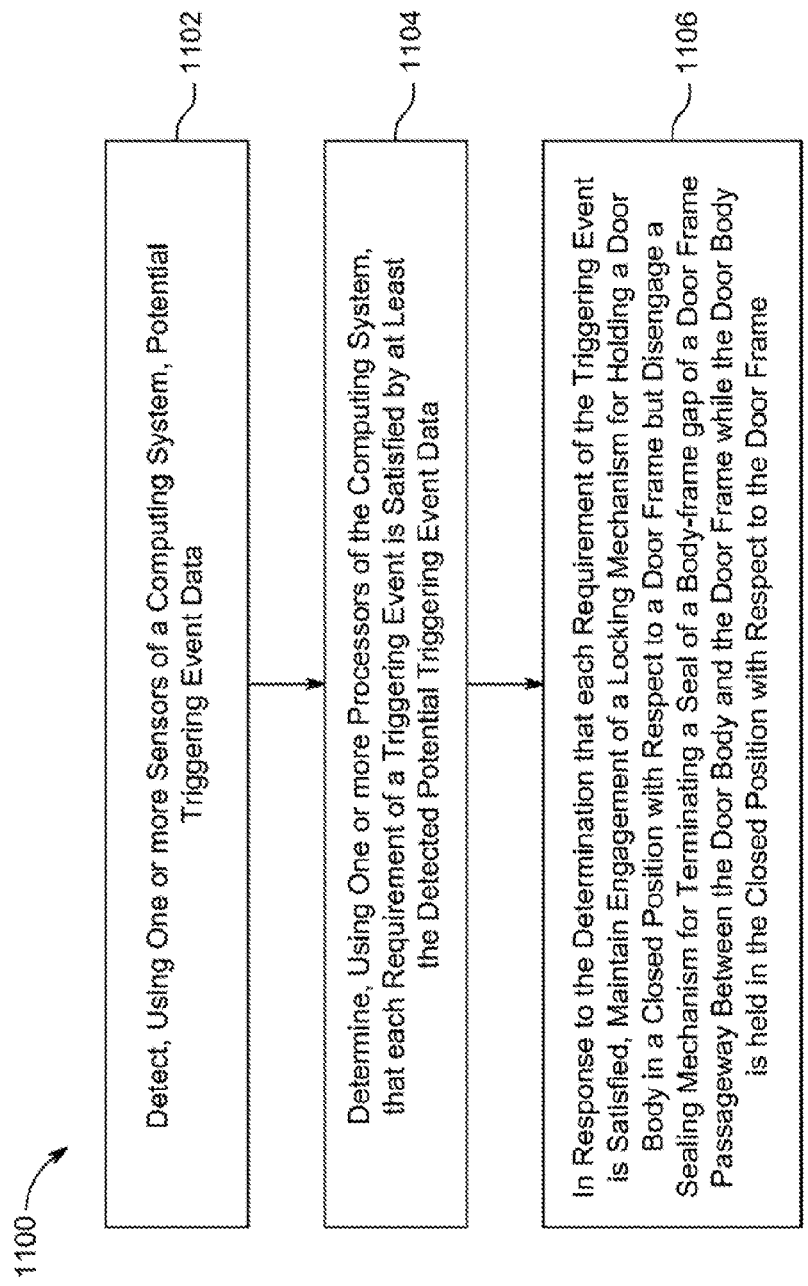

FIG. 11 is a flowchart of an illustrative process 1100 for adjusting a sealing mechanism of a computing system (e.g., sealing mechanism 409 of smart door 120 of computing system 199), wherein the computing system may include one or more processors (e.g., any processor(s) of system 199) and one or more sensors (e.g., any sensor(s) of system 199) and a locking mechanism and a door body and a door frame defining a door frame passageway (e.g., door body 124 and door frame 130 and door frame passageway 135 and any locking mechanism of door 120). At operation 1102, process 1100 may include using one or more of the sensors to detect potential triggering event data. At operation 1104, process 1100 may include using the one or more processors to determine that each requirement of a triggering event is satisfied by at least the potential triggering event data detected at operation 1102. In response to the determination of operation 1104, process 1100 may, at operation 1106, maintain engagement of the locking mechanism for holding the door body in a closed position with respect to the door frame but disengage the sealing mechanism for terminating a seal of a body-frame gap of the door frame passageway between the door body and the door frame while the door body is held in the closed position with respect to the door frame.

It is understood that the operations shown in process 1100 of FIG. 11 are merely illustrative and that existing operations may be modified or omitted, additional operations may be added, and the order of certain operations may be altered.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information may be removed. For example, a user's identity may be treated so that limited or no personally identifiable information can be determined for the user, or a user's geographic location may be generalized where location information is obtained (e.g., such as to a city, ZIP code, or state level), so that a particular location of a user cannot be determined. Thus, the user may have control over what information is collected about the user, how that information is used, and what information is provided to the user.

A computing system or processing system or any other suitable data analysis component of platform 200 may be provided by any suitable element of platform 200 or any suitable combination of multiple elements of platform 200. One or more smart devices of environment 100 (e.g., door smart device 120 and/or a hazard detector smart device 104, etc.) may each include a processor that may be operative to conduct any suitable processing, analyzing, or computing functions of platform 200. Additionally or alternatively, one or more dedicated computing devices may be provided at environment 100 for locally conducting any suitable processing, analyzing, or computing functions of platform 200 at environment 100. Additionally or alternatively, server/system 164 may be operative to conduct any suitable processing, analyzing, or computing functions of platform 200. System 164 may include or otherwise provide a computing system that may be similar to computing system 700 and/or computing system 800 for performing any suitable functionality described above, at least partially automatically. Alternatively or additionally, one, some, or all of entities 222-230 may include or otherwise provide a computing system that may be similar to computing system 700 and/or computing system 800 for performing any suitable functionality described above, at least partially automatically.

Any portion of platform 200 may be operative to store, generate, or otherwise define any suitable message, feedback, communication, media, music, video, and/or the like for any suitable purpose as described above. Any message, feedback, communication, music, video, or other informative mechanism to be output to a user or visitor may be at least partially automatically generated or compiled or pre-stored and retrieved for conveyance to such a user or visitor via any suitable output component of any suitable device by any suitable processing component or components of platform 200. Each smart device or user device described above may be configured to include any component of any smart device or user device described above. As just one particular example, any sensing component 428 of door smart device 120 may also be provided as a sensing component of any other suitable smart device, such as a sensing component of a safe smart appliance or smart outdoor lighting device 114 or the like.

Any processes described with respect to FIGS. 1-11, as well as any other aspects of the disclosure, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions that can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer-readable code may be stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. Program modules, program components, and/or programmatic objects may include computer-readable and/or computer-executable instructions of and/or corresponding to any suitable computer programming language. In at least one embodiment, a computer-readable medium may be tangible. In at least one embodiment, a computer-readable medium may be non-transitory in time. Based on the disclosure and teachings provided herein, a person of ordinary skill in the art will appreciate other ways and/or methods to implement the various embodiments.

It is to be understood that any or each portion of any process discussed herein may be provided as a software construct, firmware construct, one or more hardware components, or a combination thereof. For example, any or each portion of any process discussed herein may be described in the general context of computer-executable instructions, such as program modules, that may be executed by one or more computers or other devices. Generally, a program module may include one or more routines, programs, objects, components, and/or data structures that may perform one or more particular tasks and/or that may implement one or more particular abstract data types.

Each one of the terms "computer-readable medium" or "machine-readable medium" may include, but is not limited to portable or fixed storage devices, optical storage devices, wireless channels and/or various other mediums that may be capable of storing, containing, and/or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and/or the like may be passed, forwarded, or transmitted via any suitable technique, including, but not limited to, memory sharing, message passing, token passing, network transmission, and/or the like.

Furthermore, embodiments of the disclosure may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. One or more processors may perform the necessary tasks.

Also, it is noted that individual embodiments may be described as a process that may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional operations not discussed or included in a figure. Furthermore, not all operations in any particularly described process may occur in all embodiments. A process may correspond to a method, a function, a procedure, a subroutine, a subprogram, and/or the like. When a process corresponds to a function, its termination may correspond to a return of the function to the calling function or the main function.

Any machine-readable medium tangibly embodying instructions may be used in implementing the methodologies described herein. For example, software codes may be stored in a memory. Memory may be implemented within the processor or external to the processor. As used herein the term "memory" may refer to any type of long term, short term, volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" may include, but is not limited to portable or fixed storage devices, optical storage devices, wireless channels, and/or various other storage mediums capable of storing that contain or carry instruction(s) and/or data.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the disclosure, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or operations, but they do not preclude the presence or addition of one or more other features, integers, components, operations, acts, or groups.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Therefore, reference to the details of any preferred embodiments is not intended to limit their scope.

What is claimed is:

1. A method for adjusting a door assembly of a computing system, wherein the door assembly comprises a door frame that defines a door frame passageway between two spaces of an environment and a door body that is movable with respect to the door frame between a closed door state and a plurality of open door states, the method comprising:
    sealing, using a sealing mechanism, a body-frame gap of the door frame passageway between the door body and the door frame while the door assembly is in a first door state;
    detecting, with the computing system, a first stage of interaction by a user with the environment while the door assembly is in the first door state;
    in response to the detecting the first stage of interaction, transitioning, with the computing system, the door assembly from the first door state to a second door state;
    unsealing, by the sealing mechanism, the body-frame gap of the door frame passageway between the door body and the door frame in response to the door assembly transitioning from the first door state to the second door state;
    after the transitioning the door assembly from the first door state to the second door state, detecting, with the computing system, a second stage of interaction by the user with the environment while the door assembly is in the second door state; and
    in response to the detecting the second stage of interaction, transitioning, with the computing system, the door assembly from the second door state to a third door state.

2. The method of claim 1, wherein:
    the first door state comprises the closed door state; and
    the door assembly is configured to transition from the first door state to any open door state of the plurality of open door states only via the second door state.

3. The method of claim 1, wherein the first door state does not comprise any open door state of the plurality of open door states.

4. The method of claim 1, wherein the transitioning the door assembly from the second door state to the third door state comprises unlocking the door body from the door frame.

5. The method of claim 4, wherein:
    the first stage of interaction comprises the user approaching within a threshold distance of the door assembly; and
    the second stage of interaction comprises the user authenticating the user's authority to pass through the door frame passageway.

6. The method of claim 4, wherein:
    the first stage of interaction comprises the user approaching within a first threshold distance of the door assembly; and
    the second stage of interaction comprises the user approaching within a second threshold distance of the door assembly that is shorter than the first threshold distance.

7. The method of claim 1, wherein the transitioning the door assembly from the second door state to the third door state comprises moving the door body from the closed door state to an open door state of the plurality of open door states.

8. The method of claim 1, further comprising:
after the transitioning the door assembly from the second door state to the third door state, detecting, with the computing system, a third stage of interaction by the user with the environment while the door assembly is in the third door state; and
in response to the detecting the third stage of interaction, transitioning, with the computing system, the door assembly from the third door state to a fourth door state.

9. The method of claim 8, wherein:
the transitioning the door assembly from the second door state to the third door state comprises unlocking the door body from the door frame; and
the transitioning the door assembly from the third door state to the fourth door state comprises moving the door body from the closed door state to an open door state of the plurality of open door states.

10. A system comprising:
a door assembly comprising:
a door frame that defines a door frame passageway;
a door body;
a holding mechanism that is operative to be selectively engaged for holding the door body in a closed position with respect to the door frame; and
a sealing mechanism that is operative to be selectively engaged for sealing a body-frame gap of the door frame passageway between the door body and the door frame when the door body is in the closed position;
at least one sensor operative to detect potential triggering event data; and at least one controller operative to:
receive first potential triggering event data detected by the at least one sensor;
determine that the received first potential triggering event data satisfies an unsealing requirement of an unsealing triggering event but not a releasing requirement of a releasing triggering event; and
based on the determination that the received first potential triggering event data satisfies the unsealing requirement of the unsealing triggering event but not the releasing requirement of the releasing triggering event, disengage the sealing mechanism for unsealing the body-frame gap of the door frame passageway between the door body and the door frame when the door body is held in the closed position by the holding mechanism.

11. The system of claim 10, wherein the received first potential triggering event data satisfies the unsealing requirement of the unsealing triggering event by being indicative of a user's potential intention to pass through the door frame passageway.

12. The system of claim 10, wherein the at least one controller is further operative to:
after the receipt of the first potential triggering event data, receive second potential triggering event data detected by the at least one sensor;
determine that the received second potential triggering event data satisfies the releasing requirement of the releasing triggering event; and
based on the determination that the received second potential triggering event data satisfies the releasing requirement of the releasing triggering event, while the sealing mechanism is disengaged, disengage the holding mechanism for releasing the door body from being held in the closed position.

13. The system of claim 12, wherein the received second potential triggering event data satisfies the releasing requirement of the releasing triggering event by being indicative of a user's authority to pass through the door frame passageway.

14. The system of claim 12, wherein:
the received first potential triggering event data satisfies the unsealing requirement of the unsealing triggering event by being indicative of a potential intention of a user to pass through the door frame passageway; and
the received second potential triggering event data satisfies the releasing requirement of the releasing triggering event by being indicative of an authorization of the user to pass through the door frame passageway.

15. The system of claim 12, wherein the received second potential triggering event data satisfies the releasing requirement of the releasing triggering event by being indicative of a user's intention to pass through the door frame passageway imminently.

16. The system of claim 12, wherein:
the received first potential triggering event data satisfies the unsealing requirement of the unsealing triggering event by being indicative of a potential intention of a user to pass through the door frame passageway; and
the received second potential triggering event data satisfies the releasing requirement of the releasing triggering event by being indicative of an imminent intention of the user to pass through the door frame passageway.

17. The system of claim 10, wherein:
the door assembly further comprises a coupling mechanism that defines a path along which the door body may move with respect to the door frame between the closed position and an open position;
the at least one controller is further operative to:
after the receipt of the first potential triggering event data, receive second potential triggering event data detected by the at least one sensor;
determine that the received second potential triggering event data satisfies the releasing requirement of the releasing triggering event but not an opening requirement of an opening triggering event;
based on the determination that the received second potential triggering event data satisfies the releasing requirement of the releasing triggering event but not the opening requirement of the opening triggering event, while the sealing mechanism is disengaged, disengage the holding mechanism for releasing the door body from being held in the closed position;
after the receipt of the second potential triggering event data, receive third potential triggering event data detected by the at least one sensor;
determine that the received third potential triggering event data satisfies the opening requirement of the opening triggering event; and
based on the determination that the received third potential triggering event data satisfies the opening requirement of the opening triggering event, while the holding mechanism is disengaged, actuate the coupling mechanism for moving the door body along the path from the closed position to the open position;
the received first potential triggering event data satisfies the unsealing requirement of the unsealing triggering event by being indicative of a potential intention of a user to pass through the door frame passageway;
the received second potential triggering event data satisfies the releasing requirement of the releasing triggering event by being indicative of an authorization of the user to pass through the door frame passageway; and the received third potential triggering event data satisfies the opening requirement of the opening triggering event by being indicative of an imminent intention of the user to pass through the door frame passageway.

18. The system of claim 10, wherein the at least one sensor is at least partially positioned within the door body.

19. A non-transitory computer readable storage medium storing one or more programs, the one or more programs comprising instructions, which, when executed by a computing system comprising one or more processors and one or more sensors and a sealing mechanism and a locking mechanism and a door body and a door frame defining a door frame passageway, cause the computing system to:

detect, using the one or more sensors of the computing system, potential triggering event data;

determine, using the one or more processors of the computing system, that each requirement of a triggering event is satisfied by at least the detected potential triggering event data; and in response to the determination that each requirement of the triggering event is satisfied, maintain engagement of the locking mechanism for holding the door body in a closed position with respect to the door frame but disengage the sealing mechanism for terminating a seal of a body-frame gap of the door frame passageway between the door body and the door frame while the door body is held in the closed position with respect to the door frame.

* * * * *